(12) United States Patent
Lee et al.

(10) Patent No.: US 11,589,070 B2
(45) Date of Patent: Feb. 21, 2023

(54) APPARATUS AND METHOD FOR ENCODING MOTION VECTOR BY USING BASIC MOTION VECTOR, AND DECODING APPARATUS AND METHOD

(71) Applicant: SAMSUNG ELECTRONICS CO., LTD., Suwon-si (KR)

(72) Inventors: Jin-young Lee, Suwon-si (KR); Yin-ji Piao, Yongin-si (KR); Woong-il Choi, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/634,400

(22) PCT Filed: Mar. 30, 2018

(86) PCT No.: PCT/KR2018/003801
§ 371 (c)(1),
(2) Date: Jan. 27, 2020

(87) PCT Pub. No.: WO2019/054591
PCT Pub. Date: Mar. 21, 2019

(65) Prior Publication Data
US 2020/0177908 A1 Jun. 4, 2020

Related U.S. Application Data

(60) Provisional application No. 62/557,819, filed on Sep. 13, 2017.

(51) Int. Cl.
*H04N 19/513* (2014.01)
*H04N 19/139* (2014.01)
*H04N 19/176* (2014.01)

(52) U.S. Cl.
CPC ......... *H04N 19/513* (2014.11); *H04N 19/139* (2014.11); *H04N 19/176* (2014.11)

(58) Field of Classification Search
CPC ... H04N 19/176; H04N 19/139; H04N 19/513
See application file for complete search history.

(56) References Cited

U.S. PATENT DOCUMENTS

| 9,319,716 B2 | 4/2016 | Chien et al. |
| 9,509,995 B2 | 11/2016 | Xu et al. |
| (Continued) | | |

FOREIGN PATENT DOCUMENTS

| CN | 103339938 A | 10/2013 |
| CN | 103988509 A | 8/2014 |
| (Continued) | | |

OTHER PUBLICATIONS

Communication dated Jun. 29, 2020, from the European Patent Office in European Application No. 18856771.3.
(Continued)

*Primary Examiner* — Zhubing Ren
(74) *Attorney, Agent, or Firm* — Sughrue Mion, PLLC

(57) ABSTRACT

A method of decoding a motion vector includes: determining at least one prediction motion vector (PMV) candidate block used to determine a PMV of a current block; determining an availability of a motion vector of the at least one PMV candidate block; when there is a PMV candidate block determined to be unavailable, determining the PMV of the current block by using a default motion vector (MV); and obtaining a motion vector of the current block based on the determined PMV.

2 Claims, 36 Drawing Sheets

(56) References Cited

U.S. PATENT DOCUMENTS

| | | | |
|---|---|---|---|
| 10,194,167 B2 | 1/2019 | Lim et al. | |
| 10,531,113 B2 | 1/2020 | Lee et al. | |
| 10,750,202 B2 | 8/2020 | Lim et al. | |
| 2008/0175322 A1* | 7/2008 | Lee | H04N 19/176 375/240.16 |
| 2010/0135398 A1* | 6/2010 | Wittmann | H04N 19/147 375/240.16 |
| 2012/0195368 A1* | 8/2012 | Chien | H04N 19/895 375/240.02 |
| 2012/0320936 A1 | 12/2012 | Shimizu et al. | |
| 2013/0294518 A1* | 11/2013 | Lim | H04N 19/52 375/240.16 |
| 2014/0348241 A1* | 11/2014 | Lim | H04N 19/13 375/240.16 |
| 2015/0264390 A1* | 9/2015 | Laroche | H04N 19/52 375/240.16 |
| 2015/0350674 A1* | 12/2015 | Laroche | H04N 19/52 375/240.16 |
| 2016/0373784 A1* | 12/2016 | Bang | H04N 19/70 |
| 2017/0339426 A1* | 11/2017 | Lee | H04N 19/176 |
| 2018/0091818 A1* | 3/2018 | Persson | H04N 19/137 |
| 2019/0110066 A1 | 4/2019 | Lim et al. | |
| 2019/0320195 A1* | 10/2019 | Lim | H04N 19/52 |
| 2020/0068215 A1* | 2/2020 | Kim | H04N 19/523 |
| 2021/0044825 A1 | 2/2021 | Lee et al. | |

FOREIGN PATENT DOCUMENTS

| | | |
|---|---|---|
| EP | 2 757 784 A2 | 7/2014 |
| EP | 3 203 743 A1 | 8/2017 |
| JP | 2014-501085 A | 1/2014 |
| KR | 10-2011-0020214 A | 3/2011 |
| KR | 10-2013-0028633 A | 3/2013 |
| KR | 10-2013-0030232 A | 3/2013 |
| KR | 10-1419011 B1 | 7/2014 |
| KR | 10-2015-0052878 A | 5/2015 |
| KR | 10-2017-0078673 A | 7/2017 |

OTHER PUBLICATIONS

Communication dated Aug. 31, 2020, issued by the Korean Intellectual Property Office in Korean Application No. 10-2020-7003361.

Communication dated Jun. 17, 2020, issued by the Korean Intellectual Property Office in Korean Application No. 10-2020-7003361.

Jianle Chen et al., "MVP index parsing with fixed number of candidates", Joint Collaborative Team on Video Coding (JCT-VC) of ITU-T SG16 WP3 and ISO/IEC JTC1/SC29/WG11, JCTVC-F402, Jul. 14-22, 2011, Torino, IT, pp. 1-17 (17 pages total).

Huanbang Chen et al., "Description of SDR, HDR and 360 video coding technology proposal by Huawei, GoPro, HiSilicon, and Samsung", buJoint Video Exploration Team (JVET) of ITU-T SG 16 WP 3 and ISO/IEC JTC 1/SC 29/WG 11, JVET-J0025_v2, Apr. 10-20, 2018, San Diego, US, pp. 1-135 (135 pages total).

Benjamin Brass Fraunhofer HHI et al., "High Efficiency Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, JCTVC-L1003_v34, Jan. 14-23, 2013, Geneva, CH, pp. 1-310 (310 pages total).

Communication dated Jul. 18, 2018 issued by the International Searching Authority in counterpart Application No. PCT/KR2018/003801 (PCT/ISA/210 and PCT/ISA/237).

Motoharu Ueda, "Bi-prediction by single motion vector using decoder-side inter-reference ME", Document: JCTVC-E216, Joint Collaborative Team on Video Coding (JCT-VC) of ITU-T SG16 WP3 and ISO/IEC JTC1/SC29/WG11, Mar. 2011, pp. 1-21, 22 pages total.

Communication dated Mar. 2, 2020 issued by the European Intellectual Property Office in counterpart European Application No. 18856771.3.

Bross et al., "Chapter 5 Inter-Picture Prediction in HEVC", High Efficiency Video Coding (HEVC): Algorithms and Architectures, Jan. 2014, pp. 113-140, 28 pages total, XP055461237.

Kamp el al., "Fast Decoder Side Motion Vector Derivation for Inter Frame Video Coding", 2009, 4 pages total, XP030081800.

Kamp et al., "Multinypothesis Prediction using Decoder Side Motion Vector Derivation in Inter Frame Video Coding", Jan. 2009, 8 pages total, XP030081712.

Communication dated Dec. 21, 2020 by the Korean Intellectual Property Office in counterpart Koran Patent Application No. 10-2020-7033587.

Communication dated Apr. 27, 2022 issued by the National Intellectual Property Administration, PRC in counterpart Chinese Application No. 201880056184.X.

Communication dated Mar. 14, 2022 issued by Intellectual Property India in counterpart Indian Application No. 202047003237.

Communication dated Sep. 19, 2022, issued by the Korean Intellectual Property Office in Korean Patent Application No. 10-2022-7021151.

Communication dated Dec. 20, 2022, issued by the India Intellectual Property Office in Indian Patent Application No. 202248052179.

Communication dated Dec. 21, 2022, issued by the India Intellectual Property Office in Indian Patent Application No. 202248052180.

* cited by examiner

FIG. 13

| BLOCK SHAPE / DEPTH | 0: SQUARE | 1: NS_VER | 2: NS_HOR |
|---|---|---|---|
| DEPTH OF D | 1300 | 1310 | 1320 |
| DEPTH OF D+1 | 1302 | 1312 | 1322 |
| DEPTH OF D+2 | 1304 | 1314 | 1324 |
| ... | ... | ... | ... |

| SQUARE BLOCK | |
|---|---|
| (00)b |  |
| (01)b |  |
| (10)b |  |
| (11)b |  |

| NON-SQUARE BLOCK | |
|---|---|
| (0)b |  |
| (10)b |  |
| (11)b |  |

| SQUARE BLOCK | |
|---|---|
| (00)b |  |
| (10)b |  |
| (11)b |  |

| NON-SQUARE BLOCK | | |
|---|---|---|
| (0)b |  |  |
| (10)b |  |  |
| (11)b |  |  |

(a) 1/4-PIXEL UNIT (b) 1/2-PIXEL UNIT (c) 1-PIXEL UNIT (d) 2-PIXEL UNIT

FIG. 36

| | Descriptor |
|---|---|
| coding_unit( x0, y0, log2width, log2height ) { | |
| a → if( slice_type != I && | |
|     !(log2width <= LOG2_MIN_CU && log2height <= LOG2_MIN_CU) ) { | |
| b →     cu_skip_flag[ x0 ][ y0 ] | ae(v) |
| c →     if( cu_skip_flag[ x0 ][ y0 ] ) { | |
|         cu_skip_umve[ x0 ][ y0 ] | ae(v) |
|         if( cu_skip_umve[ x0 ][ y0 ] ) { | |
|             cu_mode = SKIP_UMVE | |
|             mvp_idx_umve( x0, y0, identical_list0_list1_flag ) | |
|         } | |
|         else if( log2width >= 3 && log2height >= 3 ) { | |
|             cu_skip_affine[ x0 ][ y0 ] | ae(v) |
|             if( cu_skip_affine[ x0 ][ y0 ] ) { | |
|                 cu_mode = SKIP_AFFINE | |
|             } | |
|             else { | |
|                 mvp_idx[ x0 ][ y0 ] | ae(v) |
|                 cu_mode = SKIP | |
|             } | |
|         } | |
|         else { | |
|             mvp_idx[ x0 ][ y0 ] | ae(v) |
|             cu_mode = SKIP | |
|         } | |
|     } | |
| d →     else { | |
| e →         pred_mode_flag[ x0 ][ y0 ] | ae(v) |
|         cu_mode = pred_mode_flag[ x0 ][ y0 ] | |
| f →         if( pred_mode_flag[x0][y0] != MODE_INTRA ) | |
| g →             pred_mvr_idx[ x0 ][ y0 ] | ae(v) |
|     } | |
| } | |

APPARATUS AND METHOD FOR
ENCODING MOTION VECTOR BY USING
BASIC MOTION VECTOR, AND DECODING
APPARATUS AND METHOD

TECHNICAL FIELD

The present disclosure relates to video encoding and decoding fields. More particularly, the present disclosure relates to a method and apparatus for encoding a motion vector of a video, and a method and apparatus for decoding a motion vector of a video.

BACKGROUND ART

In video encoding and decoding methods, in order to encode an image, one picture may be split into macroblocks and each of the macroblocks may be encoded by using inter prediction or intra prediction.

Inter prediction refers to a method of compressing an image by removing temporal redundancy between pictures, a representative example of which is motion estimation encoding. In motion estimation encoding, each block of a current picture is predicted by using at least one reference picture. A reference block that is most similar to a current block is found within a predetermined search range by using a predetermined evaluation function.

A current block is predicted based on a reference block, and a residual block, which is obtained by subtracting from the current block a prediction block generated as a prediction result, is encoded. In this case, in order to more accurately perform prediction, interpolation is performed on a search range of the reference picture, sub-pel-unit pixels smaller than integer-pel-unit pixels may be generated, and inter prediction may be performed on the generated sub-pel-unit pixels.

In a codec such as H.264 advanced video coding (AVC) and high efficiency video coding (HEVC), in order to predict a motion vector of a current block, a motion vector of previously encoded blocks adjacent to the current block or blocks included in a previously encoded picture is used as a prediction motion vector of the current block.

DESCRIPTION OF EMBODIMENTS

Solution to Problem

A method of decoding a motion vector, according to an embodiment, may include: determining at least one prediction motion vector (PMV) candidate block used to determine a PMV of a current block; determining an availability of a motion vector of the at least one PMV candidate block; when there is a PMV candidate block determined to be unavailable, determining the PMV of the current block by using a default motion vector (MV); and obtaining a motion vector of the current block based on the determined PMV.

Advantageous Effects of Disclosure

An apparatus and method of encoding a motion vector and an apparatus and method of decoding a motion vector according to an embodiment may determine an accurate prediction motion vector for a current block by using a default motion vector, thereby reducing a bit rate for representing a residual motion vector and improving the quality of a reconstructed image.

BRIEF DESCRIPTION OF DRAWINGS

A brief explanation of each drawing is provided to more fully understand the accompanying drawings.

FIG. 13 illustrates a process of determining a depth of a coding unit as a shape and size of the coding unit change, when the coding unit is recursively split such that a plurality of coding units are determined, according to an embodiment.

FIG. 36 is a diagram illustrating an example syntax for describing a process of obtaining an MVR index of a current block.

BEST MODE

Figure 1:
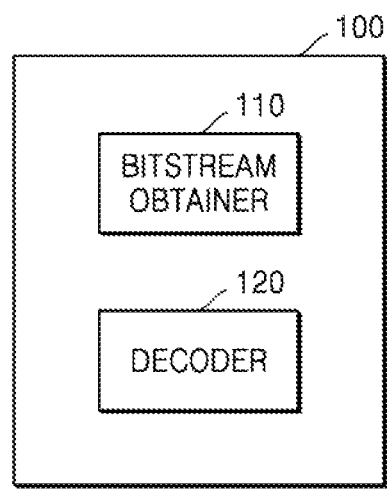
FIG. 1 is a block diagram of an image decoding apparatus for decoding an image based on at least one from among block shape information and split shape information, according to an embodiment.

A method of decoding a motion vector, according to an embodiment, may include: determining at least one prediction motion vector (PMV) candidate block used to determine a PMV of a current block; determining an availability of a motion vector of the at least one PMV candidate block; when there is a PMV candidate block determined to be unavailable, determining the PMV of the current block by using a default motion vector (MV); and obtaining a motion vector of the current block based on the determined PMV.

The method may further include determining the default MV based on motion vectors of a plurality of default MV candidate blocks associated with the current block.

The determining of the default MV may include: sequentially determining, based on a priority order, whether motion vectors exist with respect to the plurality of default MV candidate blocks; and determining the default MV based on the motion vectors of the plurality of default MV candidate blocks, based on an order in which the motion vectors are identified.

The method may further include determining a motion vector derived through decoder side motion vector derivation (DMVD) as the default MV.

The determining of the default MV may include determining the default MV based on the motion vector of the default MV candidate block having a reference image index that is the same as a reference image index of the current block.

The determining of the default MV may include determining the default MV based on a motion vector of a default MV candidate block having a reference image index that is the same as a reference image index of the current block.

The determining of the default MV may include: selecting at least one default MV candidate block based on sizes of the motion vectors of the plurality of default MV candidate blocks; and determining the default MV based on the motion vector of the selected at least one default MV candidate block.

The selecting of the at least one default MV candidate block may include selecting a default MV candidate block having a largest motion vector or a smallest motion vector from among the plurality of default MV candidate blocks.

The determining of the default MV may include determining the default MV based on an average value or a median value of the motion vectors of the plurality of default MV candidate blocks.

The determining of the default MV may include determining the default MV by using a motion vector of a default MV candidate block selected from among the plurality of default MV candidate blocks, the default MV candidate block being selected based on the number of times in which the default MV candidate block is determined as a PMV in a previously decoded picture, a previously decoded slice, or a previously decoded largest coding unit.

The determining of the default MV may include determining a plurality of default MVs each corresponding to a direction, from the plurality of default MV candidate blocks each being located in a different direction from each other, based on the current block.

The plurality of default MVs may include a first default MV and a second default MV, and the determining of the default MV may include determining the first default MV by using a motion vector of a default MV candidate block located in a first direction based on the current block, and determining the second default MV by using a motion vector of a default MV candidate block located in a second direction based on the current block.

The determining of the PMV of the current block may include: when the at least one PMV candidate block includes a PMV candidate block located in the first direction based on the current block and a PMV candidate block located in the second direction based on the current block, assigning the first default MV as the motion vector of the PMV candidate block located in the first direction, when there is no motion vector in the PMV candidate block located in the first direction; and assigning the second default MV as the motion vector of the PMV candidate block located in the second direction, when there is no motion vector in the PMV candidate block located in the second direction to determine the PMV of the current block.

The method may further include determining a motion vector resolution with respect to the current block, and the determining of the PMV of the current block may include, when the motion vector does not exist in the at least one PMV candidate block determined to be used for the PMV according to the motion vector resolution, based on a result of the determining of the availability of the motion vector, assigning the default MV to the PMV candidate block with respect to which the motion vector does not exist.

The determining of the PMV of the current block may include: adjusting the default MV based on the motion vector resolution of the current block; and determining the PMV of the current block based on the adjusted default MV.

The determining of the PMV of the current block may include: based on a result of the determining of the availability of the motion vector, constructing a prediction candidate list from the motion vector of the at least one PMV candidate block; when the number of prediction candidates included in the prediction candidate list is less than a predetermined number, adding the default MV in the prediction candidate list such that the number of the prediction candidates becomes the predetermined number; and determining the PMV of the current block based on the prediction candidates included in the prediction candidate list.

The determining of the PMV of the current block may include assigning the default MV to a PMV candidate block with respect to which there is no motion vector from among the at least one PMV candidate block in a predetermined location.

An apparatus for decoding a motion vector, according to an embodiment, includes: a default motion vector determiner configured to determine a default motion vector (MV) of a current block; and a prediction decoder configured to determine an availability of at least one prediction motion vector (PMV) candidate block used to determine a PMV of the current block, and when there is a PMV candidate block determined to be unavailable, configured to determine the PMV of the current block by using the determined default MV and obtain a motion vector of the current block based on the determined PMV.

A method of encoding a motion vector, according to an embodiment, includes: determining an availability of a motion vector of at least one prediction motion vector (PMV) candidate block used to determine a PMV of a current block; and when there is a PMV candidate block determined to be unavailable, determining the PMV of the current block by using a default motion vector (MV).

Mode of Disclosure

As the present disclosure allows for various changes and numerous embodiments, exemplary embodiments will be illustrated in the drawings and described in detail in the written description. However, this is not intended to limit the present disclosure to particular modes of practice, and it is to be appreciated that all changes, equivalents, and replaces that do not depart from the spirit and technical scope of the present disclosure are encompassed in the present disclosure.

In the description of the present disclosure, certain detailed explanations of the related art are omitted when it is deemed that they may unnecessarily obscure the essence of the present disclosure. Also, numbers (e.g., first and second) used in the description of embodiments of the disclosure are intended to merely distinguish one component from another.

When a component is referred to as being "connected" or "accessed" to or by any other component, it should be understood that the component may be directly connected or accessed to or by the other component, but another new component may also be interposed between them, unless otherwise specifically indicated.

Regarding an element with a suffix such as 'unit' or 'module', two or more elements may be combined into one element or one element may be divided into two or more elements according to functions. In addition, each of respective components to be described below may additionally perform some or all functions among functions which other components take charge of in addition to a primary function which each component takes charge of and some functions among primary functions which the respective components take charge of may be exclusively performed by other components.

Also, the term 'image' or picture' used herein may refer to a still image of an image, or a moving image, i.e., an image itself.

Also, the term 'sample' used herein refers to data that is assigned to a sampling location of an image and is to be processed. For example, pixels in an image of a spatial domain or transform coefficients in a transform domain may be samples. A unit including one or more samples may be defined as a block.

Also, the term 'current block' used herein may refer to a block of a largest coding unit, a coding unit, a prediction unit, or a transform unit of a current image to be encoded or decoded.

Also, the term ' motion vector resolution (MVR)' used herein may refer to the precision of a position of a pixel that may be indicated by a motion vector determined through inter prediction from among pixels included in a reference image (or an interpolated reference image). When an MVR has an N pixel unit (N is a rational number), it means that a motion vector may have the precision of an N pixel unit. For example, an MVR of ¼-pixel unit may mean that a motion vector may indicate a pixel position of a ¼-pixel unit (i.e., a subpixel unit) in an interpolated reference image, and an MVR of 1 unit pixel may mean that a motion vector may indicate a pixel position corresponding to a 1-pixel unit (i.e., an integer pixel unit) in an interpolated reference image.

Also, the term 'candidate MVR' used herein refers to one or more MVRs that may be selected as an MVR of a block, and the term 'candidate block' refers to one or more blocks that are mapped to a candidate MVR and may be used as a block for a prediction motion vector of a block to be inter predicted.

Also, the term 'pixel unit' used herein may be interchangeably used with the terms 'pixel precision' and 'pixel accuracy'.

Hereinafter, an image encoding method and apparatus and an image decoding method and apparatus based on a coding unit and a transform unit according to a tree structure according to an embodiment will be described with reference to FIGS. 1 through 24. An image encoding apparatus 200 and an image decoding apparatus 100 to be described with reference to FIGS. 1 through 24 may respectively include a motion vector encoding apparatus 2700 and a motion vector decoding apparatus 2500 to be described with reference to FIGS. 25 through 36.

FIG. 1 is a block diagram of the image decoding apparatus 100 for decoding an image based on at least one from among block shape information and split shape information, according to an embodiment.

Referring to FIG. 1, according to an embodiment, the image decoding apparatus 100 may include the bitstream obtainer 110 for obtaining predetermined information such as split shape information or block shape information from a bitstream and the decoder 120 for decoding an image by using the obtained information. When the bitstream obtainer 110 of the image decoding apparatus 100 obtains at least one from among the block shape information and the split shape information according to an embodiment, the decoder 120 of the image decoding apparatus 100 may determine at least one coding unit for splitting an image based on the at least one from among the block shape information and the split shape information.

According to an embodiment, the decoder 120 of the image decoding apparatus 100 may determine a shape of the coding unit based on the block shape information. For example, the block shape information may include information indicating whether the coding unit has a square shape or a non-square shape. The decoder 120 may determine the shape of the coding unit by using the block shape information.

According to an embodiment, the decoder 120 may determine a shape into which a coding unit is to be split based on the split shape information. For example, the split shape information may indicate information about a shape of at least one coding unit included in the coding unit.

According to an embodiment, the decoder 120 may determine whether the coding unit is split or not split according to the split shape information. The split shape information may include the information about the at least one coding unit included in the coding unit, and when the split shape information indicates that only one coding unit is included in the coding unit or is not split, the decoder 120 may determine that the coding unit including the split shape information is not split. When the split shape information indicates that the coding unit is split into a plurality of coding units, the decoder 120 may split the coding unit into the plurality of coding units included in the coding unit based on the split shape information.

According to an embodiment, the split shape information may indicate the number of coding units into which the coding unit is to be split or a direction in which the coding unit is to be split. For example, the split shape information may indicate that the coding unit is split in at least one direction from among a vertical direction and a horizontal direction or is not split.

Figure 3:
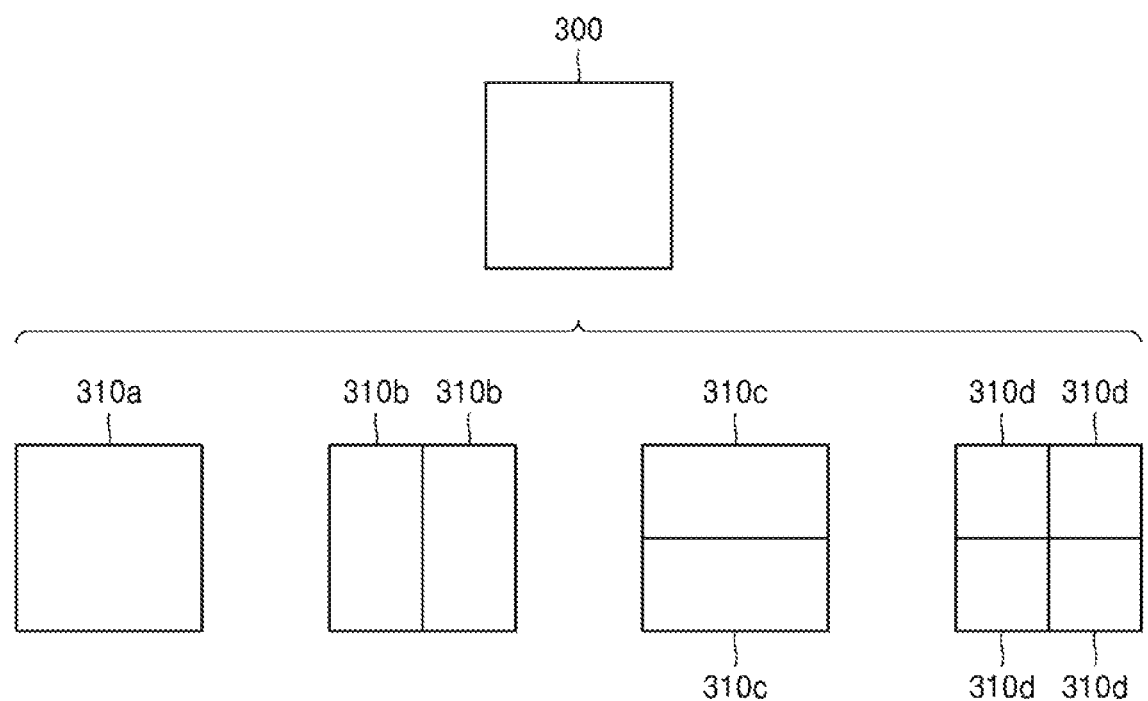
FIG. 3 illustrates a process in which a current coding unit is split to determine at least one coding unit, according to an embodiment.

FIG. 3 illustrates a process in which the image decoding apparatus 100 determines at least one coding unit by splitting a current coding unit according to an embodiment.

A block shape may include 4N×4N, 4N×2N, 2N×4N, 4N×N, or N×4N. N may be a positive integer. Block shape information is information indicating at least one from among a ratio or a size of a shape, a direction, a width, and a height of a coding unit.

The shape of the coding unit may include a square shape and a non-square shape. When the width and the height of the coding unit are the same (4N×4N), the image decoding apparatus 100 may determine the block shape information of the coding unit as a square shape. The image decoding apparatus 100 may determine the shape of the coding unit as a non-square shape.

When the width and the height of the coding unit are different from each other (4N×2N, 2N×4N, 4N×N, or N×4N), the image decoding apparatus 100 may determine the block shape information of the coding unit as a non-square shape. When the shape of the coding unit is a non-square shape, the image decoding apparatus 100 may determine the ratio of the width and the height in the block shape information of the coding unit as at least one from among 1:2, 2:1, 1:4, 4:1, 1:8, and 8:1. Also, the image decoding apparatus 100 may determine whether the coding unit is a horizontal direction or a vertical direction, based on a length of the width and a length of the height of the coding unit. Also, the image decoding apparatus 100 may determine the size of the coding unit, based on at least one from among the length of the width, the length of the height, and an area of the coding unit.

According to an embodiment, the image decoding apparatus 100 may determine a shape of the coding unit by using the block shape information, and may determine which shape the coding unit is split into by using information about a split shape mode. That is, a coding unit splitting method indicated by the information about the split shape mode may be determined according to which block shape is indicated by the block shape information used by the image decoding apparatus 100.

The image decoding apparatus 100 may obtain the information about the split shape mode from a bitstream. However, the present disclosure is not limited thereto, and the image decoding apparatus 100 and the image encoding apparatus 200 may obtain the information about the split shape mode that is pre-promised based on the block shape information. The image decoding apparatus 100 may obtain the information about the split shape mode that is pre-promised for a largest coding unit or a smallest coding unit. For example, the image decoding apparatus 100 may determine a size of the largest coding unit to be 256×256. The image decoding apparatus 100 may determine the information about the pre-promised split shape mode by using quad split. The quad split is a split shape mode in which the width and the height of the coding unit are halved. The image decoding apparatus 100 may obtain the coding unit having a size of 128×128 from the largest coding unit having a size of 256×256 based on the information about the split shape mode. Also, the image decoding apparatus 100 may determine a size of the smallest coding unit to be 4×4. The image decoding apparatus 100 may obtain the information about the split shape mode indicating "not to perform splitting" for the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the information about the split shape mode. Referring to FIG. 3, when the block shape information of a current coding unit 300 indicates a square shape, the decoder 120 may determine that a coding unit 310a having the same size as the current coding unit 300 is not split, based on the information about the split shape mode indicating not to perform splitting, or may determine coding units 310b, 310c, or 310d split based on the information about the split shape mode indicating a predetermined splitting method.

Referring to FIG. 3, according to an embodiment, the image decoding apparatus 100 may determine two coding units 310b obtained by vertically splitting the current coding unit 300, based on the information about the split shape mode indicating to vertically perform splitting. The image decoding apparatus 100 may determine two coding units 310c obtained by horizontally splitting the current coding unit 300, based on the information about the split shape mode indicating to horizontally perform splitting. The image decoding apparatus 100 may determine four coding units 310d obtained by vertically and horizontally splitting the current coding unit 300, based on the information about the split shape indicating to vertically and horizontally perform splitting. However, splitting methods of the square coding unit are not limited to the above-described methods, and the information about the split shape mode may indicate various methods. Predetermined splitting methods of splitting the square coding unit will be described in detail below in relation to various embodiments.

Figure 4:
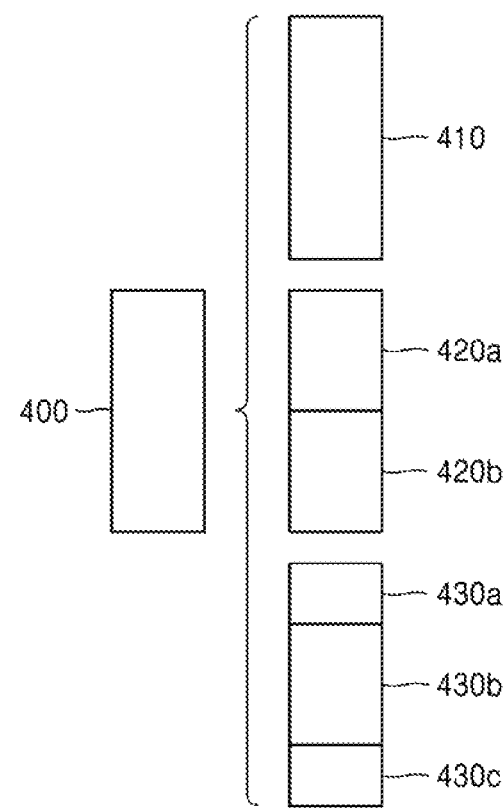
FIG. 4 illustrates a process of determining at least one coding unit by splitting a non-square coding unit, according to an embodiment.
Figure 4:
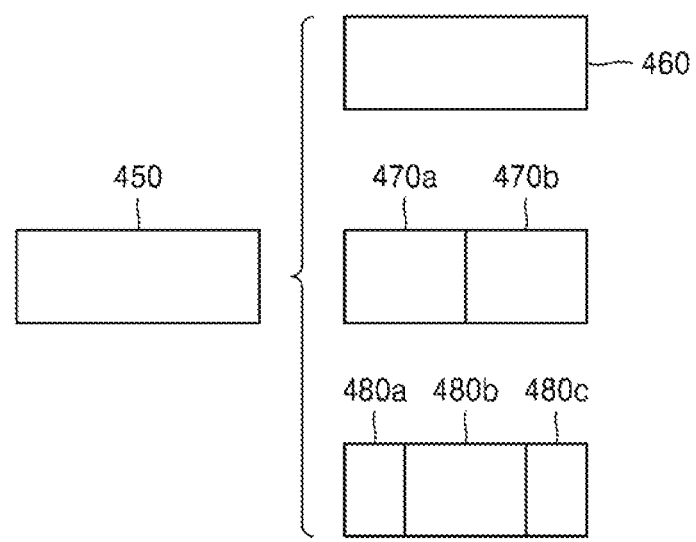

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method based on information about a split shape mode. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the information about the split shape mode indicating not to perform splitting, or determine coding units 420a and 420b, 430a to 430c, 470a and 470b, or 480a to 480c split based on the information about the split shape mode indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the information about the split shape mode and, in this case, the split shape information may indicate the number of one or more coding units generated by splitting the coding unit. Referring to FIG. 4, when the information about the split shape mode indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the information about the split shape mode.

According to an embodiment, when the image decoding apparatus 100 splits the non-square current coding unit 400 or 450 based on the information about the split shape mode, the location of a long side of the non-square current coding unit 400 or 450 may be considered. For example, the image decoding apparatus 100 may determine a plurality of coding units by splitting the long side of the current coding unit 400 or 450, in consideration of the shape of the current coding unit 400 or 450.

According to an embodiment, when the information about the split shape mode indicates to split a coding unit into an odd number of blocks, the image decoding apparatus 100 may determine an odd number of coding units included in the current coding unit 400 or 450. For example, when the information about the split shape mode indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio between a width and a height of the current coding unit 400 or 450 may be 4:1 or 1:4. When the ratio between the width and the height is 4:1, a length of the width is greater than a length of the height, and thus block shape information may be horizontal. When the ratio between the width and the height is 1:4, a length of the width is less than a length of the height, and thus the block shape information may be vertical. The image decoding apparatus 100 may determine to split the current coding unit into an odd number of blocks based on the information about the split shape mode. Also, the image decoding apparatus 100 may determine a split direction of the current coding unit 400 or 450 based on the block shape information of the current coding unit 400 or 450. For example, when the current coding unit 400 is in a vertical direction, the image decoding apparatus 100 may horizontally split the current coding unit 400 and may determine the coding units 430a, 430b, and 430c. Also, when the current coding unit 450 is in a horizontal direction, the image decoding apparatus 100 may vertically split the current coding unit 450 and may determine the coding units 480a, 480b, and 480c.

According to an embodiment, the image decoding apparatus 100 may determine an odd number of coding units included in the current coding unit 400 or 450, and sizes of all of the determined coding units may not be the same. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the information about the split shape mode indicates to split a coding unit into an odd number of blocks, the image decoding apparatus 100 may determine an odd number of coding units included in the current coding unit 400 or 450, and may put a predetermined restriction on at least one coding unit from among the odd number of coding units generated by splitting the current coding unit 400 or 450. Referring to FIG. 4, the image decoding apparatus 100 may allow a decoding method of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
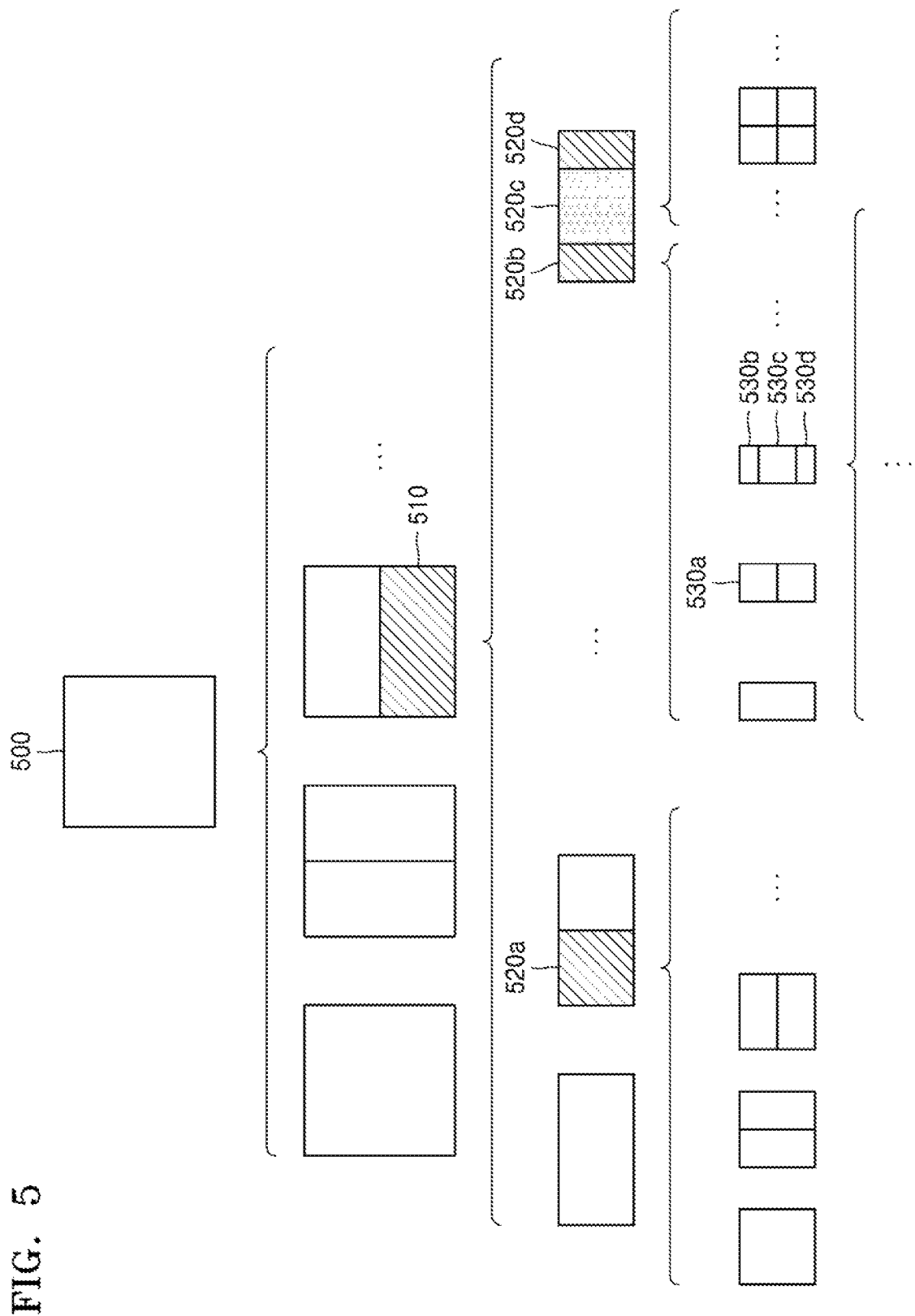
FIG. 5 illustrates a process of splitting a coding unit based on at least one of block shape information and split shape information, according to an embodiment.

FIG. 5 illustrates a process, performed by the image decoding apparatus 100, of splitting a coding unit based on at least one from among block shape information and information about a split shape mode, according to an embodiment.

According to an embodiment, the image decoding apparatus 100 may determine to split or not to split a square first coding unit 500 into coding units, based on at least one of the block shape information and the information about the split shape mode. According to an embodiment, when the information about the split shape mode indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that a relationship among the first coding unit, the second coding unit, and the third coding unit follows the above descriptions.

According to an embodiment, the image decoding apparatus 100 may determine to split or not to split the determined second coding unit 510 into coding units, based on at least one of the block shape information and the information about the split shape mode. Referring to FIG. 5, the image decoding apparatus 100 may or may not split the non-square second coding unit 510, which is determined by splitting the first coding unit 500, into one or more third coding units 520a, or 520b, 520c, and 520d based on at least one of the block shape information and the information about the split shape mode. The image decoding apparatus 100 may obtain at least one of the block shape information and the information about the split shape mode, and split a plurality of various-shaped second coding units (e.g., 510) by splitting the first coding unit 500, based on the obtained at least one of the block shape information and the information about the split shape mode, and the second coding unit 510 may be split by using the splitting method of the first coding unit 500, based on at least one of the block shape information and the information about the split shape mode. According to an embodiment, when the first coding unit 500 is split into the second coding units 510 based on at least one of the block shape information and the information about the split shape mode of the first coding unit 500, the second coding unit 510 may also be split into the third coding units 520a, or 520b, 520c, and 520d based on at least one of the block shape information and the information about the split shape mode of the second coding unit 510. That is, a coding unit may be recursively split based on at least one of the block shape information and the information about the split shape mode of each coding unit. Therefore, a square coding unit may be determined by splitting a non-square coding unit, and a non-square coding unit may be determined by recursively splitting the square coding unit.

Referring to FIG. 5, a predetermined coding unit from among an odd number of third coding units 520b, 520c, and 520d determined by splitting the non-square second coding unit 510 (e.g., a coding unit at a center location or a square coding unit) may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split into a plurality of coding units. For example, the non-square fourth coding unit 530 or 530d may be split into an odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on at least one of the block shape information and the information about the split shape mode. Also, the image decoding apparatus 100 may determine not to split the second coding unit 510 based on at least one of the block shape information and the information about the split shape mode. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain at least one of the block shape information and the information about the split shape mode, which is used to split a current coding unit, from a predetermined location in the current coding unit.

Figure 6:
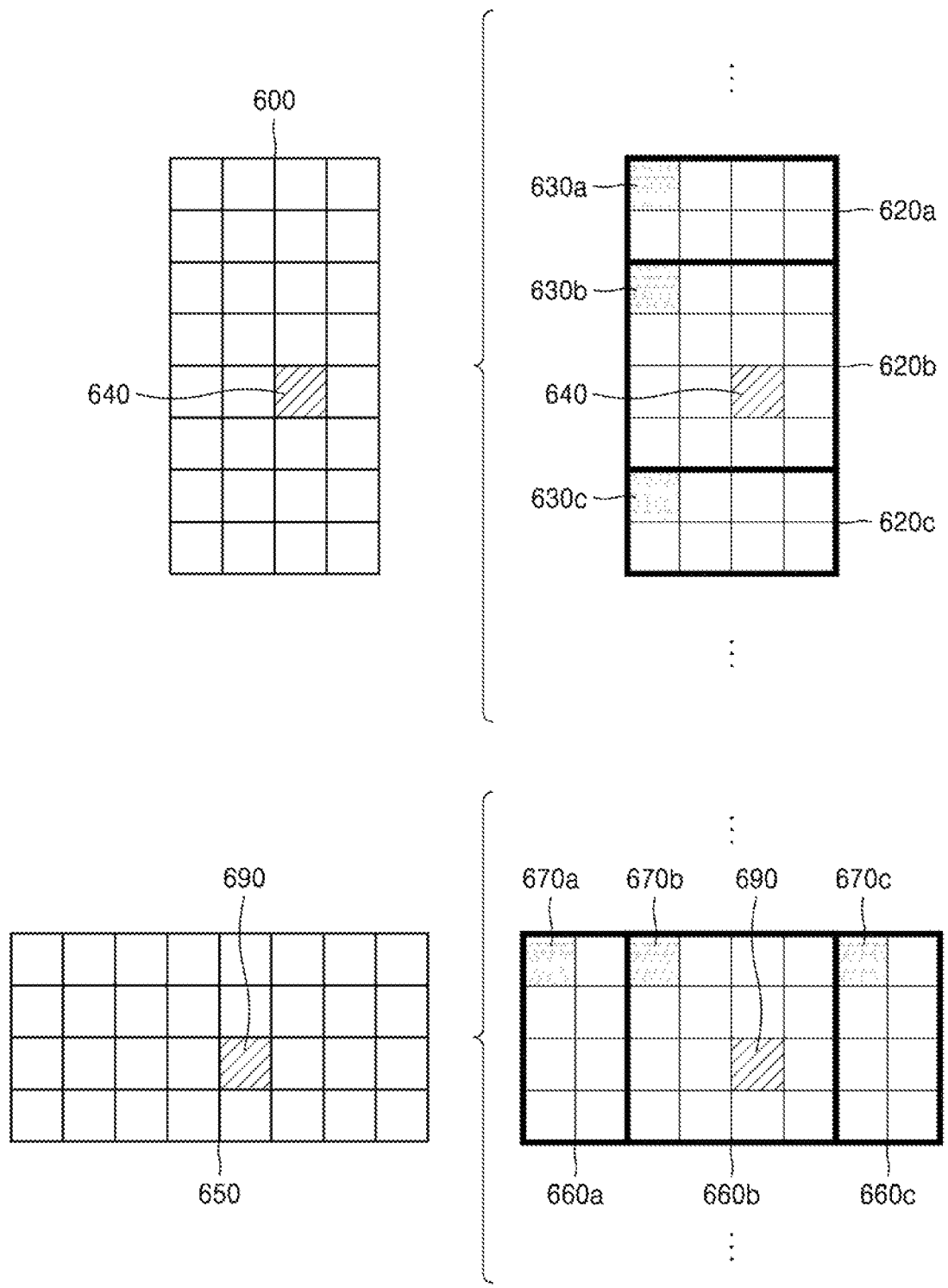
FIG. 6 illustrates a method of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, at least one of block shape information and information about a split shape mode of a current coding unit 600 or 650 may be obtained from a sample of a predetermined location from among a plurality of samples included in the current coding unit 600 or 650 (e.g., a sample 640 or 690 of a center location). However, the predetermined location in the current coding unit 600, from which at least one of the block shape information and the information about the split shape mode may be obtained, is not limited to the center location in FIG. 6, and may include various locations included in the current coding unit 600 (e.g., top, bottom, left, right, top left, bottom left, top right, and bottom right locations). The image decoding apparatus 100 may obtain at least one of the block shape information and the information about the split shape mode from the predetermined location and determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of an odd number of coding units to determine a coding unit at a center location from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600 or the current coding unit 650. The image decoding apparatus 100 may determine the coding unit 620b at a center location or the coding unit 660b at a center location by using information about locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top left samples 630a, 630b, and 630c of the coding units 620a, 620b, and 620c.

According to an embodiment, the information indicating the locations of the top left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top left sample 630a of the upper coding unit 620a may include coordinates (xa, ya), information indicating the location of the top left sample 630b of the middle coding unit 620b may include coordinates (xb, yb), and information indicating the location of the top left sample 630c of the lower coding unit 620c may include coordinates (xc, yc). The image decoding apparatus 100 may determine the middle coding unit 620b by using the coordinates of the top left samples 630a, 630b, and 630c which are included in the coding units 620a, 620b, and 620c, respectively. For example, when the coordinates of the top left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top left samples 630a, 630b, and 630c may include coordinates indicating absolute locations in the picture, or may use coordinates (dxb, dyb) indicating a relative location of the top left sample 630b of the middle coding unit 620b and coordinates (dxc, dyc) indicating a relative location of the top left sample 630c of the lower coding unit 620c with reference to the location of the top left sample 630a of the upper coding unit 620a. Also, a method of determining a coding unit at a predetermined location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into the plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the widths or heights of the coding units 620a, 620b, and 620c by using the coordinates (xa, ya) indicating the location of the top left sample 630a of the upper coding unit 620a, the coordinates (xb, yb) indicating the location of the top left sample 630b of the middle coding unit 620b, and the coordinates (xc, yc) indicating the location of the top left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be a width of the current coding unit 600. The image decoding apparatus 100 may determine the height of the upper coding unit 620a to be yb-ya. According to an embodiment, the image decoding apparatus 100 may determine the width of the middle coding unit 620b to be a width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine a width or a height of each of the coding units 660a, 660b, and 660c by using coordinates (xd, yd) that are information indicating a location of a top left sample 670a of the left coding unit 660a, coordinates (xe, ye) that are information indicating a location of a top left sample 670b of the middle coding unit 660b, and coordinates (xf, yf) that are information indicating a location of a top left sample 670c of the right coding unit 660c. The image decoding apparatus 100 may determine sizes of the coding units 660a, 660b, and 660c by using the coordinates (xd, yd), (xe, ye), and (xf, yf) indicating locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a as the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 600. According to an embodiment, the image decoding apparatus 100 may determine the width or the height of the right coding unit 660c by using the width or the height of the current coding unit 650 and the width and the height of the left coding unit 660a and the middle coding unit 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the size of the left coding unit 660a and the right coding unit 660c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and information about a split shape mode, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into the plurality of coding units 620a, 620b, and 620c based on at least one of the block shape information and the information about the split shape mode, and may determine the coding unit 620b at a center location from among the plurality of the coding units 620a, 620b, and 620c. Furthermore, the image decoding apparatus 100 may determine the coding unit 620b at the center location, in consideration of a location from which at least one of the block shape information and the information about the split shape mode is obtained. That is, at least one of the block shape information and the information about the split shape mode of the current coding unit 600 may be obtained from the sample 640 at a center location of the current coding unit 600 and, when the current coding unit 600 is split into the plurality of coding units 620a, 620b, and 620c based on at least one of the block shape information and the information about the split shape mode, the coding unit 620b including the sample 640 may be determined as the coding unit at the center location. However, information used to determine the coding unit at the center location is not limited to at least one of the block shape information and the information about the split shape mode, and various kinds of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use at least one of the block shape information and the information about the split shape mode, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, determine the coding unit 620b including a sample, from which predetermined information (e.g., at least one of the block shape information and the information about the split shape mode) may be obtained, from among the plurality of coding units 620a, 620b, and 620c determined by splitting the current coding unit 600, and may put a predetermined restriction on the coding unit 620b. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 100 may use at least one of the block shape information and the information about the split shape mode to determine a coding unit at a predetermined location from among the plurality of coding units. According to an embodiment, the image decoding apparatus 100 may obtain at least one of the block shape information and the information about the split shape mode from a sample at a predetermined location in a coding unit, and may split the plurality of coding units, which are generated by splitting the current coding unit, by using at least one of the block shape information and the information about the split shape mode, which is obtained from the sample of the predetermined location in each of the plurality of coding units. That is, a coding unit may be recursively split based on at least one of the block shape information and the information about the split shape mode, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
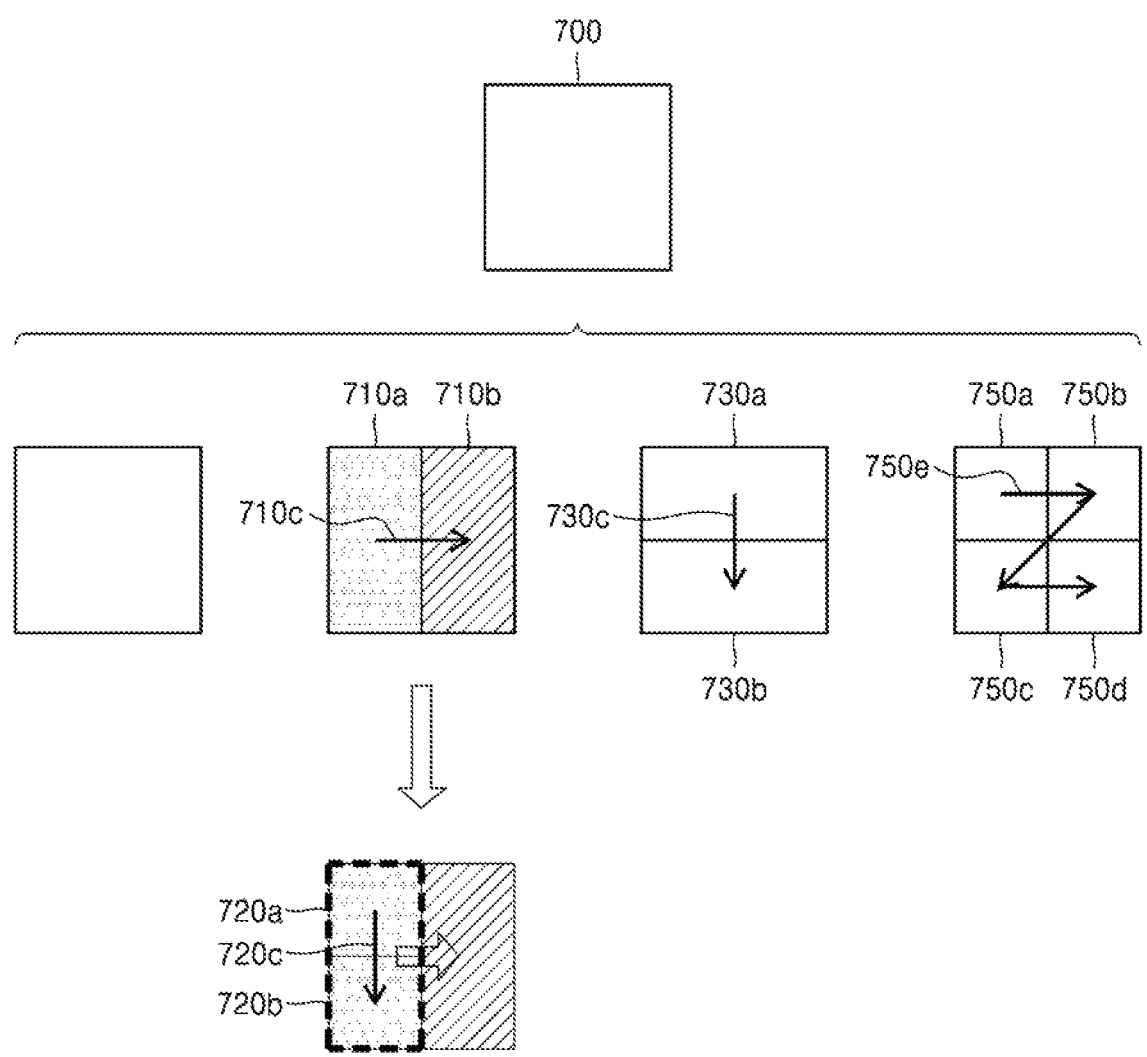
FIG. 7 illustrates an order of processing a plurality of coding units when the plurality of coding units are determined by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on block shape information and information about a split shape mode.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 1400 in a horizontal direction, in a vertical direction order 730c. The image decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a, 710b, 730a, 730b, 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a, 710b, 730a, 730b, 750a, 750b, 750c, and 750d may correspond to a splitting method of the first coding unit 700. As such, each of the plurality of coding units 710a, 710b, 730a, 730b, 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
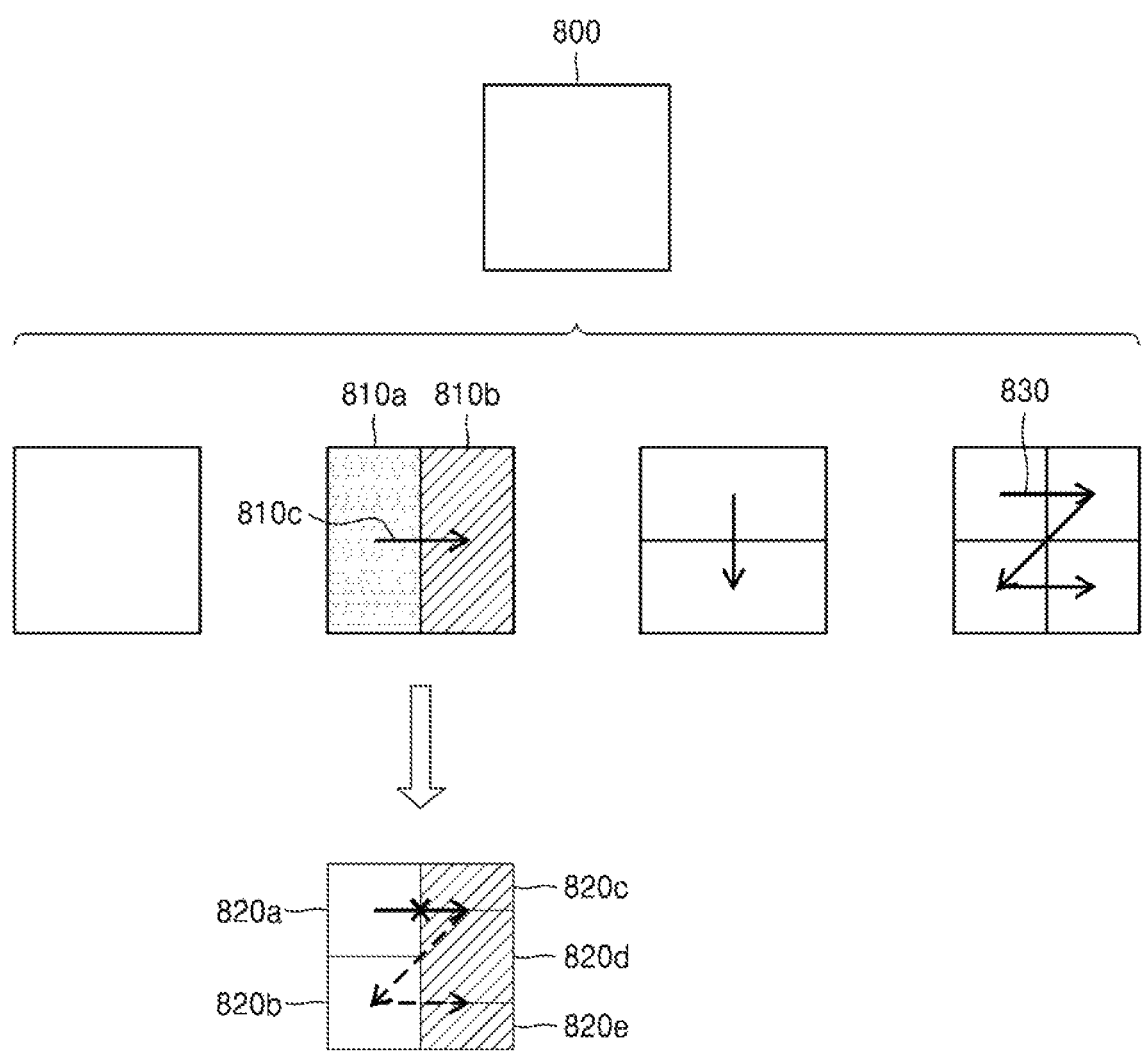
FIG. 8 illustrates a process of determining that a current coding unit is to be split into an odd number of coding units, when coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained block shape information and information about a split shape mode. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c, 820d, and 820e are split into an odd number of coding units, based on at least one of the block shape information and the information about the split shape mode. For example, the right second coding unit 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may decide whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is divided in half along a boundary of the third coding units 820a and 820b, and 820c, 820d, and 820e. For example, the third coding units 820a and 820b determined by dividing the height of the non-square left second coding unit 810a in half satisfy the condition. However, because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and determine that the right second coding unit 810b is split into an odd number of coding units, based on a result of the decision. According to an embodiment, when a coding unit is split into an odd number of coding units, the image decoding apparatus 100 may put a predetermined restriction on a coding unit at a predetermined location among the split coding units, and the restriction or the predetermined location has been described above in relation to various embodiments and thus detailed descriptions thereof will not be provided here.

Figure 9:
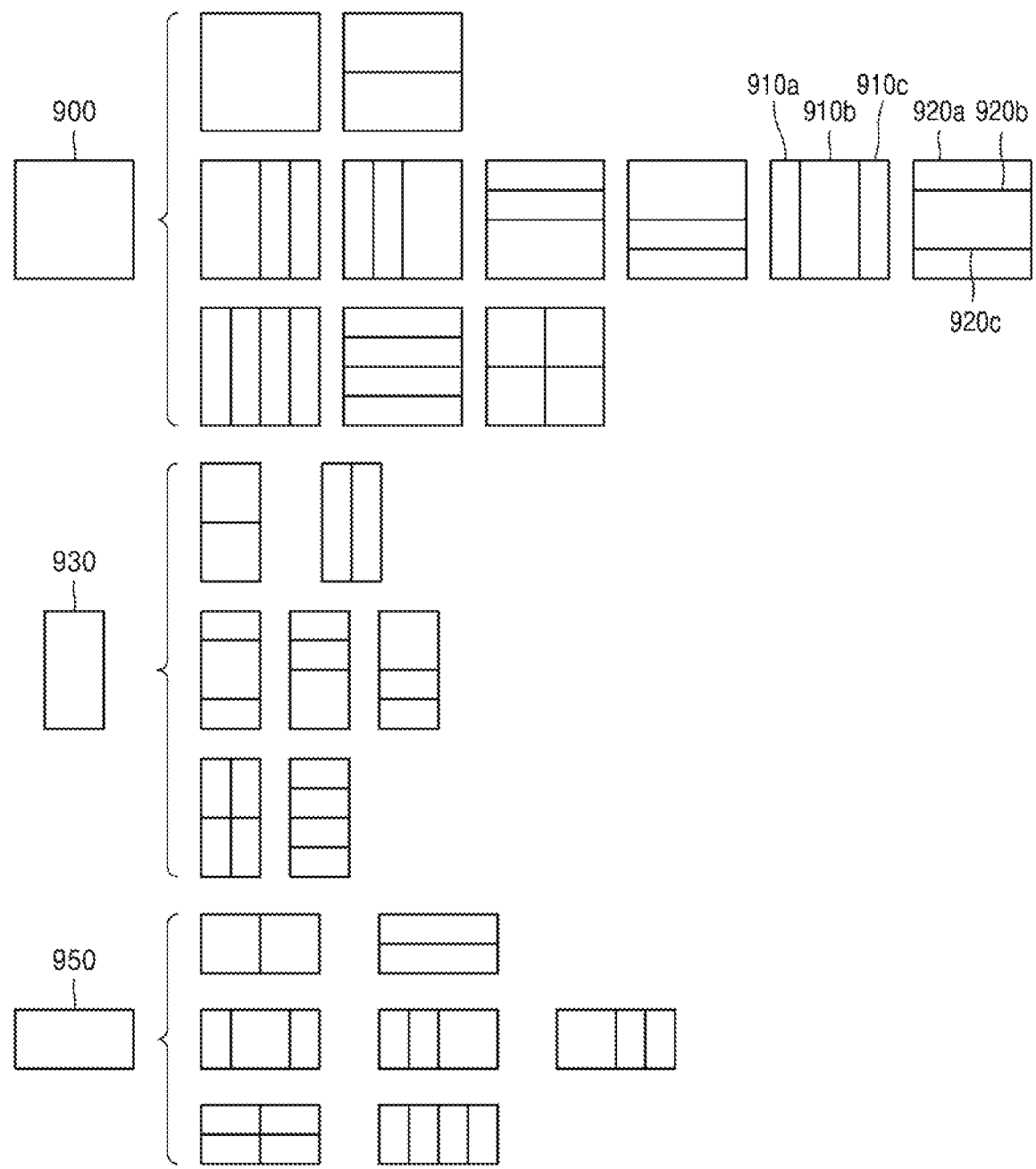
FIG. 9 illustrates a process of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and information about a split shape mode, which is obtained by the bitstream obtainer 110. The square first coding unit 900 may be split into four square coding units, or may be split into a plurality of non-square coding units. For example, referring to FIG. 9, when the block shape information indicates that the first coding unit 900 has a square shape and the information about the split shape mode indicates to split the first coding unit 900 into non-square coding units, the image decoding apparatus 100 may split the first coding unit 900 into a plurality of non-square coding units. In detail, when the information about the split shape mode indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a predetermined restriction on a coding unit at a predetermined location from among the split coding units, and the restriction or the predetermined location has been described above in relation to various embodiments and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
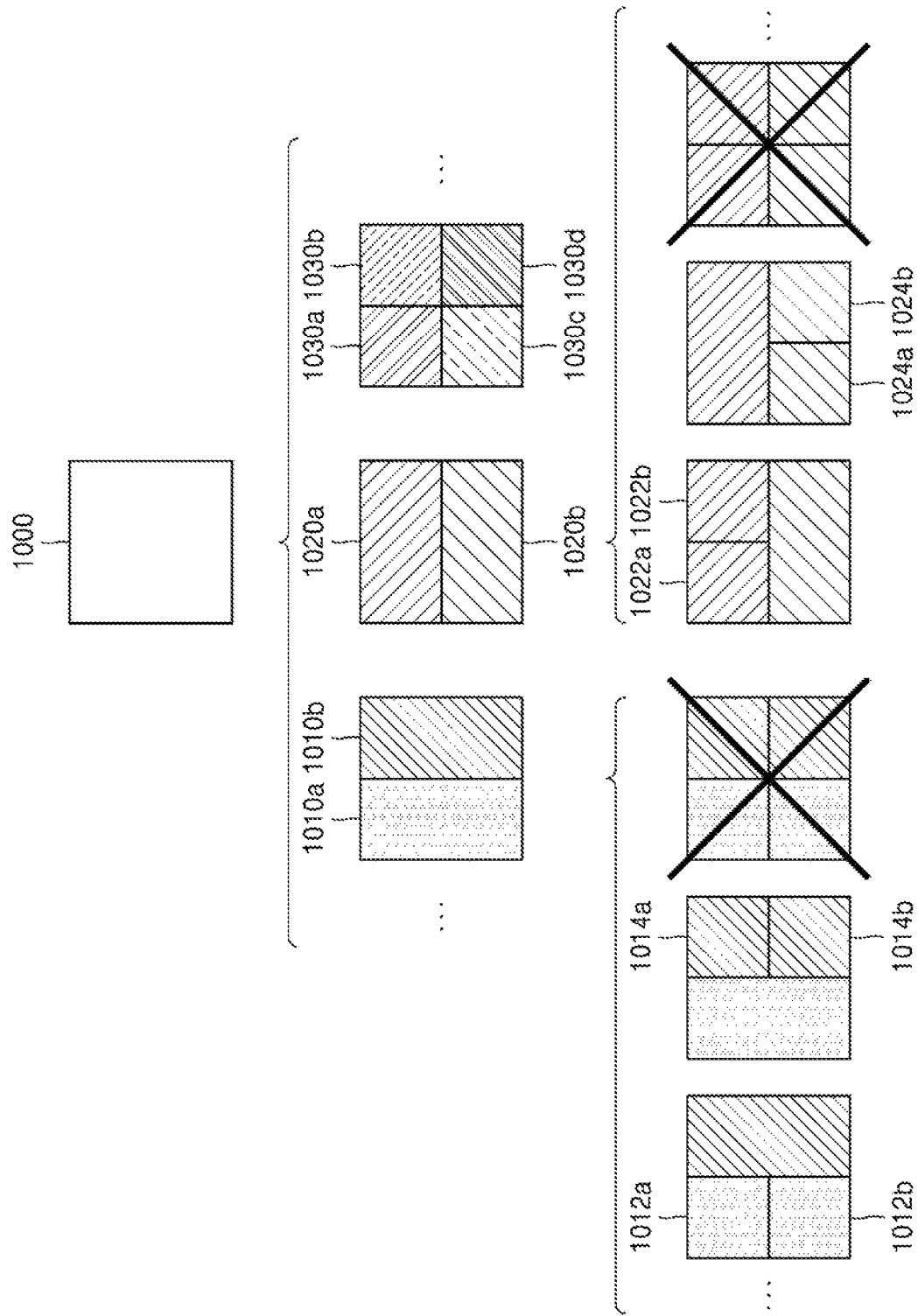
FIG. 10 illustrates that a shape into which a second coding unit is splittable is restricted when the second coding unit having a non-square shape, which is determined by splitting a first coding unit, satisfies a predetermined condition, according to an embodiment.

FIG. 10 illustrates that a shape into which a second coding unit is splittable by the image decoding apparatus 100 is restricted when the second coding unit having a non-square shape, which is determined by splitting a first coding unit 1000, satisfies a predetermined condition, according to an embodiment.

According to an embodiment, the image decoding apparatus 100 may determine to split the square first coding unit 1000 into non-square second coding units 1010a, 1010b, 1020a, and 1020b, based on at least one of block shape information and information about a split shape mode, which is obtained by the bitstream obtainer 110. The second coding units 1010a, 1010b, 1020a, and 1020b may be independently split. As such, the image decoding apparatus 100 may determine to split or not to split the first coding unit 1000 into a plurality of coding units, based on at least one of the block shape information and the information about the split shape mode of each of the second coding units 1010a, 1010b, 1020a, and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on at least one of the block shape information and the information about the split shape mode, and may be inefficient in terms of image decoding.

According to an embodiment, the image decoding apparatus 100 may determine third coding units 1022a, 1022b, 1024a, and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
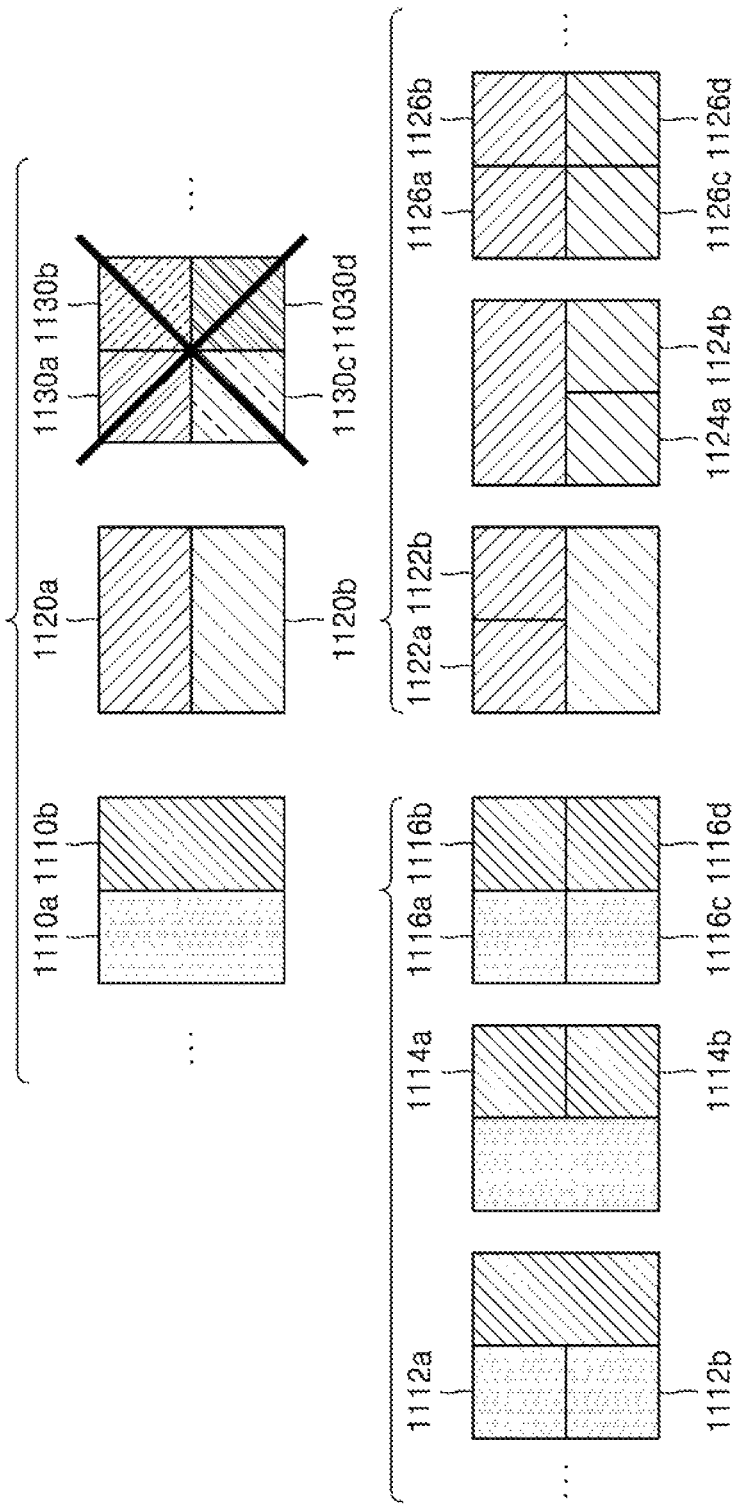
FIG. 11 illustrates a process of splitting a square coding unit when split shape information indicates that the square coding unit is not to be split into four square coding units, according to an embodiment.

FIG. 11 illustrates a process, performed by the image decoding apparatus 100, of splitting a square coding unit when information about a split shape mode indicates that the square coding unit is not to be split into four square coding units, according to an embodiment.

According to an embodiment, the image decoding apparatus 100 may determine second coding units 1110a, 1110b, 1120a, 1120b, etc. by splitting a first coding unit 1100, based on at least one of block shape information and information about a split shape mode. The information about the split shape mode may include information about various methods of splitting a coding unit but, the information about various splitting methods may not include information for splitting a coding unit into four square coding units. According to such information about a split shape mode, the image decoding apparatus 100 may not split the first square coding unit 1100 into four square second coding units 1130a, 1130b, 1130c, and 1130d. The image decoding apparatus 100 may determine the non-square second coding units 1110a, 1110b, 1120a, 1120b, etc., based on the information about the split shape mode.

According to an embodiment, the image decoding apparatus 100 may independently split the non-square second coding units 1110a, 1110b, 1120a, 1120b, etc. Each of the second coding units 1110a, 1110b, 1120a, 1120b, etc. may be recursively split in a predetermined order, and this splitting method may correspond to a method of splitting the first coding unit 1100, based on at least one of the block shape information and the information about the split shape mode.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
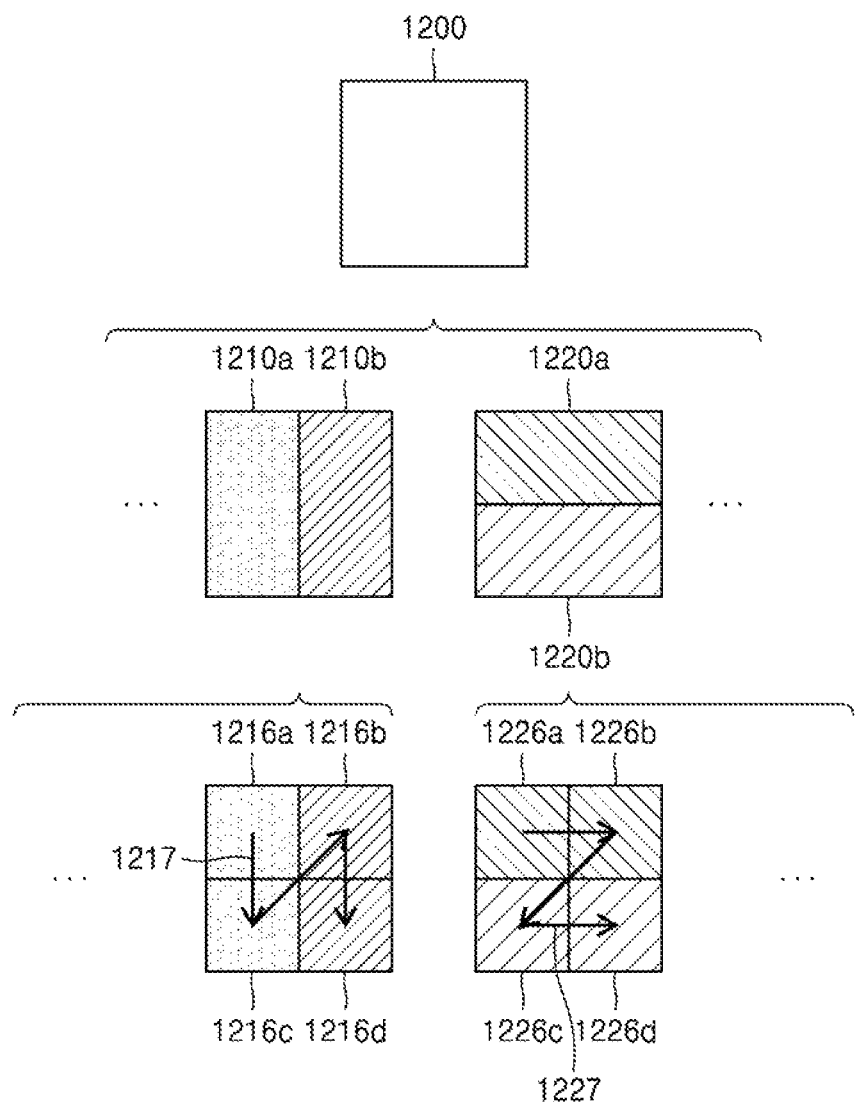
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on block shape information and information about a split shape mode. When the block shape information indicates a square shape and the information about the split shape mode indicates to split the first coding unit 1200 in at least one of horizontal and vertical directions, the image decoding apparatus 100 may determine second coding units 1210a, 1210b, 1220a, and 1220b, by splitting the first coding unit 1200. Referring to FIG. 12, the non-square second coding units 1210a, 1210b, 1220a, and 1220b determined by splitting the first coding unit 1200 in only a horizontal direction or vertical direction may be independently split based on the block shape information and the information about the split shape mode of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a, 1210b, 1220a, and 1220b has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a, 1210b, 1220a, and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on at least one of the block shape information the information about the split shape mode, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by dividing a width and height of the first coding unit 1300 to ½ may have a size of N×N. Furthermore, the third coding unit 1304 determined by dividing a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by dividing at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 By splitting the first coding unit 1320 in horizontal and vertical directions.

According to an embodiment, the image decoding apparatus 100 may determine the third coding unit 1304, 1314, or 1324 by dividing at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
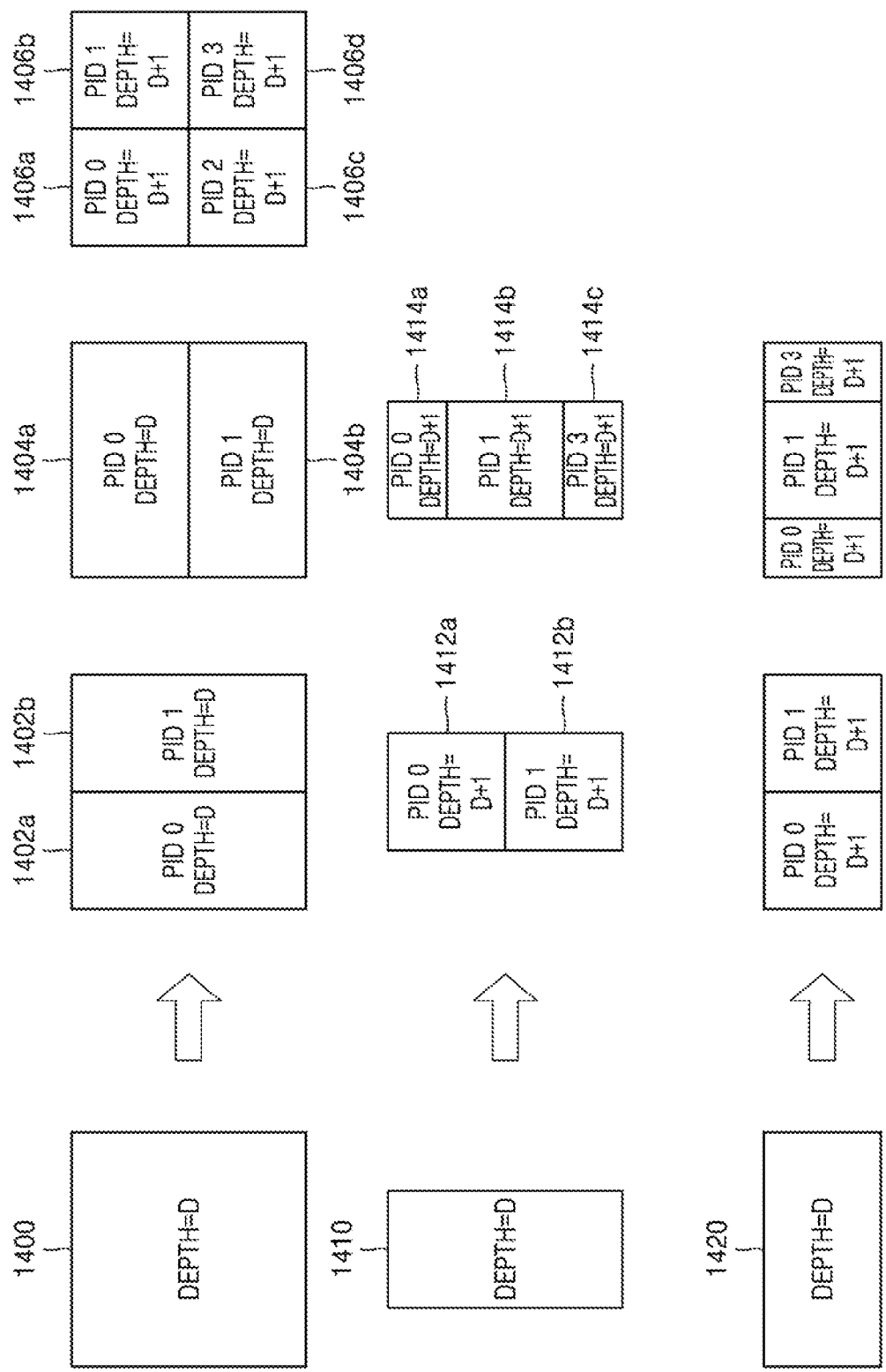
FIG. 14 illustrates depths that are determinable based on shapes and sizes of coding units, and part indexes (PIDs) for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on information about a split shape mode. That is, the image decoding apparatus 100 may determine the second coding units 1402a and 1402b, 1404a and 1404b, and 1406a, 1406b, 1406c, and 1406d, based on the information about the split shape mode of the first coding unit 1400.

According to an embodiment, a depth of the second coding units 1402a and 1402b, 1404a and 1404b, and 1406a, 1406b, 1406c, and 1406d, which are determined based on the information about the split shape mode of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the information about the split shape mode, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the information about the split shape mode. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the information about the split shape mode.

According to an embodiment, a depth of the second coding units 1412a and 1412b, 1414a, 1414b, and 1414c, 1422a and 1422b, and 1424a, 1424b, and 1424c, which are determined based on the information about the split shape mode of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the information about the split shape mode. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs to identify respective coding units. According to an embodiment, the PID may be obtained from a sample of a predetermined location of each coding unit (e.g., a top left sample).

According to an embodiment, the image decoding apparatus 100 may determine a coding unit at a predetermined location from among the split coding units, by using the PIDs for distinguishing the coding units. According to an embodiment, when the information about the split shape mode of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the information about the split shape mode indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
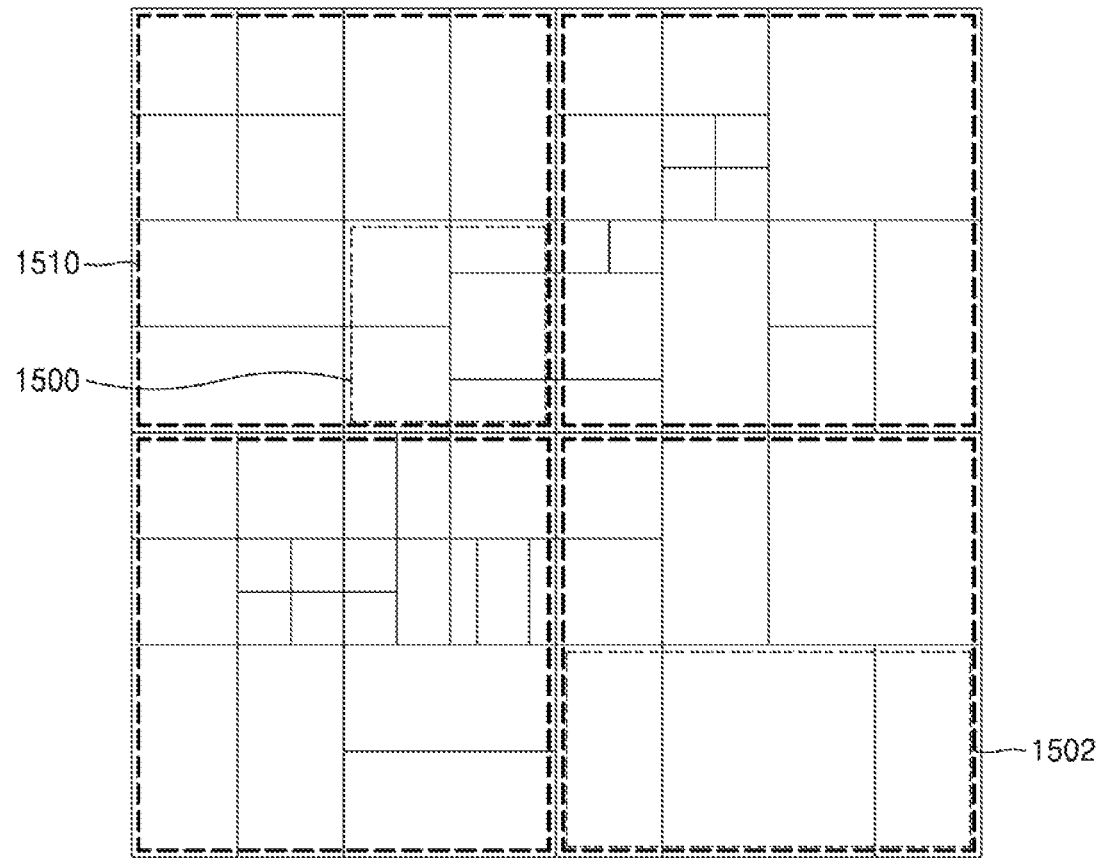
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and information about a split shape mode. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using information about a split shape mode for each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the information about the split shape mode with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4, and thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the bitstream obtainer 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the information about the split shape mode according to various embodiments.

Figure 16:
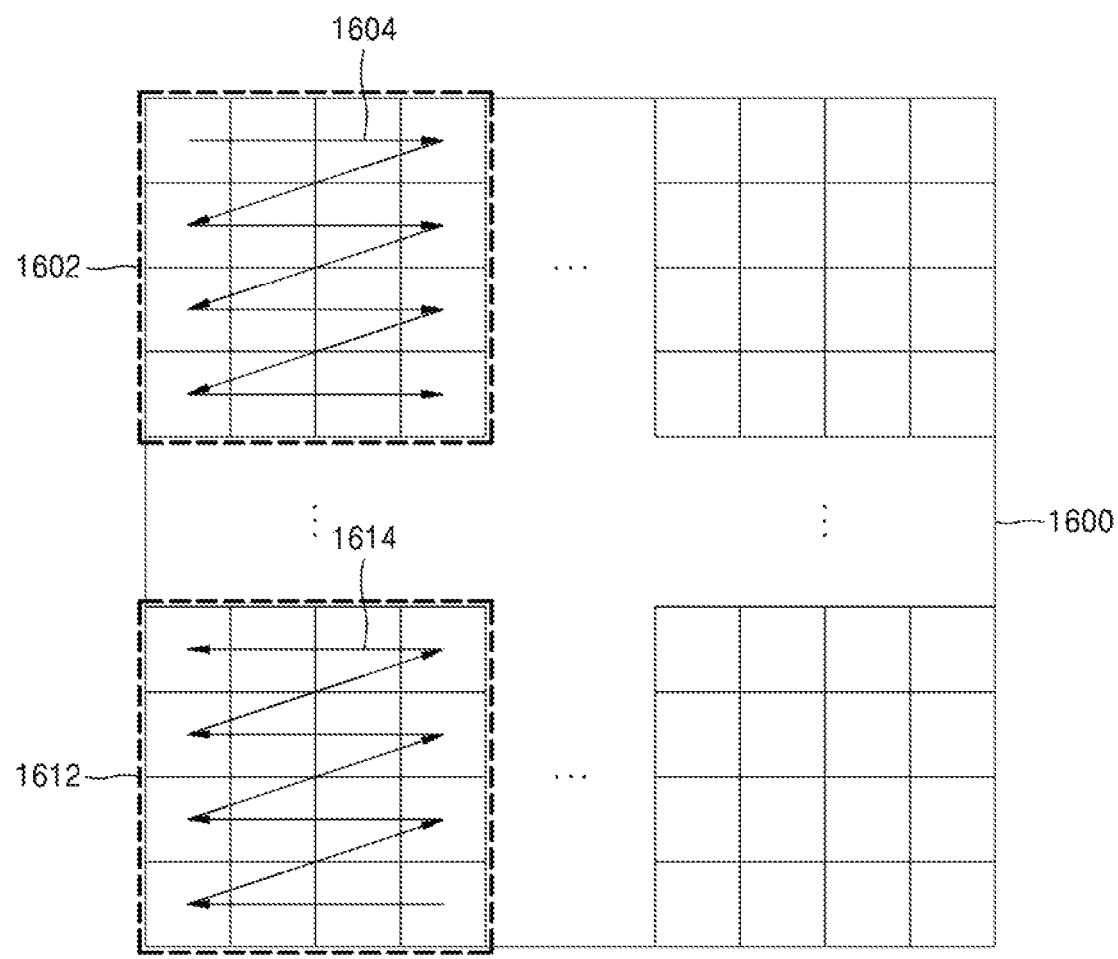
FIG. 16 illustrates a processing block serving as a criterion for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the bitstream obtainer 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, the bitstream obtainer 110 may obtain the processing block size information from the bitstream according to each of the various data units, the image decoding apparatus 100 may determine the size of one or more processing blocks, which are split from the picture, by using the obtained processing block size information, and the size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the bitstream obtainer 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the bitstream obtainer 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or information about a split shape mode indicating a splitting method of the current coding unit, from the bitstream, and may use the obtained information. The block shape information or the information about the split shape mode may be included in the bitstream related to various data units. For example, the image decoding apparatus 100 may use the block shape information or the information about the split shape mode included in a sequence parameter set, a picture parameter set, a video parameter set, a slice header, or a slice segment header. Furthermore, the image decoding apparatus 100 may obtain, from the bitstream, a syntax element corresponding to the block shape information or the information about the split shape mode according to each largest coding unit, each reference coding unit, or each processing block, and may use the obtained syntax element.

Figure 17:
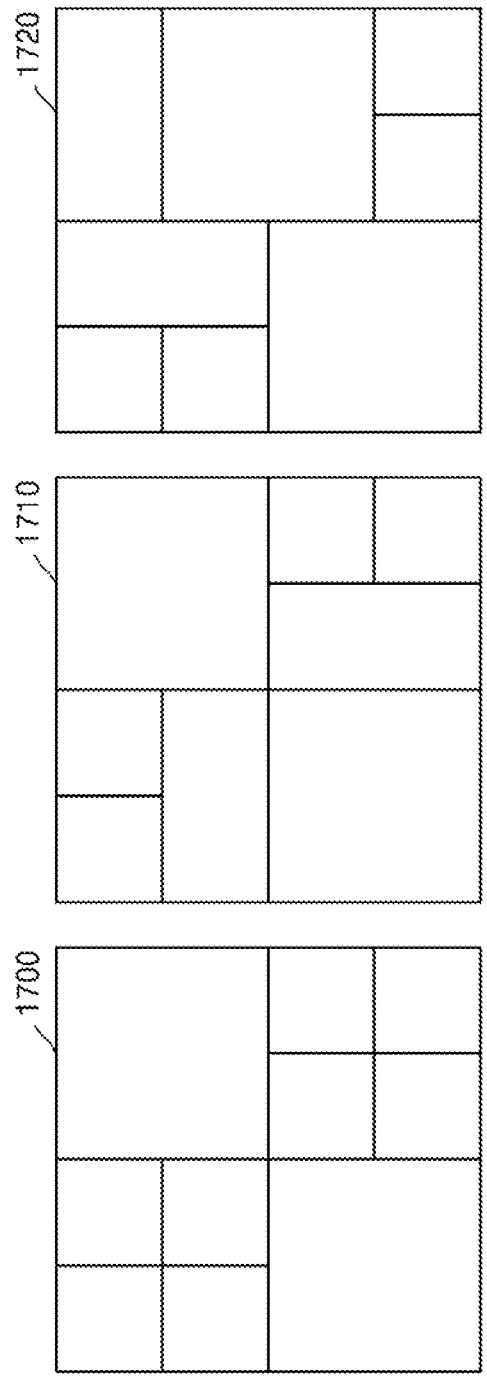
FIG. 17 illustrates coding units determinable per picture when a combination of shapes into which a coding unit is splittable is different per picture, according to an embodiment.

FIG. 17 illustrates coding units determinable per picture when a combination of shapes into which a coding unit is splittable is different per picture, according to an embodiment.

Referring to FIG. 17, the image decoding apparatus 100 may differently determine, per picture, a combination of shapes into which a coding unit is splittable. For example, the image decoding apparatus 100 may decode an image by using a picture that is splittable into 4 coding units, a picture 1710 that is splittable into 2 or 4 coding units, and a picture 1720 that is splittable into 2, 3, or 4 coding units, from among at least one picture included in the image. In order to split the picture 1700 into a plurality of coding units, the image decoding apparatus 100 may use only split shape information indicating that the picture 1700 is split into 4 square coding units. In order to split the picture 1710, the image decoding apparatus 100 may use only split shape information indicating that the picture 1710 is split into 2 or 4 coding units. In order to split the picture 1720, the image decoding apparatus 100 may use only split shape information indicating that the picture 1720 is divided into 2, 3, or 4 coding units. Because such a combination of split shapes is only an embodiment for describing operations of the image decoding apparatus 100, the combination of split shapes should not be interpreted as being limited to the embodiment and various combinations of split shapes may be used according to predetermined data units.

According to an embodiment, the bitstream obtainer 110 of the image decoding apparatus 100 may obtain a bitstream including an index indicating a combination of split shape information according to predetermined data unit units (e.g., sequences, pictures, or slices). For example, the bitstream obtainer 110 may obtain an index indicating a combination of split shape information from a sequence parameter set, a picture parameter set, or a slice header. The image decoding apparatus 100 may determine a combination of split shapes into which a coding unit is splittable according to predetermined data units by using the obtained index, and thus different combinations of split shapes may be used according to predetermined data units.

Figure 18:
FIG. 18 illustrates various shapes of a coding unit determinable based on split shape information representable as a binary code, according to an embodiment.
Figure 18:
Figure 18:
Figure 18:
Figure 18:
Figure 18:
Figure 18:

FIG. 18 illustrates various shapes of a coding unit determinable based on split shape information representable as a binary code, according to an embodiment.

According to an embodiment, the image decoding apparatus 100 may split a coding unit into various shapes by using block shape information and split shape information obtained by the bitstream obtainer 110. Shapes into which a coding unit is splittable may correspond to various shapes including the shapes described through the above embodiments.

Referring to FIG. 18, the image decoding apparatus 100 may split a coding unit having a square shape into at least one direction from among a horizontal direction and a vertical direction and may split a coding unit having a non-square shape in a horizontal direction or a vertical direction, based on split shape information.

According to an embodiment, when the image decoding apparatus 100 is able to split a coding unit having a square shape in a horizontal direction and a vertical direction to obtain four square coding units, the number of split shapes that may be indicated by split shape information about the coding unit having the square shape may be 4. According to an embodiment, split shape information may be represented as a 2-digit binary code, and a binary code may be allocated to each split shape. For example, when a coding unit is not split, split shape information may be represented as (00)b; when a coding unit is split in a horizontal direction and a vertical direction, split shape information may be represented as (01)b; when a coding unit is split in a horizontal direction, split shape information may be represented as (10)b; and when a coding unit is spilt in a vertical direction, split shape information may be represented as (11)b.

According to an embodiment, when the image decoding apparatus 100 splits a coding unit having a non-square shape in a horizontal direction or a vertical direction, types of split shapes that may be indicated by split shape information may be determined according to the number of coding units into which a coding unit is split. Referring to FIG. 18, the image decoding apparatus 100 may split a coding unit having a non-square shape into 3 coding units according to an embodiment. The image decoding apparatus 100 may split a coding unit into two coding units, and in this case, split shape information may be represented as (10)b. The image decoding apparatus 100 may split a coding unit into three coding units, and in this case, split shape information may be represented as (11)b. The image decoding apparatus 100 may determine not to split a coding unit, and in this case, split shape information may be represented as (0)b. That is, in order to use a binary code indicating split shape information, the image decoding apparatus 100 may use variable length coding (VLC), instead of fixed length coding (FLC).

According to an embodiment, referring to FIG. 18, a binary code of split shape information indicating that a coding unit is not split may be represented as (0)b. When a binary code of split shape information indicating that a coding unit is not split is set to (00)b, all 2-bit binary codes of split shape information have to be used despite that there is no split shape information set to (01)b. However, as shown in FIG. 18, when 3 split shapes are used for a coding unit having a non-square shape, the image decoding apparatus 100 may determine not to split a coding unit even by using a 1-bit binary code (0)b as split shape information, thereby efficiently using a bitstream. However, split shapes of a coding unit having a non-square shape, which are indicated by split shape information, should not be interpreted as being limited to 3 shapes shown in FIG. 18 and should be interpreted as being various shapes including the above embodiments.

Figure 19:
FIG. 19 illustrates other shapes of a coding unit determinable based on split shape information representable as a binary code, according to an embodiment.
Figure 19:
Figure 19:
Figure 19:
Figure 19:
Figure 19:
Figure 19:
Figure 19:
Figure 19:

FIG. 19 illustrates other shapes of a coding unit determinable based on split shape information representable as a binary code, according to an embodiment.

Referring to FIG. 19, the image decoding apparatus 100 may split a coding unit having a square shape in a horizontal direction or a vertical direction and may split a coding unit having a non-square shape in a horizontal direction or a vertical direction, based on split shape information. That is, split shape information may indicate that a coding unit having a square shape is split in one direction. In this case, a binary code of split shape information indicating that a coding unit having a square shape is not split may be represented as (0)b. When a binary code of split shape information indicating that a coding unit is not split is set to (00)b, all 2-bit binary codes of split shape information have to be used despite that there is no split shape information set to (01)b. However, as shown in FIG. 19, when 3 split shapes are used for a coding unit having a square shape, the image decoding apparatus 100 may determine not to split a coding unit even by using a 1-bit binary code (0)b as split shape information, thereby efficiently using a bitstream. However, split shapes of a coding unit having a square shape, which are indicated by split shape information, should not be interpreted as being limited to 3 shapes shown in FIG. 19 and should be interpreted as being various shapes including the above embodiments.

According to an embodiment, block shape information or split shape information may be represented by using a binary code, and such information may be immediately generated as a bitstream. Alternatively, block shape information or split shape information representable as a binary code may not be immediately generated in a bitstream and may be used as a binary code input during context adaptive binary arithmetic coding (CABAC).

According to an embodiment, a process, performed by the image decoding apparatus 100, of obtaining syntax about block shape information or split shape information through CABAC will be described. A bitstream including a binary code for the syntax may be obtained by the bitstream obtainer 110. The image decoding apparatus 100 may detect a syntax element indicating the block shape information or the split shape information by de-binarizing a bin string included in the obtained bitstream. According to an embodiment, the image decoding apparatus 100 may obtain a set of binary bin strings corresponding to the syntax element to be decoded and may decode each bin by using probability information, and the image decoding apparatus 100 may repeatedly perform this process until a bin string including such decoded bins is the same as one of pre-obtained bin strings. The image decoding apparatus 100 may determine the syntax element by de-binarizing the bin string.

According to an embodiment, the image decoding apparatus 100 may determine syntax about a bin string by performing a decoding process of adaptive binary arithmetic coding, and may update a probability model for bins obtained by the bitstream obtainer 110. Referring to FIG. 18, the bitstream obtainer 110 of the image decoding apparatus 100 may obtain a bitstream indicating a binary code indicating split shape information according to an embodiment. The image decoding apparatus 100 may determine syntax about the split shape information by using the obtained binary code having a size of 1 bit or 2 bits. In order to determine the syntax about the split shape information, the image decoding apparatus 100 may update a probability of each bit from among the 2 bits of the binary code. That is, the image decoding apparatus 100 may update a probability that may have a value of 0 or 1 when decoding a next bin according to whether a value of a first bin in the 2-bits of the binary code is 0 or 1.

According to an embodiment, while determining the syntax, the image decoding apparatus 100 may update a probability of the bins used in a process of decoding the bins of the bin string for the syntax, and the image decoding apparatus 100 may determine that a specific bit in the bin string has the same probability without updating the probability.

Referring to FIG. 18, while determining syntax by using a bin string indicating split shape information about a coding unit having a non-square shape, the image decoding apparatus 100 may determine the syntax about the split shape information by using one bin having a value of 0 when the coding unit having a non-square shape is not split. That is, when block shape information indicates that a current coding unit has a non-square shape, a first bin of a bin string for the split shape information may be 0 when the coding unit having a non-square shape is not split and may be 1 when the coding unit having a non-square shape is split into two or three coding units. Accordingly, a probability that a first bin of a bin string of split shape information about a coding unit having a non-square shape is 0 may be ⅓, and a probability that the first bin of the bin string of the split shape information about the coding unit having a non-square shape is 1 may be ⅔. As described above, because split shape information indicating that a coding unit having a non-square shape is not split may represent only a bin string of 1 bit having a value of 0, the image decoding apparatus 100 may determine syntax about the split shape information by determining whether a second bin is 0 or 1 only when the first bin of the split shape information is 1. According to an embodiment, when the first bin for the split shape information is 1, the image decoding apparatus 100 may decode a bin by determining that probabilities that the second bin is 0 and 1 are the same.

According to an embodiment, the image decoding apparatus 100 may use various probabilities for each bin while determining a bin of a bin string for split shape information.

According to an embodiment, the image decoding apparatus 100 may differently determine probabilities of bins for split shape information according to a direction of a non-square block. According to an embodiment, the image decoding apparatus 100 may differently determine probabilities of bins for split shape information according to an area or a length of a long side of a current coding unit. According to an embodiment, the image decoding apparatus 100 may differently determine probabilities of bins for split shape information according to at least one from among a shape and a length of a long side of a current coding unit.

According to an embodiment, the image decoding apparatus 100 may determine that probabilities of bins for split shape information are the same with respect to coding units having a predetermined size or more. For example, the image decoding apparatus 100 may determine that probabilities of bins for split shape information are the same with respect to coding units having a size equal to or greater than 64 samples based on a length of a long side of each coding unit.

According to an embodiment, the image decoding apparatus 100 may determine an initial probability of bins constituting a bin string of split shape information based on a slice type (e.g., an I-slice, a P-slice, a B-slice, or the like).

Figure 20:
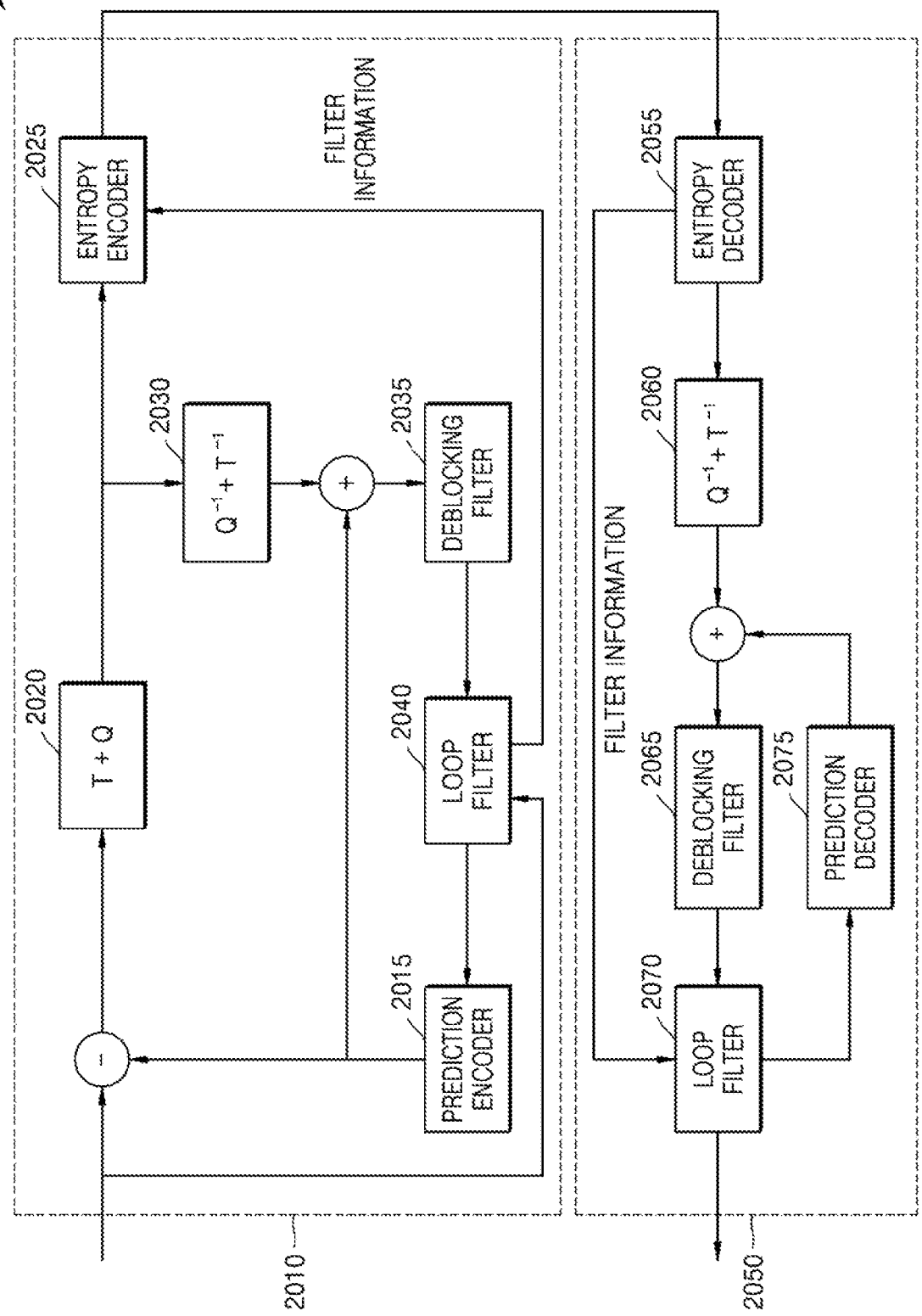
FIG. 20 is a block diagram of an image encoding and decoding system for performing loop filtering.

FIG. 20 is a block diagram of an image encoding and decoding system 2000 for performing loop filtering.

An encoding end 2010 of the image encoding and decoding system 2000 transmits an encoded bitstream of an image, and a decoding end 2050 receives and decodes the bitstream and outputs a reconstruction image. The encoding end 2010 may have a configuration similar to that of an image encoding apparatus 200 which will be described below, and the decoding end 2050 may have a configuration similar to that of the image decoding apparatus 100.

In the encoding end 2010, a prediction encoder 2015 outputs a reference image through inter prediction and intra prediction, and a transformer and quantizer 2020 quantizes residual data between the reference image and a current input image into a quantized transform coefficient and outputs the quantized transform coefficient. An entropy encoder 2025 encodes and transforms the quantized transform coefficient into a bitstream and outputs the bitstream. The quantized transform coefficient is reconstructed as data in a spatial domain by a de-quantizer and inverse converter 2030, and the reconstructed data in the spatial domain is output as a reconstruction image through a deblocking filter 2035 and a loop filter 2040. The reconstruction image may be used as a reference image of a next input image through the prediction encoder 2015.

Encoded image data from among the bitstream received by the decoding end 2050 is reconstructed as residual data in a spatial domain through an entropy decoder 2055 and a de-quantizer and inverse converter 2060. Image data in a spatial domain is formed as the residual data and a reference image output from a prediction decoder 2075 are combined, and a deblocking filter 2065 and a loop filter 2070 may filter the image data in the spatial domain and may output a reconstruction image for a current original image. The reconstruction image may be used as a reference image for a next original image by the prediction decoder 2075.

The loop filter 2040 of the encoding end 2010 performs loop filtering by using filter information input according to a user input or a system setting. The filter information used by the loop filter 2040 is output to the entropy encoder 2025, and is transmitted along with the encoded image data to the decoding end 2050. The loop filter 2070 of the decoding end 2050 may perform loop filtering based on the filter information input from the decoding end 2050.

Figure 21:
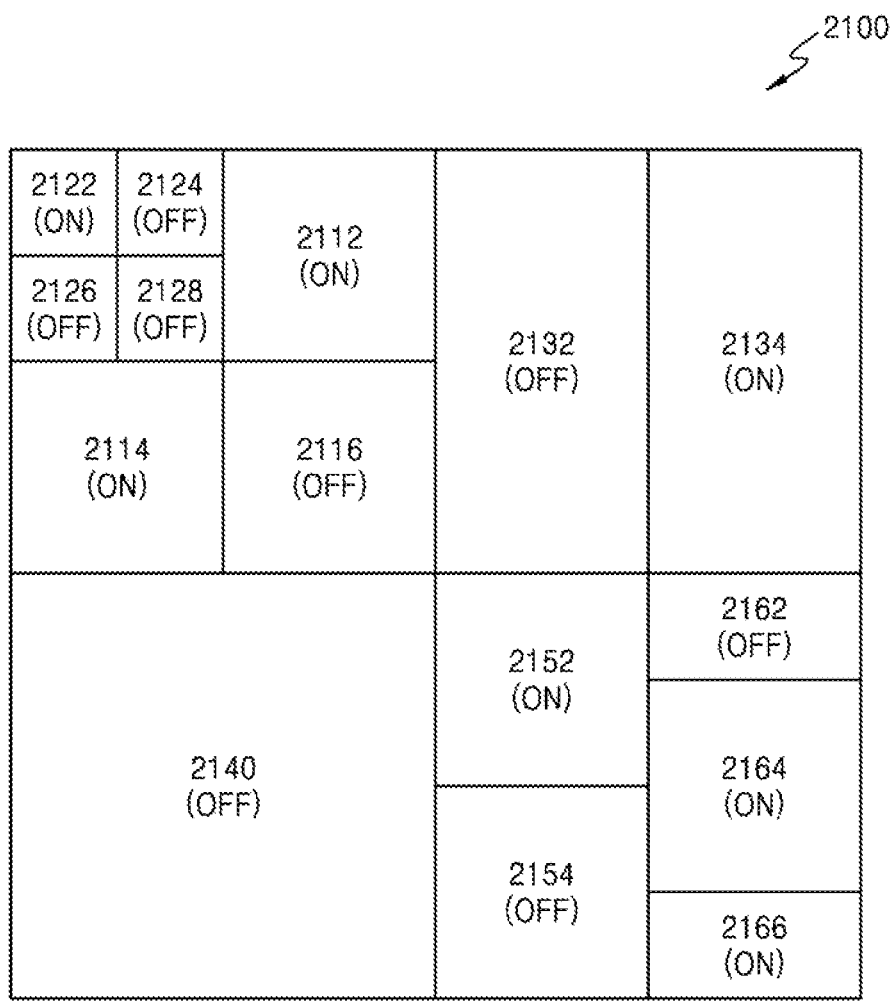
FIG. 21 illustrates an example of filtering units included in a largest coding unit and filtering performance information of a filtering unit, according to an embodiment.
Figure 22:
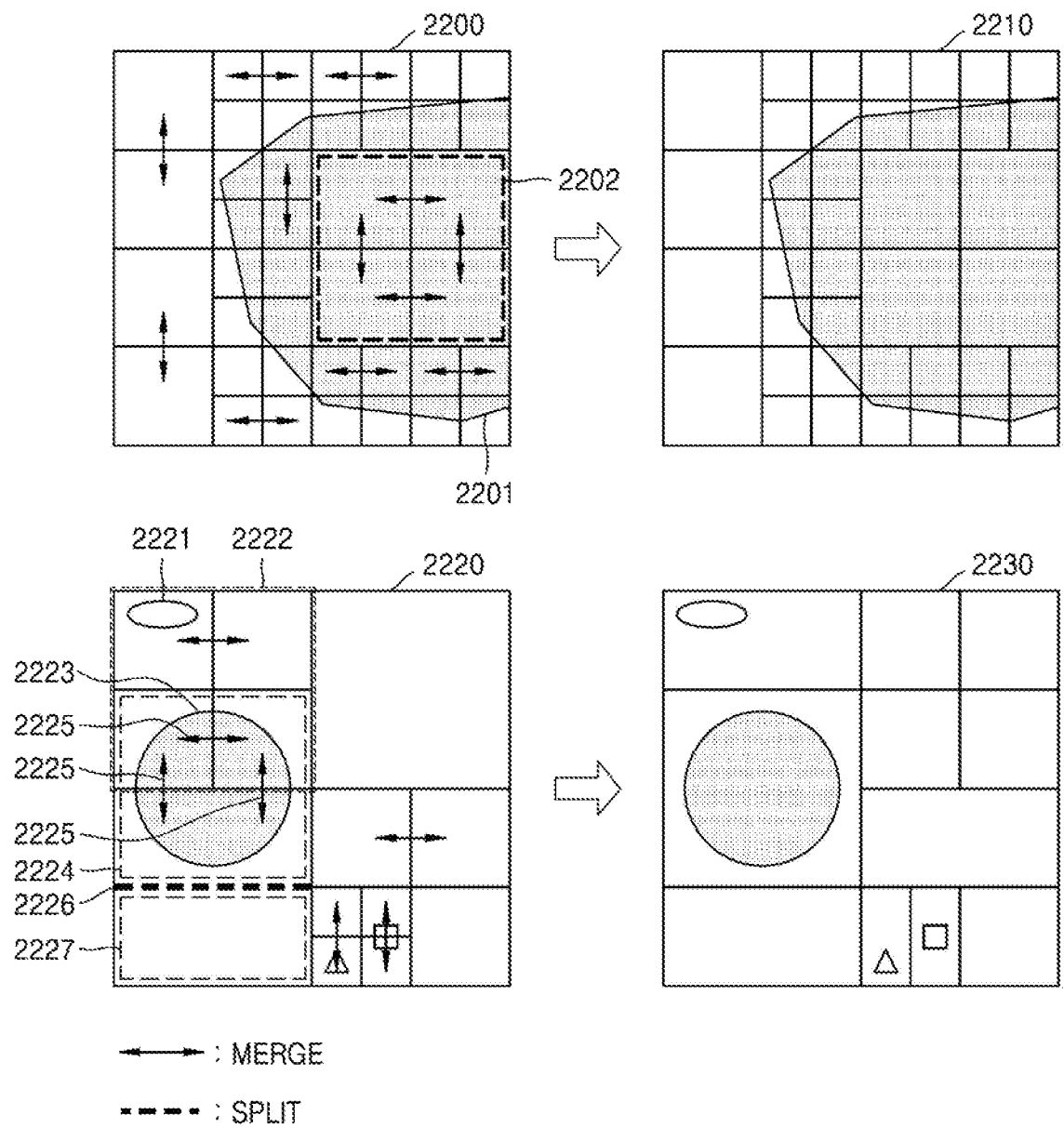
FIG. 22 illustrates a process of performing merging or splitting between coding units determined according to a predetermined encoding method, according to an embodiment.

FIG. 21 illustrates an example of filtering units included in a largest coding unit and filtering performance information of a filtering unit, according to an embodiment.

When filtering units of the loop filter 2040 of the encoding end 2010 and the loop filter 2070 of the decoding end 2050 include data units similar to coding units according to an embodiment described with reference to FIGS. 3 through 5, filter information may include block shape information and split shape information of a data unit for indicating a filtering unit, and loop filtering performance information indicating whether loop filtering is performed on the filtering unit.

Filtering units included in a largest coding unit 2100 according to an embodiment may have the same block shape and split shape as coding units included in the largest coding unit 2100. Also, the filtering units included in the largest coding unit 2100 according to an embodiment may be split based on sizes of the coding units included in the maximum coding units 2100. Referring to FIG. 21, for example, the filtering units may include a filtering unit 2140 having a square shape and a depth of D, filtering units 2132 and 2134 having a non-square shape and a depth of D, filtering units 2112, 2114, 2116, 2152, 2154, and 2164 having a square shape and a depth of D+1, filtering units 2162 and 2166 having a non-square shape and a depth of D+1, and filtering units 2122, 2124, 2126, and 2128 having a square shape and a depth of D+2.

The block shape information, the split shape information (depth), and the loop filtering performance information of the filtering units included in the largest coding unit 2100 may be encoded as shown in Table 1.

TABLE 1

| Depth | Block shape information | loop filtering performance information |
|---|---|---|
| D | 0: SQUARE | 0(2140) |
|   | 1: NS_VER | 0(2132), 1(2134) |
|   | 2: NS_HOR |   |
| D + 1 | 0: SQUARE | 1(2112), 1(2114), 0(2116), 1(2152), 0(2154), 1(2164) |
|   | 1: NS_VER |   |
|   | 2: NS_HOR | 0(2162), 1(2166) |
| D + 2 | 0: SQUARE | 1(2122), 0(2124), 0(2126), 0(2128) |
|   | 1: NS_VER |   |
|   | 2: NS_HOR |   |

A process of determining a plurality of coding units by recursively splitting a coding unit according to block shape information and block split information according to an embodiment is the same as that described with reference to FIG. 13. Loop filtering performance information of filtering units according to an embodiment indicates that loop filtering is performed on the filtering units when a flag value is 1, and indicates that loop filtering is not performed on the filtering units when a flag value is 0. Referring to Table 1, information of data units for determining filtering units to be filtered by the loop filters 2040 and 2070 may all be encoded and transmitted as filter information.

Because coding units configured according to an embodiment are coding units configured to minimize an error with an original image, it is expected to have a high spatial correlation in the coding units. Accordingly, because a filtering unit is determined based on a coding unit according to an embodiment, an operation of determining a filtering unit, separate from determining of a coding unit, may be omitted. Also, accordingly, because a filtering unit is determined based on a coding unit according to an embodiment and thus information for determining a split shape of the filtering unit may be omitted, a transfer bit rate of filter information may be saved.

Although it is described in the above embodiments that a filtering unit is determined based on a coding unit according to an embodiment, a filtering unit may be split based on a coding unit until an arbitrary depth, and thus a shape of the filtering unit may be determined up to only the arbitrary depth.

The determining of a filtering unit described in the above embodiments may be applied not only to loop filtering but also to various embodiments such as deblocking filtering and adaptive loop filtering.

According to an embodiment, the image decoding apparatus 100 may split a current coding unit by using at least one of block shape information and split shape information, and the block shape information may be predetermined to indicate using only a square shape and the split shape information may be predetermined to indicate that the current coding unit is not split or split into 4 square coding units. That is, coding units of the current coding unit may always have a square shape according to the block shape information and the current coding unit may not be split or split into 4 square coding units based on the split shape information. The image decoding apparatus 100 may obtain, by using the bitstream obtainer 110, a bitstream generated by using a predetermined encoding method that is predetermined to only use such block shapes and split shapes, and the image decoding apparatus 100 may use only the predetermined block shapes and split shapes. In this case, because the image decoding apparatus 100 may solve a compatibility problem with the predetermined encoding method by using a predetermined decoding method similar to the predetermined encoding method. According to an embodiment, when the image decoding apparatus 100 uses the predetermined decoding method using only the predetermined block shapes and split shapes from among various shapes that may be indicated by the block shape information and the split shape information, the block shape information only indicates a square shape, and thus the image decoding apparatus 100 may not perform a process of obtaining the block shape information from the bitstream. Syntax indicating whether to use the predetermined decoding method may be used, and such syntax may be obtained from the bitstream according to data units having various shapes that may include a plurality of coding units such as sequences, pictures, slice units, and largest coding units. That is, the bitstream obtainer 110 may determine whether syntax indicating the block shape information is to be obtained from the bitstream based on syntax indicating whether the predetermined decoding method is used.

Figure 23:
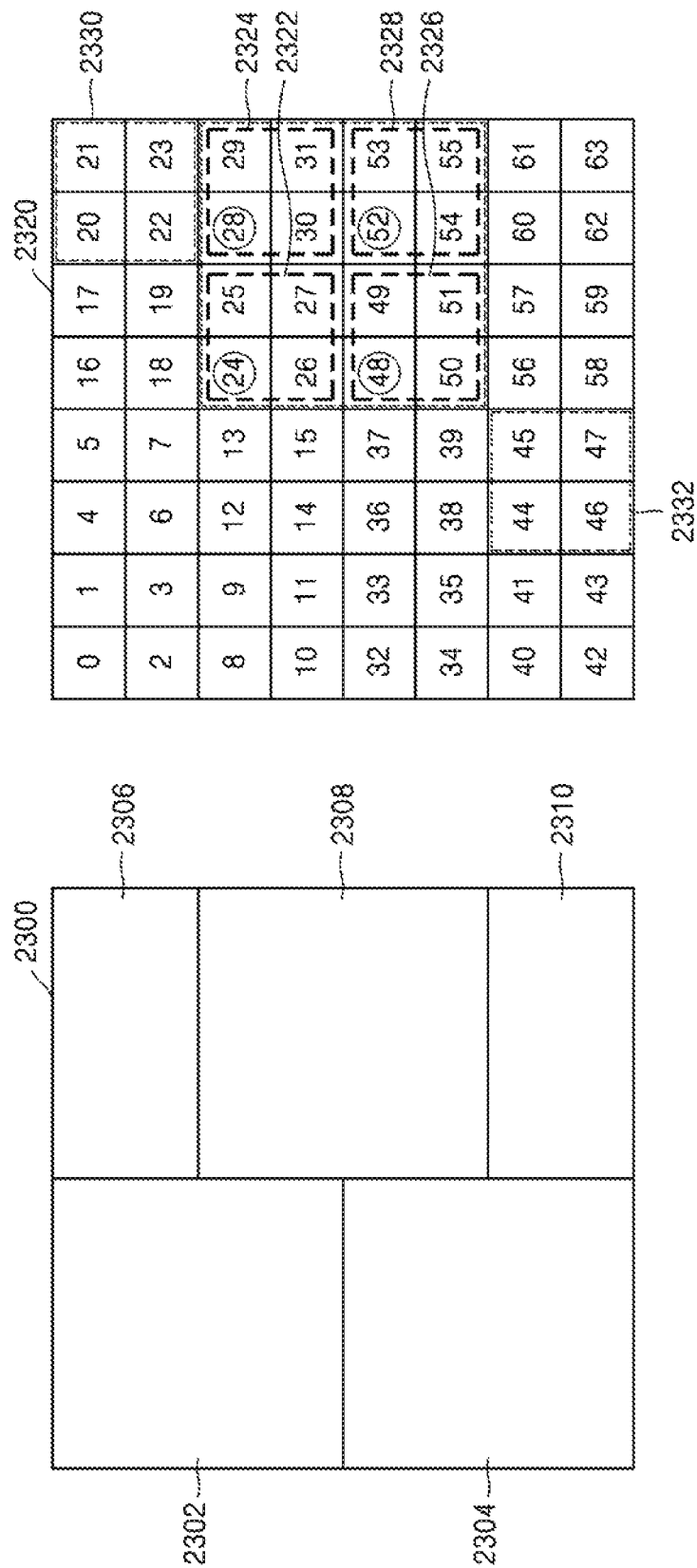
FIG. 23 illustrates an index according to a Z-scan order of a coding unit, according to an embodiment.

FIG. 23 illustrates an index according to a Z-scan order of a coding unit according to an embodiment.

The image decoding apparatus 100 according to an embodiment may scan lower data units included in an upper data unit according to a Z-scan order. Also, the image decoding apparatus 100 according to an embodiment may sequentially access data according to a Z-scan index in a coding unit included in a processing block or a largest coding unit.

The image decoding apparatus 100 according to an embodiment may split a reference coding unit into at least one coding unit as described with reference to FIGS. 13 and 14. In this case, coding units having a square shape and coding units having a non-square shape may co-exist in the reference coding unit. The image decoding apparatus 100 according to an embodiment may access data according to a Z-scan index included in each coding unit in the reference coding unit. In this case, a method of applying a Z-scan index may vary according to whether a coding unit having a non-square shape exists in the reference coding unit.

According to an embodiment, when a coding unit having a non-square shape does not exist in the reference coding unit, coding units of a lower depth in the reference coding unit may have continuous Z-scan indices. For example, according to an embodiment, a coding unit of an upper depth may include four coding units of a lower depth. Boundaries of the four coding units of the lower depth may be continuous, and the coding units of the lower depth may be scanned in a Z-scan order according to indices indicating the Z-scan order. The indices indicating the Z-scan order according to an embodiment may be set to numbers that increase according to the Z-scan order for the coding units. In this case, deeper coding units of the same depth may be scanned according to the Z-scan order.

According to an embodiment, when at least one coding unit having a non-square shape exists in the reference coding unit, the image decoding apparatus 100 may split each of the coding units in the reference coding unit into sub-blocks, and may scan the split sub-blocks according to the Z-scan order. For example, when a coding unit having a non-square shape in a vertical direction or a horizontal direction exists in the reference coding unit, Z-scan may be performed by using split sub-blocks. Also, for example, when the reference coding unit is split into an odd number of coding units, Z-scan may be performed by using sub-blocks. A sub-block is a coding unit that is no longer split or a coding unit obtained by splitting an arbitrary coding unit, and may have a square shape. For example, four sub-blocks having a square shape may be split from a coding unit having a square shape. Also, for example, two sub-blocks having a square shape may be split from a coding unit having a non-square shape.

Referring to FIG. 23, for example, the image decoding apparatus 100 according to an embodiment may scan coding units 2302, 2304, 2306, 2308, and 2310 of a lower depth in a coding unit 2300 according to a Z-scan order. The coding unit 2300 and the coding units 2302, 2304, 2306, 2308, and 2310 are respectively an upper coding unit and lower coding units. The coding unit 2300 includes the coding units 2306 and 2310 having a non-square shape in a horizontal direction. The coding units 2306 and 2310 having a non-square shape have discontinuous boundaries with the coding units 2302 and 2304 that are adjacent to each other and have a square shape. Also, the coding unit 2308 has a square shape, and is a coding unit at the center when a coding unit having a non-square shape is split into an odd number of coding units. Like the coding units 2306 and 2310 having a non-square shape, the coding unit 2308 has discontinuous boundaries with the coding units 2302 and 2304 that are adjacent to each other and have a square shape. When the coding unit 2300 includes the coding units 2306 and 2310 having a non-square shape or the coding unit 2308 located at the center when a coding unit having a non-square shape is split into an odd number of coding units, because adjacent boundaries between coding units are discontinuous, continuous Z-scan indices may not be set. Accordingly, the image decoding apparatus 100 may continuously set Z-scan indices by splitting coding units into sub-blocks. Also, the image decoding apparatus 100 may perform continuous Z-scan on the coding units 2306 and 2310 having a non-square shape or the coding unit 2308 located at the center of an odd number of coding units having a non-square shape.

A coding unit 2320 of FIG. 23 is obtained by splitting the coding units 2302, 2304, 2306, 2308, and 2310 in the coding unit 2300 into sub-blocks. Because a Z-scan index may be set for each of the sub-blocks and adjacent boundaries between the sub-blocks are continuous, the sub-blocks may be scanned according to a Z-scan order. For example, in a decoding apparatus according to an embodiment, the coding unit 2308 may be split into sub-blocks 2322, 2324, 2326 and 2328. In this case, the sub-blocks 2322 and 2324 may be scanned after data processing is performed on a sub-block 2330, and the sub-blocks 2326 and 2328 may be scanned after data processing is performed on a sub-block 2332. Also, the sub-blocks may be scanned according to the Z-scan order.

In the above embodiments, data units are scanned according to a Z-scan order for data storage, data loading, and data accessing.

Also, in the above embodiments, although data units may be scanned according to a Z-scan order, a scan order of data units may be one of various orders such as a raster scan order, an N-scan order, an up-right diagonal scan order, a horizontal scan order, and a vertical scan order, and should not be limited to the Z-scan order.

Also, in the above embodiments, although coding units in a reference coding unit are scanned, the present disclosure is not limited thereto and a target to be scanned may be an arbitrary block in a processing block or a largest coding unit.

Also, in the above embodiments, although a block is split into sub-blocks and scanning is performed according to a Z-scan order only when at least one block having a non-square shape exists, a block may be split into sub-blocks and scanning may be performed according to a Z-scan order even when a block having a non-square shape does not exist for a simplified embodiment.

The image decoding apparatus 100 according to an embodiment may generate prediction data by performing inter prediction or intra prediction on a coding unit, may generate residual data by performing inverse transformation on a transform unit included in a current coding unit, and may reconstruct the current coding unit by using the generated prediction data and the residual data.

A prediction mode of a coding unit according to an embodiment may be at least one of an intra mode, an inter mode, and a skip mode. According to an embodiment, a prediction mode may be independently selected according to coding units.

When a coding unit having a 2N×2N shape is split into two coding units having a 2N×N shape or a N×2N shape according to an embodiment, inter mode prediction and intra mode prediction may be separately performed on each coding unit. Also, a skip mode may be applied to the coding units having the 2N×N or N×2N shape according to an embodiment.

The image decoding apparatus 100 according to an embodiment may allow performing bi-prediction in a skip mode of a coding unit having a 8×4 or 4×8 shape. Because only skip mode information about a coding unit is received in a skip mode, the use of residual data for the coding unit is omitted. Accordingly, in this case, an overhead of de-quantization and inverse transformation may be reduced. Instead, the image decoding apparatus 100 according to an embodiment may allow performing bi-prediction on a coding unit to which a skip mode is applied, thereby improving decoding efficiency. Also, the image decoding apparatus 100 according to an embodiment may set an interpolation tap number to a relatively small value during motion compensation while allowing performing bi-prediction on a coding unit having a 8×4 or 4×8 shape, thereby efficiently using a memory bandwidth. For example, an interpolation filter having a tap number less than 8 (e.g., a 2-tap interpolation filter), instead of an 8-tap interpolation filter, may be used.

Also, the image decoding apparatus 100 according to an embodiment may signal intra or inter prediction information about each region included in a current coding unit by splitting the region into a pre-set shape (e.g., diagonal-based split).

The image decoding apparatus 100 according to an embodiment may obtain a prediction sample of a current coding unit using an intra mode by using adjacent samples of the current coding unit. In this case, intra prediction is performed by using adjacent samples that are pre-reconstructed, and the samples are referred to as reference samples.

Figure 24:
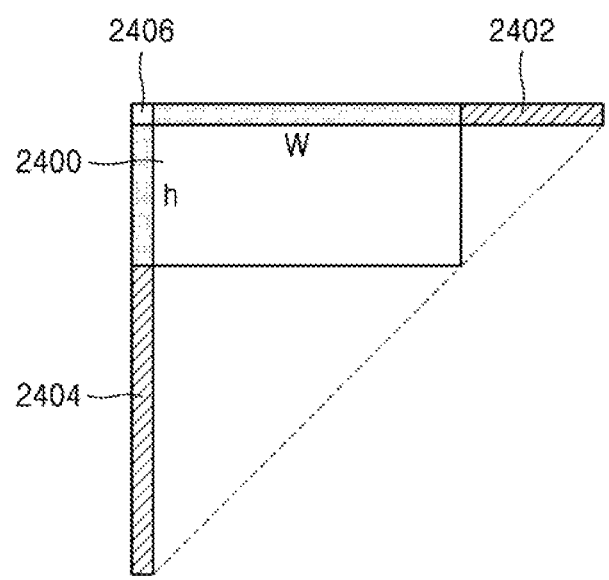
FIG. 24 is a diagram of a reference sample for intra prediction of a coding unit, according to an embodiment.

FIG. 24 is a diagram of a reference sample for intra prediction of a coding unit, according to an embodiment. Referring to FIG. 24, for a coding unit 2400 where a block shape is a non-square shape, a length in a horizontal direction is w, and a length in a vertical length is h, w+h upper reference samples 2402, w+h left reference samples 2404, and one upper left reference sample 2406 are required, that is, the total number of 2(w+h)+1 reference samples are required. In order to prepare a reference sample, padding may be performed on a part where the reference sample does not exist, and a reference sample filtering process may be performed for each prediction mode to reduce a quantization error included in a reconstructed reference sample.

Although the number of reference samples when a block shape of a current coding unit is a non-square shape has been described in the above embodiments, the number of reference samples is equally applied even when a current coding unit is a rectangular shape.

The above various embodiments describe an operation related to an image decoding method performed by the image decoding apparatus 100. An operation of the image encoding apparatus 200 for performing an image encoding method corresponding to a reverse order process of the image decoding method will be described through various embodiments.

Figure 2:
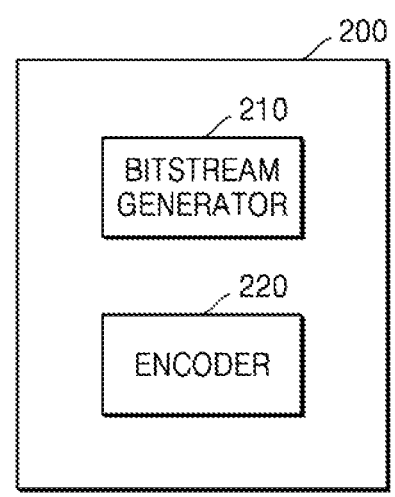
FIG. 2 is a block diagram of an image encoding apparatus for encoding an image based on at least one from among block shape information and split shape information, according to an embodiment.

FIG. 2 is a block diagram of the image encoding apparatus 200 for encoding an image based on at least one from among block shape information and split shape information, according to an embodiment.

The image encoding apparatus 200 may include an encoder 220 and a bitstream generator 210. The encoder 220 may receive an input image and may encode the input image. The encoder 220 may encode the input image and may obtain at least one syntax element. The syntax element may include at least one from among skip flag, prediction mode, motion vector difference, motion vector prediction method (or index), transform quantized coefficient, coded block pattern, coded block flag, intra prediction mode, direct flag, merge flag, delta QP, reference index, prediction direction, and transform index. The encoder 220 may determine a context model based on block shape information including at least one from among a ratio or a size of a shape, a direction, a width, and a height of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of a coding unit. For example, the coding unit may have a square shape or a non-square shape, and information indicating the shape may be included in the block shape information.

According to an embodiment, the encoder 220 may determine which shape the coding unit is to be split into. The encoder 220 may determine a shape of at least one coding unit included in the coding unit, and the bitstream generator 210 may generate the bitstream including split shape information including information about the shape of the coding unit.

According to an embodiment, the encoder 220 may determine whether the coding unit is split or not split. When the encoder determines that only one coding unit is included in the coding unit or the coding unit is not split, the bitstream generator 210 may generate the bitstream including the split shape information indicating that the coding unit is not split. Also, the encoder 220 may split the coding unit into a plurality of coding units, and the bitstream generator 210 may generate the bitstream including the split shape information indicating that the coding unit is split into the plurality of coding units.

According to an embodiment, information indicating the number of coding units into which the coding unit is to be split or a direction in which the coding unit is to be split may be included in the split shape information. For example, the split shape information may indicate that the coding unit is split in at least one direction from among a vertical direction and a horizontal direction or is not split.

The image encoding apparatus 200 determines information about a split shape mode based on the split shape mode of the coding unit. The image encoding apparatus 200 determines the context model based on at least one from among the ratio or the size of the shape, the direction, the width, and the height of the coding unit. The image encoding apparatus 200 generates the information about the split shape mode for splitting the coding unit based on the context model as the bitstream.

In order to determine the context model, the image encoding apparatus 200 may obtain an arrangement for corresponding at least one from among the ratio or the size of the shape, the direction, the width, and the height of the coding unit to an index for the context model. The image encoding apparatus 200 may obtain the index for the context model based on at least one from among the ratio or the size of the shape, the direction, the width, and the height of the coding unit in the arrangement. The image encoding apparatus 200 may determine the context model based on the index for the context model.

In order to determine the context model, the image encoding apparatus 200 may determine the context model further based on block shape information including at least one from among a ratio or a size of a shape, a direction, a width, and a height of a neighboring coding unit adjacent to the coding unit. Also, the neighboring coding unit may include at least one from among coding units located at a left lower side, a left side, a left upper side, an upper side, a right upper side, a right side, or a right lower side of the coding unit.

Also, in order to determine the context model, the image encoding apparatus 200 may compare a length of a width of an upper neighboring coding unit with a length of the width of the coding unit. Also, the image encoding apparatus 200 may compare a length of a height of left and right neighboring coding units with a length of the height of the coding unit. Also, the image encoding apparatus 200 may determine the context model based on comparison results.

An operation of the image encoding apparatus 200 is similar to an operation of the image decoding apparatus 100 described with reference to FIGS. 13 through 34, and thus a detailed explanation thereof is not provided here.

Hereinafter, an apparatus and method of decoding a motion vector and an apparatus and method of encoding a motion vector according to an embodiment are described with reference to FIGS. 25 through 36.

Figure 25:
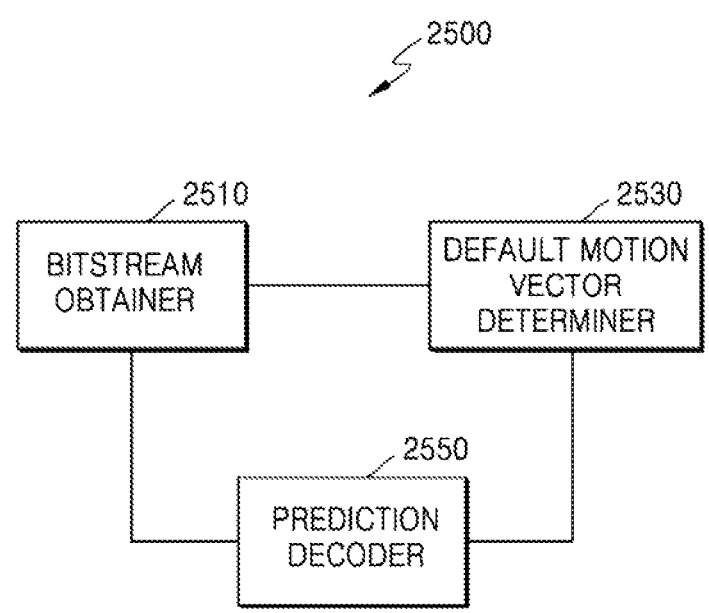
FIG. 25 is a block diagram illustrating a configuration of a motion vector decoding apparatus according to an embodiment.

FIG. 25 is a block diagram illustrating a configuration of a motion vector decoding apparatus 2500, according to an embodiment.

Referring to FIG. 25, the motion vector decoding apparatus 2500 according to an embodiment may include a bitstream obtainer 2510, a default motion vector determiner 2530, and a prediction decoder 2550.

The motion vector decoding apparatus 2500 may be included in the image decoding apparatus 100 described above. For example, the bitstream obtainer 2510 may be included in the bitstream obtainer 110 of the image decoding apparatus 100 illustrated in FIG. 1 and the default motion vector determiner 2530 and the prediction decoder 2550 may be included in the decoder 120 of the image decoding apparatus 100.

In image encoding and decoding, inter prediction refers to a prediction method using a similarity between a current image and another image. A reference block similar to a current block of the current image is detected from a reference image that is decoded earlier than the current image, and a distance between coordinates of the current block and the reference block is represented by using a motion vector. Also, a difference of pixel values between the current block and the reference block may be represented as residual data. Accordingly, information output via inter prediction of the current block is not image information of the current block, but may be an index, a motion vector, and residual data indicating the reference block, thereby improving encoding and decoding efficiency.

The motion vector decoding apparatus 2500 may determine a motion vector for reconstructing a current block encoded by using inter prediction.

A type of a block may be a square shape or a rectangular shape, or may be an arbitrary geometrical shape. A block according to an embodiment is not limited to a data unit of a certain size, and may include a largest coding unit, a coding unit, a prediction unit, and a transform unit from among coding units according to a tree structure.

The bitstream obtainer 2510 may obtain a bitstream including information for decoding an image. According to a prediction mode of a current block, the bitstream may include information about at least one of a residual motion vector, a prediction motion vector, whether or not a default motion vector (MV) is determined, a prediction direction (unidirectional prediction or bidirectional prediction), a reference image index, and a motion vector resolution.

The default motion vector determiner 2530 may determine a default motion vector (hereinafter, a default MV) of the current block.

The default MV may be used to determine a prediction motion vector of the current block. For example, in a method of determining a prediction motion vector (PMV) of a current block by using an MV of at least one PMV candidate block, when there is a PMV candidate block having no availability of an MV from among the at least one PMV candidate block, the PMV of the current block may be determined by using a default MV.

In other words, the default MV may be a spare MV for an MV of the PMV candidate block used for determining the PMV of the current block.

The default motion vector determiner 2530 may determine one default MV or a plurality of default MVs based on an MV of a plurality of default MV candidate blocks associated with the current block.

Positions or the number of the plurality of default MV candidate blocks may be predetermined in the default motion vector determiner 2530. The plurality of default MV candidate blocks may include previously decoded spatial blocks and/or previously decoded temporal blocks associated with the current block. The spatial blocks may include at least one block spatially adjacent to the current block. The temporal blocks may include a block located at the same position as the current block in a reference image having a picture order count (POC) different from a POC of the current block, and at least one block spatially adjacent to the block located at the same position.

Figure 29:
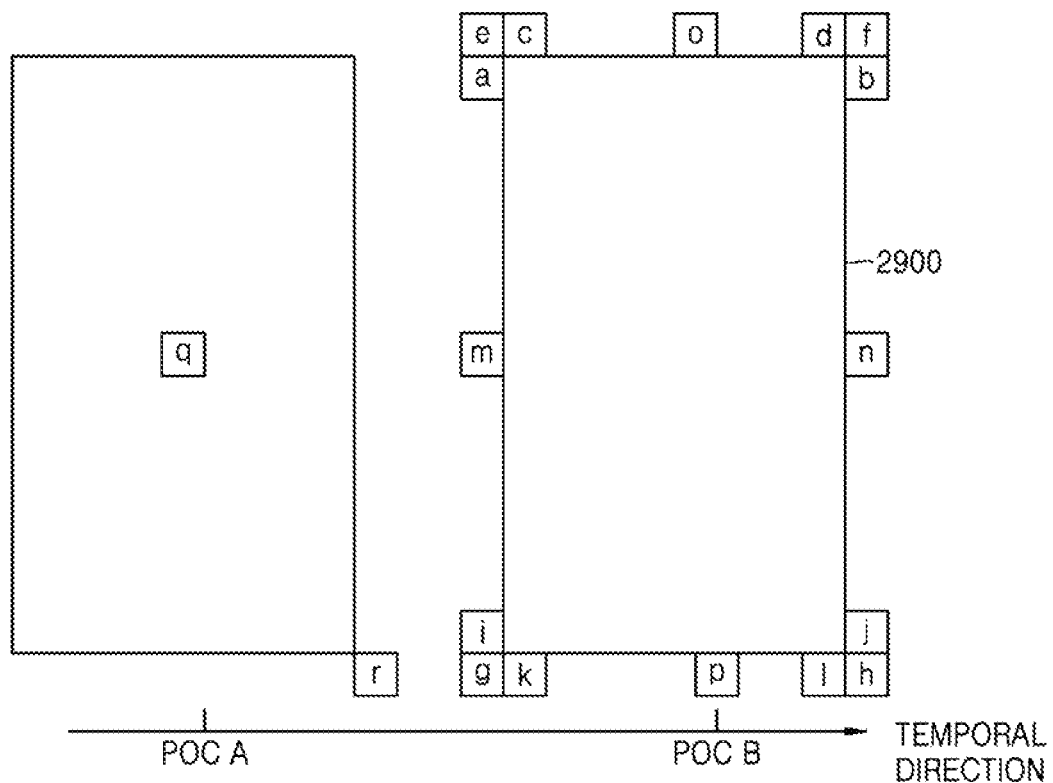
FIG. 29 is a diagram illustrating spatial blocks and temporal blocks associated with a current block.

FIG. 29 illustrates spatial blocks and temporal blocks associated with a current block 2900. Referring to FIG. 29, the spatial blocks spatially associated with the current block 2900 may include a left upper block a, a right upper block b, an upper left block c, an upper right block d, a left upper outer block e, a right upper outer block f, a left lower outer block g, a right lower outer block h, a left lower block i, a right lower block j, a lower left block k, a lower right block l, a left block m, a right block n, an upper block o, and a lower block p. Also, the temporal blocks temporally associated with the current block 2900 may include a same position block q included in a reference frame having a POC different from a POC of the current block 2900 and an adjacent block r adjacent to the same position block q. The spatial blocks and the temporal blocks associated with the current block 2900 illustrated in FIG. 29 are examples, and the plurality of default MV candidate blocks may include at least some of the blocks illustrated in FIG. 29.

The default motion vector determiner 2530 may determine a default MV of the current block by using at least some of MVs of the plurality of default MV candidate blocks.

Figure 30:
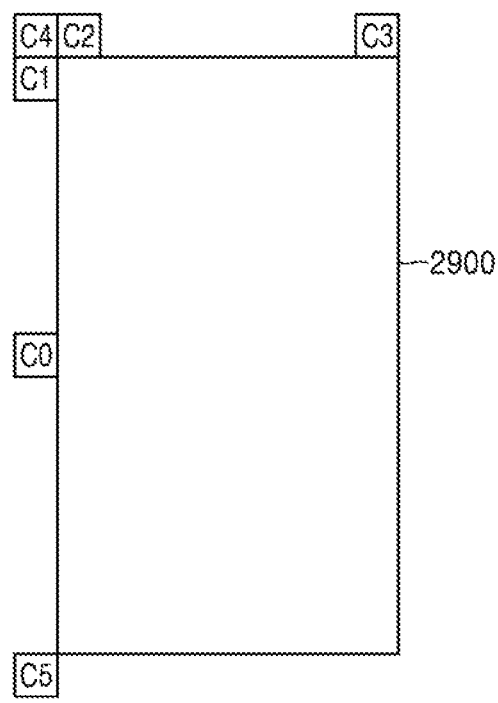
FIG. 30 is a diagram illustrating default motion vector (MV) candidate blocks for determining a default MV.

FIG. 30 illustrates default MV candidate blocks for determining a default MV.

Referring to FIG. 30, the default MV candidate blocks may include a left block C0, a left upper block C1, an upper left block C2, an upper right block C3, a left upper outer block C4, and a left lower outer block C5, with respect to the current block 2900. However, the number or the positions of the illustrated default MV candidate bocks are examples and may be variously modified within a range obvious to one of ordinary skill in the art.

According to an embodiment, the default motion vector determiner 2530 may set a priority order with respect to the default MV candidate blocks and may determine whether or not there is an MV with respect to each of the default MV candidate blocks according to the priority order. The default motion vector determiner 2530 may determine, according to an order in which it is identified that an MV exists, the MV of the default MV candidate block as the default MV. The priority order may be predetermined in the default motion vector determiner 2530 or the default motion vector determiner 2530 may determine the priority order in a certain manner.

The default motion vector determiner 2530 may determine whether or not each default MV candidate block has an MV according to the priority order and may determine the MV of the default MV candidate block for which the availability of the MV is first identified, as the default MV.

Also, the default motion vector determiner 2530 may determine whether or not the MV exists with respect to each default MV candidate block according to the priority order, and may determine the MVs of the plurality of default MV candidate blocks as a plurality of default MVs according to the order in which it is identified that the MV exists with respect to the default MV candidate block.

For example, it may be assumed that the priority order is set in an order of the block C0 to the block C5 and that MVs exist in the blocks C1, C2, and C4. When the default motion vector determiner 2530 is to determine one default MV, the default motion vector determiner 2530 may determine the MV of the block C1 having the MV and the highest priority order, as the default MV. Also, when the default motion vector determiner 2530 is to determine two default MVs, the default motion vector determiner 2530 may determine the MV of the block C1 having the MV and the highest priority order and the MV of the block C2 having the second highest priority order, as the two default MVs.

The default motion vector determiner 2530 may change the priority order that is set with respect to the plurality of default MV candidate blocks by comparing a reference image index of the current block with a reference image index of the plurality of default MV candidate blocks. For example, the default motion vector determiner 2530 may increase the priority order of a default MV candidate block having a reference image index that is the same as the reference image index of the current block. When there are a plurality of default MV candidate blocks having the same reference image index as the current block, an order among the plurality of default MV candidate blocks may comply with the predetermined priority order.

For example, when the priority order is set in an order of the block C0 to the block C5 and a reference image index of only the block C5 is the same as the reference image index of the current block, the priority order of the block C5 may be changed to be the first. Accordingly, the priority order may be changed to have an order of the block C5, C0, C1, C2, C3, and C4. Also, for example, when the priority order is set in the order of the block C0 to the block C5 and a reference image index of the block C4 and the reference image index of the block C5 are the same as the reference image index of the current block, the priority orders of the blocks C4 and C5 may be increased. In addition, the priority order may be changed in an order of the blocks C4, C5, C0, C1, C2, and C34 such that the priority order of the block C4 is higher than the priority order of the block C5 according to the initial priority order.

According to an embodiment, the default motion vector determiner 2530 may determine whether or not the reference image index of each default MV candidate block is the same as the reference image index of the current block according to the priority order and may determine the MV of at least one default MV candidate block as at least one default MV according to an order in which it is determined that the reference image index is the same as the reference image index of the current block. When there is no default MV candidate block having the same reference image index as the current block, the default motion vector determiner 2530 may determine whether each default MV candidate block has an MV according to the priority order and may determine the MV of at least one default MV candidate block as at least one default MV, according to the order in which it is identified that the MV exists.

According to an embodiment, the default motion vector determiner 2530 may determine the MVs of one more default MV candidate blocks having the same reference image index as the current block as one or more default MVs, regardless of whether or not the priority order is set.

Also, according to an embodiment, the default motion vector determiner 2530 may select a predetermined number of default MV candidate blocks based on a size of the MVs of the default MV candidate blocks, and may determine each of the MVs of the selected default MV candidate blocks as the default MV. For example, the default motion vector determiner 2530 may select a predetermined number of default MV candidate blocks based on an order in which the default MV candidate blocks have a larger MV, and may determine each of the MVs of the selected default MV candidate blocks as the default MV. Also, for example, the default motion vector determiner 2530 may select a predetermined number of default MV candidate blocks based on an order in which the default MV candidate blocks have a smaller MV, and may determine each of the MVs of the selected default MV candidate blocks as the default MV.

According to an embodiment, the default motion vector determiner 2530 may determine a value obtained by combining the MVs of the plurality of default MV candidate blocks, for example, an average value or a median value of the MVs, as the default MV. Referring to FIG. 30, when MVs exist in all of the blocks C0 through C5, the average value or the median value of the MVs may be determined as the default MV. When MVs exist only in the blocks C0, C1, and C2, the average value or the median value of the MVs in the blocks C0, C1, and C2 may be determined as the default MV.

Also, according to an embodiment, the default motion vector determiner 2530 may determine the default MV corresponding to a specific direction from a default MV candidate block located in the specific direction based on the current block. For example, when the default motion vector determiner 2530 is to determine the default MV corresponding to a left direction, the default motion vector determiner 2530 may determine the default MV based on the MV of a default MV candidate block located in the left direction based on the current block. Also, for example, when the default motion vector determiner 2530 is to determine the default MV corresponding to an upper direction, the default motion vector determiner 2530 may determine the default MV based on the MV of a default MV candidate block located in the upper direction based on the current block.

Referring to FIG. 30, the default MV candidate block corresponding to the left direction may include the blocks C0, C1, C4, and C5, and the default motion vector determiner 2530 may determine the default MV corresponding to the left direction by using the MV of at least one of the blocks C0, C1, C4, and C5. The default motion vector determiner 2530 may determine whether or not the MV exists in the blocks C0, C1, C4, and C5 according to the priority order and may determine the MV of the block for which it is first identified that the MV exists as the default MV corresponding to the left direction.

Also, the default MV candidate block corresponding to the upper direction may include the blocks C2, C3, and C4, and the default motion vector determiner 2530 may determine the default MV corresponding to the upper direction by using the MV of at least one of the blocks C2, C3, and C4. The default motion vector determiner 2530 may determine whether or not the MV exists in the blocks C3, C3, and C4 according to the priority order and may determine the MV of the block for which it is first identified that the MV exists as the default MV corresponding to the upper direction The default MV corresponding to a specific direction may be assigned to a PMV block having no availability as described below. Here, a type of the assigned default MV may be different according to a direction in which the PMV candidate block is located based on the current block.

According to an embodiment, the default motion vector determiner 2530 may determine, as the default MV of the current block, the MV of a default MV candidate block from among the at least one default MV candidate block, the default MV candidate block being in a location most frequently selected for a PMV in a previously decoded picture, a previously decoded slice, or a previously decoded largest coding unit. For example, when the block which is most frequently selected as the PMV in the previously decoded picture from among the left block C0, the left upper block C1, the upper left block C2, the upper right block C3, the left upper outer block C4, and the left lower outer block C5 illustrated in FIG. 30 is the left block C0, the default motion vector determiner 2530 may determine the default MV by using the MV of the block C0. When a plurality of default MVs are to be determined, the default motion vector determiner 2530 may select a plurality of default MV candidate blocks according to an order in which the default MV candidate blocks are selected as the PMV in the previously decoded picture, slice, or largest coding unit, and may determine the plurality of default MVs by using the MVs of the selected default MV candidate blocks.

According to an embodiment, the default motion vector determiner 2530 may determine a default MV before determining a PMV with respect to a current block encoded by using inter prediction. Alternatively, based on determination of an availability of a PMV candidate block described below, the default MV may be determined when necessary. Alternatively, when the bitstream obtained by the bitstream obtainer 2510 includes information that the default MV with respect to the current block is determined, the default motion vector determiner 2530 may determine the default MV with respect to the current block.

According to an embodiment, when the default motion vector determiner 2530 determines the default MV by using the MV of at least one default MV candidate block selected based on a certain criteria from among the plurality of default MV candidate blocks, the default motion vector determiner 2530 may intactly determine the MV of the at least one default MV candidate block as the default MV, or may change the MV of the at least one default MV candidate block and determine the changed MV as the default MV.

According to an embodiment, when the default motion vector determiner 2530 determines the default MV by using the MV of at least one default MV candidate block selected based on a certain criteria from among the plurality of default MV candidate blocks, the default motion vector determiner 2530 may scale the MV of the at least one default MV candidate block by taking into account the reference image index of the current block and determine the scaled MV as the default MV.

According to an embodiment, the default motion vector determiner 2530 may determine the default MV of the current block by using an MV derived via decoder side MV derivation (DMVD). The DMVD may include, for example, a template matching method or a bilateral matching method.

The prediction decoder 2550 may determine a PMV of the current block by using an MV of at least one PMV candidate block.

According to an embodiment, the PMV of the current block may include a previously decoded spatial block and/or a previously decoded temporal block associated with the current block. The at least one PMV candidate block may be selected from among the blocks spatially associated with the current block and the blocks temporally associated with the current block illustrated in FIG. 29.

The location and the number of the at least one PMV candidate block used to determine the PMV of the current block may the same as the location and the number of the default MV candidate blocks used to determine the default MV described above. According to an embodiment, the at least one PMV candidate block and the at least one default MV candidate block may be different from each other in terms of at least one of the location and the number thereof.

The number and the location of the PMV candidate blocks may be predetermined in the prediction decoder 2550 or may be determined by the prediction decoder 2550 for a picture unit, a slice unit, or a block unit, based on a predetermined criteria. According to an embodiment, the number and the location of the PMV candidate blocks may be determined based on the information included in the bitstream, for example, information about an MV resolution of the current block described below.

The prediction decoder 2550 may determine an availability of an MV of the at least one PMV candidate block, and when there is a PMV candidate block determined not to be available, the prediction decoder 2550 may determine the PMV of the current block by using the default MV.

According to an embodiment, the availability of the MV of the PMV candidate block may be determined based on at least one of whether or not an MV exists in the PMV candidate block and whether or not the MV is the same as an MV of another PMV candidate block earlier determined to be available.

When any block is intra predicted, it may be determined that there is no MV in the block. Also, in determining the availability, a case where any one MV is the same as another MV may include a case where both of the MV and a reference image index are the same.

For example, when there is no MV in any one PMV candidate block, the PMV candidate block may be determined not to be available. Also, for example, when an MV of any one PMV candidate block is the same as an MV of another PMV candidate block earlier determined to be available, the PMV candidate block may be determined not to be available. The determining of the availability according to whether or not the MV is the same as each other may denote applying a type of pruning.

According to an embodiment, the prediction decoder 2550 may, based on the determination of the availability, construct a prediction candidate list including a predetermined number of prediction candidates from the MV of each of the at least one PMV candidate block. Also, the prediction decoder 2550 may determine the PMV of the current block by using one or more prediction candidates from among the prediction candidates included in the prediction candidate list. The prediction decoder 2550 may determine the PMV of the current block by using one or more prediction candidates identified from the information included in the bitstream from among the prediction candidates included in the prediction candidate list.

For example, the prediction decoder 2550 may intactly determine any one prediction candidate as the PMV of the current block or may change the prediction candidate and determine the changed prediction candidate as the PMV of the current block. Also, the prediction decoder 2550 may determine a value obtained by combining the plurality of prediction candidates, for example, an average value or a median value of the plurality of prediction candidates, as the PMV of the current block.

The prediction decoder 2550 may construct the prediction candidate list by determining an availability of the MV of each PMV candidate block.

Figure 31:
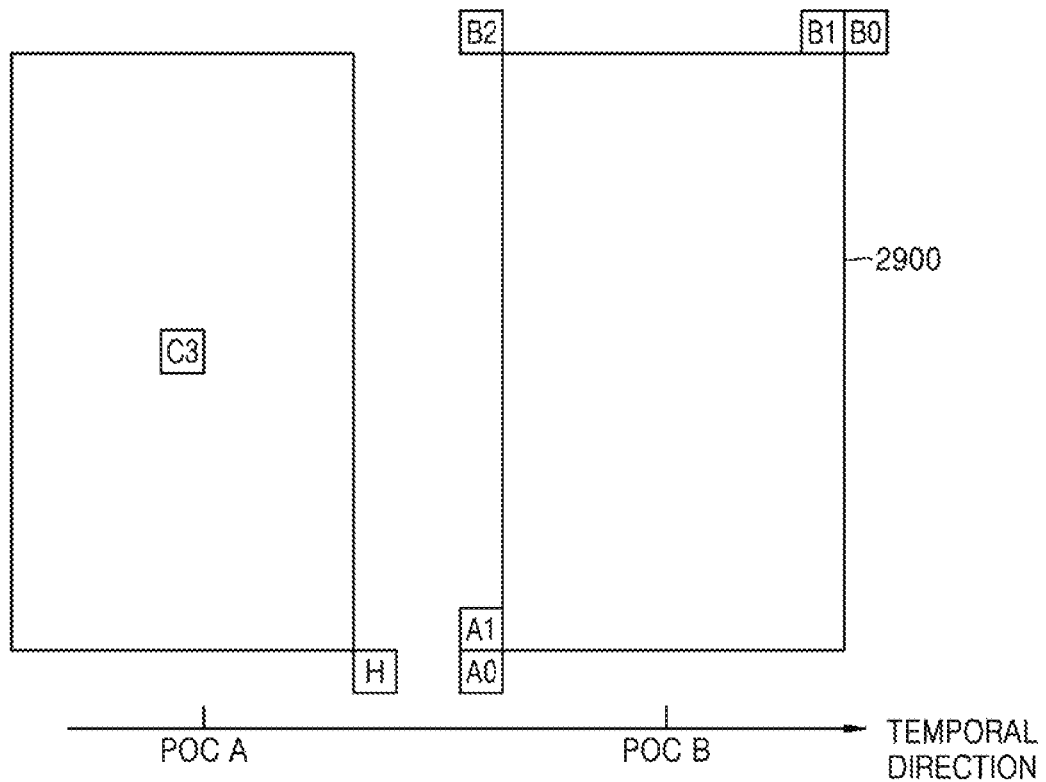
FIGS. 31 and 32 are diagrams illustrating prediction motion vector (PMV) candidate blocks for determining a PMV.

For example, the prediction decoder 2550 may determine the availability of each PMV candidate block according to a priority order. Referring to FIG. 31, when the priority order is set in an order of blocks A0, A1, B0, B1, B2, C3, and H, and when the block A0 having the highest priority order includes an MV, the MV of the block A0 may be included in the prediction candidate list as the prediction candidate. Next, when there is no MV in the block A1 having the second highest priority order, or even when there is an MV in the block A1 having the second highest priority order, when the MV is the same as the MV of the block A0 already included in the prediction candidate list, the block A1 may be determined not to be available, and the availability of the block B0 having the next priority order may be determined. The prediction decoder 2550 may determine the availability of each of the blocks A0 to H according to the priority order, until the prediction candidate list is constructed. After the prediction decoder 2550 constructs the prediction candidate list by determining the availability of each of the blocks A0 to H, when the number of the prediction candidates included in the prediction candidate list is less than a predetermined number, the prediction decoder 2550 may add the default MV to the prediction candidate list.

For example, when the number of prediction candidates to be included in the prediction candidate list is 3, and when a single prediction candidate is included in the prediction candidate list that is constructed based on the determination of the availability, the prediction decoder 2550 may add two default MVs in the prediction candidate list. Also, when two prediction candidates are included in the prediction candidate list constructed based on the determination of the availability, the prediction decoder 2550 may add one default MV in the prediction candidate list.

The number of prediction candidates to be included in the prediction candidate list may be predetermined. According to an embodiment, the default motion vector determiner 2530 may determine the default MVs of numbers corresponding to the predetermined number of prediction candidates to be included in the prediction candidate list.

According to an embodiment, the prediction decoder 2550 may determine the availability of each of the PMV candidate blocks and assign the default MV to a PMV candidate block determined not to be available. Then, the prediction decoder 2550 may construct the prediction candidate list according to the priority order of the PMV candidate blocks. For example, the prediction decoder 2550 may determine the availability of the blocks A0 to H of FIG. 31, and when the block A1 is determined not to be available, may assign the default MV to the block A1. Then, the prediction decoder 2550 may include the MV of each of the blocks A0 to H in the prediction candidate list according to the priority order.

The prediction decoder 2550 may determine the PMV of the current block by using at least one prediction candidate of the prediction candidate list including the default MV or the prediction candidate list not including the default MV.

In an embodiment in which the PMV of the current block is determined, the prediction decoder 2550 may determine the PMV of the current block based on the MV of at least one PMV candidate block in a predetermined location. The prediction decoder 2550 may determine an availability of the at least one PMV candidate block in the predetermined location and may assign the default MV to a PMV candidate block determined not to be available. Here, the assigning of the default MV to the PMV candidate block may denote using the default MV as the MV of the PMV candidate block.

Figure 32:
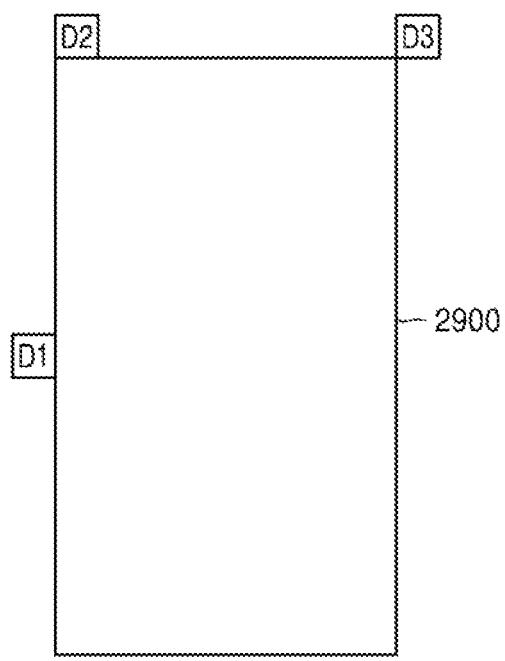

As illustrated in FIG. 32, when the PMV of the current block is determined as a value obtained by combining an MV of a block D1, an MV of a block D2, and an MV of a block D3, and when the MV does not exist in the block D2, a default MV may be assigned as the MV of the block D2. According to an embodiment, the default motion vector determiner 2530 may determine the same number of default MVs as the number of PMV candidate blocks in the predetermined location.

Also, according to an embodiment, the prediction decoder 2550 may determine the PMV of the current block by using an MV of a PMV candidate block in a predetermined location. In this case, when the PMV candidate block is not determined to be available, the prediction decoder 2550 may assign the default MV to the PMV candidate block. The prediction decoder 2550 may intactly determine the default MV assigned to the PMV candidate block as the PMV of the current block or may change the default MV and determine the changed default MV as the PMV of the current block.

According to an embodiment, the prediction decoder 2550 may assign the default MV to a PMV candidate block having no availability from among the PMV candidate blocks in the predetermined location. When there are a plurality of PMV candidate blocks having no availability, the prediction decoder 2550 may assign a plurality of default MVs to the plurality of PMV candidate blocks having no availability, respectively.

For example, in FIG. 32, in the method of determining the PMV of the current block by using the MV of the block D1, when there is no MV in the block D1, the prediction decoder 2550 may assign the default MV to the block D1. Also, in the method of determining the PMV of the current block by using the MVs of the blocks D1, D2, and D3, when there are no MVs in the blocks D1 and D2, the prediction decoder 2550 may assign default MVs to the blocks D1 and D2, respectively.

When the default MV is assigned to the PMV candidate block having no availability, a location of the PMV candidate block may be considered. As described above, the default motion vector determiner 2530 may determine the default MV corresponding to a specific direction from the default MV candidate block located in the corresponding specific direction based on the current block. The prediction decoder 2550 may assign a corresponding default MV to the PMV candidate block by taking into account the direction in which the PMV candidate block having no availability is located based on the current block.

For example, when there is no MV in the block D1 located in a left direction based on the current block of FIG. 32, the prediction decoder 2550 may assign to the block D1 a default MV determined in correspondence to the left direction, and when there is no MV in the block D2 located in an upper direction based on the current block, the prediction decoder 2550 may assign to the block D2 a default MV determined in correspondence to the upper direction. When there is no MV in the block D3, the prediction decoder 2550 may assign to the block D3 the default MV determined in correspondence to the upper direction, or a value determined by combining at least some default MVs from among a plurality of default MVs.

According to an embodiment, the number and a type of the at least one PMV candidate block described above may be determined based on a motion vector resolution (hereinafter, referred to as an MVR) of the current block. The prediction decoder 2550 may directly determine the MVR of the current block based on a predetermined condition or determine the MVR of the current block with reference to the information included in the bitstream obtained by the bitstream obtainer 2510.

According to an embodiment, the bitstream obtainer 2510 may obtain information about the MVR for each interpredicted coding unit. FIG. 36 illustrates a syntax for obtaining information about an MVR from a bitstream.

Referring to FIG. 36, when a slice including a current coding unit in a phrase a is not a slice I, cu_skip_flag is extracted in a phrase b. cu_skip_flag indicates whether a skip mode is applied to the current coding unit. When it is checked that the skip mode is applied in a phrase c, the current coding unit is processed in the skip mode. When it is checked that the skip mode is not applied in a phrase d, pred_mode_flag is extracted in a phrase e. pred_mode_flag indicates whether the current coding unit is intra predicted or inter predicted. When the current coding unit is not intra predicted, that is, is inter predicted in a phrase f, pred_mvr_idx is extracted in a phrase g. pred_mvr_idx is an index indicating an MVR of the current coding unit, and an MVR corresponding to each index is as shown in Table 2.

TABLE 2

| MVR Index | 0 | 1 | 2 | 3 | 4 |
|---|---|---|---|---|---|
| Resolution (R) in pel | ¼ | ½ | 1 | 2 | 4 |

The MVR of the current block may denote a precision degree of a position of a pixel that may be indicated by an MV of the current block from among pixels included in a reference image (or an interpolated reference image). The MVR of the current block may be selected from at least one candidate MVR. The at least one candidate MVR may include, for example, at least one of an MVR of a ⅛-pixel unit, an MVR of a ¼-pixel unit, an MVR of a ½-pixel unit, an MVR of a 1-pixel unit, an MVR of a 2-pixel unit, an MVR of a 4-pixel unit, and an MVR of an 8 pixel unit, but is not limited thereto.

The number and the type of the PMV candidate block used to determine the PMV of the current block may be predetermined according to a type of the MVR of the current block. For example, when the MVR of the current block is the MVR of the ¼-pixel unit, the PMV candidate block may include a left block and an upper block, and when the MVR of the current block is the MVR of the 1-pixel unit, the PMV candidate block may include a left lower block. Also, when the MVR of the current block is the MVR of the 2-pixel unit, the PMV candidate block may include a right block. Like this, when the MVR of the current block is determined, the type and the number of the PMV candidate blocks used to determine the PMV may be automatically determined. According to an embodiment, the number of PMV candidate block for determining the PMV with respect to each MVR may be 1. However, a location of the PMV candidate block may be different from each other with respect to each MVR.

When the MVR of the current block is determined and the PMV candidate block is determined according to the determined MVR, the prediction decoder 2550 may determine the availability of the MV of each of the PMV candidate blocks as described above. Also, the prediction decoder 2550 may assign the default MV as the MV of the PMV candidate block determined to have no availability, and may determine the PMV of the current block.

When assigning the default MV to the PMV candidate block, the prediction decoder 2550 may compare a minimum MVR from among candidate MVRs selectable with respect to the current block with the MVR of the current block to adjust the default MV. The default MV is determined from the MV of the default MV candidate block. The MV of the default MV candidate block is predicted to indicate pixel coordinates in an image interpolated according to the minimum MVR, and thus, the default MV may be adjusted to correspond to the MVR of the current block.

When the number of the PMV candidate blocks used to determine the PMV according to the MVR of the current block is one, and the default MV is assigned to the PMV candidate block because the PMV candidate block is determined not to be available, the default MV may have to be adjusted. When the number of the PMV candidate blocks used to determine the PMV is one and the PMV candidate block is available, and when the number of the PMV candidate blocks used to determine the PMV is more than one, and one or more of the plurality of PMV candidate blocks are available, the MVs of the PMV candidate blocks that are available may be used to determine the PMV. Thus, the MV of the PMV candidate block determined to be available also may have to be adjusted like the default MV.

A process of adjusting the default MV will be described in detail with reference to FIGS. 33 through 35.

When the PMV of the current block is determined, the prediction decoder 2550 may obtain an MV of the current block from the PMV. When a prediction mode of the current block is a skip mode or a merge mode, the prediction decoder 2550 may determine the PMV as the MV of the current block and when the prediction mode of the current block is an advanced motion vector prediction (AMVP) mode, the prediction decoder 2550 may obtain the MV of the current block by combining a residual MV and the PMF.

Also, the prediction decoder 2550 may upscale a residual MV obtained from a bitstream by comparing the MVR of the current block with the minimum MVR, and may obtain the MV of the current block by combining the upscaled residual MV and the PMV. The upscaling of the residual MV will be described below.

Figure 26:
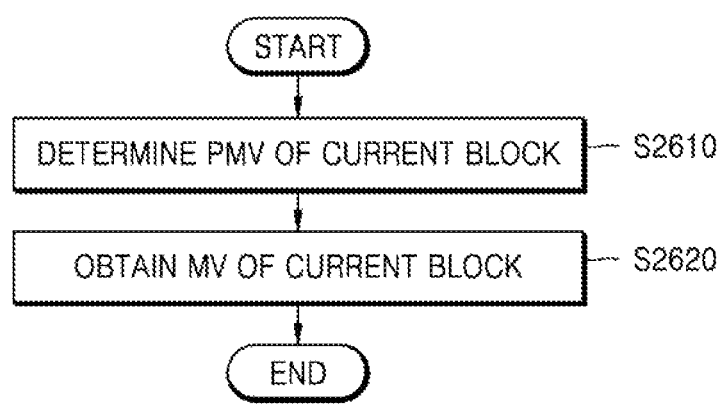
FIG. 26 is a flowchart for describing a method of decoding a motion vector, according to an embodiment.

FIG. 26 is a flowchart for describing a method of decoding an MV, according to an embodiment.

In operation S2610, the motion vector decoding apparatus 2500 may determine a PMV of a current block.

The motion vector decoding apparatus 2500 may determine the PMV of the current block by using at least one PMV candidate block associated with the current block.

As described above, the motion vector decoding apparatus 2500 may determine an availability of an MV of the at least one PMV candidate block. When there is a PMV candidate block determined not to be available, the motion vector decoding apparatus 2500 may determine the PMV of the current block by using a default MV determined from a plurality of default MV candidate blocks.

When an MVR of the current block is determined, the motion vector decoding apparatus 2500 may determine the PMV of the current block by using a default MV adjusted according to the MVR of the current block.

In operation S2620, the motion vector decoding apparatus 2500 may obtain the MV of the current block based on the PMV of the current block.

The motion vector decoding apparatus 2500 may obtain the PMV of the current block as the MV of the current block or may obtain a result of combining the PMV with the residual MV as the MV of the current block. According to an embodiment, when the MVR of the current block is determined, the motion vector decoding apparatus 2500 may selectively upscale the residual MV and then may obtain the MV of the current block by combining the selectively upscaled residual MV with the PMV.

Figure 27:
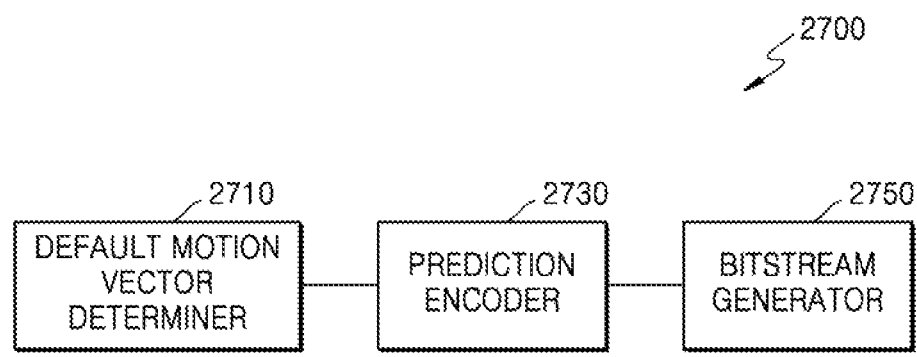
FIG. 27 is a block diagram illustrating a configuration of a motion vector encoding apparatus according to an embodiment.

FIG. 27 is a block diagram illustrating a configuration of a motion vector encoding apparatus 2700, according to an embodiment.

Referring to FIG. 27, the motion vector encoding apparatus 2700 according to an embodiment may include a default motion vector determiner 2710, a prediction encoder 2730, and a bit stream generator 2750. The motion vector encoding apparatus 2700 may be included in the image encoding apparatus 200 described above. For example, the default motion vector determiner 2710 and the prediction encoder 2730 of the motion vector encoding apparatus 2700 may be included in the encoder 220 of the image encoding apparatus 200 and the bitstream generator 2750 of the motion vector encoding apparatus 2700 may be included in the bitstream generator 210 of the image encoding apparatus 200.

The default motion vector determiner 2710 may determine a default MV of a current block.

The default MV may be used to determine a prediction motion vector of the current block. For example, in a method of determining a PMV of the current block by using an MV of at least one PMV candidate block, when there is a PMV candidate block having no availability of the MV from among the at least one PMV candidate block, the PMV of the current block may be determined by using the default MV.

The default motion vector determiner 2710 may determine one default MV or a plurality of default MVs based on an MV of a plurality of default MV candidate blocks associated with the current block.

Positions or the number of the plurality of default MV candidate blocks may be predetermined in the default motion vector determiner 2710. The plurality of default MV candidate blocks may include previously encoded spatial blocks and/or previously encoded temporal blocks associated with the current block. The spatial blocks may include at least one block spatially adjacent to the current block. The temporal blocks may include a block located at the same position as the current block in a reference image having a picture order count (POC) different from a POC of the current block, and at least one block spatially adjacent to the block located at the same position.

According to an embodiment, the default motion vector determiner 2710 may set a priority order with respect to the default MV candidate blocks and may determine whether or not there is an MV with respect to each of the default MV candidate blocks according to the priority order. The default motion vector determiner 2710 may determine at least one default MV based on the MV of the at least one default MV candidate block, according to an order in which it is identified that the MV exists.

The default motion vector determiner 2710 may determine whether or not each default MV candidate block has an MV according to the priority order and may determine the MV of the default MV candidate block for which the availability of the MV is first identified, as the default MV.

Also, the default motion vector determiner 2710 may determine whether or not the MV exists with respect to each default MV candidate block according to the priority order, and may determine the MVs of the plurality of default MV candidate blocks as a plurality of default MVs according to the order in which it is identified that the MV exists with respect to the default MV candidate block.

The default motion vector determiner 2710 may change the priority order that is set with respect to the plurality of default MV candidate blocks by comparing a reference image index of the current block with a reference image index of the plurality of default MV candidate blocks. For example, the default motion vector determiner 2710 may increase the priority order of a default MV candidate block having a reference image index that is the same as the reference image index of the current block. When there are a plurality of default MV candidate blocks having the same reference image index as the current block, an order among the plurality of default MV candidate blocks may comply with the predetermined priority order.

According to an embodiment, the default motion vector determiner 2710 may determine whether or not the reference image index of each default MV candidate block is the same as the reference image index of the current block according to the priority order and may determine the MV of at least one default MV candidate block as at least one default MV according to an order in which it is determined that the reference image index is the same as the reference image index of the current block. When there is no default MV candidate block having the same reference image index as the current block, the default motion vector determiner 2710 may determine whether each default MV candidate block has an MV according to the priority order and may determine the MV of at least one default MV candidate block as at least one default MV, according to the order in which it is identified that the MV exists. According to an embodiment, the default motion vector determiner 2710 may determine the MVs of one more default MV candidate blocks having the same reference image index as the current block as the default MVs, regardless of whether or not the priority order is set.

Also, according to an embodiment, the default motion vector determiner 2710 may select a predetermined number of default MV candidate blocks based on a size of the MVs of the default MV candidate blocks, and may determine the MVs of the selected predetermined number of default MV candidate blocks as the default MV. For example, the default motion vector determiner 2710 may select a predetermined number of default MV candidate blocks based on an order in which the default MV candidate blocks have a larger MV, and may determine the MVs of the selected predetermined number of default MV candidate blocks as the default MV. Also, for example, the default motion vector determiner 2710 may select a predetermined number of default MV candidate blocks based on an order in which the default MV candidate blocks have a smaller MV, and may determine the MVs of the selected predetermined number of default MV candidate blocks as the default MV.

According to an embodiment, the default motion vector determiner 2710 may determine a value obtained by combining the MVs of the plurality of default MV candidate blocks, for example, an average value or a median value of the MVs, as the default MV.

Also, according to an embodiment, the default motion vector determiner 2710 may determine the default MV corresponding to a specific direction from a default MV candidate block located in the specific direction based on the current block. For example, when the default motion vector determiner 2710 is to determine the default MV corresponding to a left direction, the default motion vector determiner 2710 may determine the default MV based on the MV of a default MV candidate block located in the left direction based on the current block. Also, for example, when the default motion vector determiner 2710 is to determine the default MV corresponding to an upper direction, the default motion vector determiner 2710 may determine the default MV based on the MV of a default MV candidate block located in the upper direction based on the current block.

According to an embodiment, the default motion vector determiner 2710 may determine, as the default MV, the MV of a default MV candidate block from among the at least one default MV candidate block, the default MV candidate block being in a location most frequently selected for a PMV in a previously encoded picture, a previously encoded slice, or a previously encoded largest coding unit. When a plurality of default MVs are to be determined, the default motion vector determiner 2710 may select a plurality of default MV candidate blocks according to an order in which the default MV candidate blocks are selected as the PMV in the previously encoded picture, slice, or largest coding unit, and may determine the plurality of default MVs by using the MVs of the selected default MV candidate blocks.

According to an embodiment, the default motion vector determiner 2710 may determine a default MV before determining a PMV with respect to a current block. Alternatively, based on determination of an availability of a PMV candidate block described below, the default MV may be determined according to necessity.

According to an embodiment, when the default motion vector determiner 2710 determines the default MV by using the MV of at least one default MV candidate block selected based on a certain criteria from among the plurality of default MV candidate blocks, the default motion vector determiner 2710 may intactly determine the MV of the at least one default MV candidate block as the default MV, or may change the MV of the at least one default MV candidate block and determine the changed MV as the default MV.

According to an embodiment, when the default motion vector determiner 2710 determines the default MV by using the MV of at least one default MV candidate block selected based on a certain criteria from among the plurality of default MV candidate blocks, the default motion vector determiner 2710 may scale the MV of the at least one default MV candidate block by taking into account the reference image index of the current block and determine the scaled MV as the default MV.

According to an embodiment, the default motion vector determiner 2710 may determine the default MV of the current block by using an MV derived via DMVD. The DMVD may include, for example, a template matching method or a bilateral matching method. In general, an encoding apparatus includes a decoding apparatus, and thus, the default motion vector determiner 2710 of the motion vector encoding apparatus 2700 may also determine the MV via the DMVD.

The prediction encoder 2730 may determine the MV of the current block. According to an embodiment, the prediction encoder 2730 may interpolate a reference image for inter prediction of the current block, detect a block that is most similar to the current block from the reference image, and determine a distance between coordinates of the current block and a reference block as the MV of the current block.

According to an embodiment, the prediction encoder 2730 may determine an MVR of the current block and determine the MV according to the determined MVR.

The prediction encoder 2730 may determine, as the MVR of the current block, any one candidate MVR from among at least one candidate MVR selectable with respect to the current block. The prediction encoder 2730 may interpolate the reference image according to a minimum MVR from among the at least one candidate MVR selectable with respect to the current block and may determine the MV of the current block by using the MVR. For example, when the candidate MVR selectable with respect to the current block includes an MVR of a ¼-pixel unit, an MVR of a ½-pixel unit, an MVR of a 1-pixel unit, and an MVR of a 2-pixel unit, and the MVR of the 1-pixel unit is selected as the MVR of the current block, the prediction encoder 2730 may interpolate the reference image by using the ¼-pixel unit which has the minimum MVR and may determine the MV by using the 1-pixel unit in the interpolated reference image.

The prediction encoder 2730 may determine a PMV of the current block in order to encode the MV of the current block. According to an embodiment, the PMV of the current block may be determined from at least one PMV candidate block including spatial blocks and/or temporal blocks associated with the current block.

The number and the location of the PMV candidate blocks may be predetermined in the prediction encoder 2730 or may be determined by the prediction encoder 2730 for a picture unit, a slice unit, or a block unit. According to an embodiment, the number and the location of the PMV candidate blocks may be determined according to the MVR of the current block.

The prediction encoder 2730 may determine an availability of an MV of the at least one PMV candidate block, and when there is a PMV candidate block determined not to be available, the prediction encoder 2730 may determine the PMV of the current block by using the default MV.

According to an embodiment, the availability of the MV of the PMV candidate block may be determined based on at least one of whether or not an MV exists in the PMV candidate block and whether or not the MV is the same as an MV of another PMV candidate block earlier determined to be available.

According to an embodiment, the prediction encoder 2730 may, based on the determination of the availability, construct a prediction candidate list including a predetermined number of prediction candidates from the MV of each of the at least one PMV candidate block. Also, the prediction encoder 2730 may determine the PMV of the current block by using one or more prediction candidates from among the prediction candidates included in the prediction candidate list.

For example, the prediction encoder 2730 may intactly determine any one prediction candidate as the PMV of the current block or may change the prediction candidate and determine the changed prediction candidate as the PMV of the current block. Also, the prediction encoder 2730 may determine a value obtained by combining the plurality of prediction candidates, for example, an average value or a median value of the plurality of prediction candidates, as the PMV of the current block.

The prediction encoder 2730 may construct the prediction candidate list by determining an availability of the MV of each PMV candidate block. For example, the prediction encoder 2730 may determine the availability of each PMV candidate block according to a priority order. Referring to FIG. 31, when the priority order is set in an order of blocks A0, A1, B0, B1, B2, C3, and H, and when the block A0 having the highest priority order includes an MV, the MV of the block A0 may be included in the prediction candidate list as the prediction candidate. Next, when there is no MV in the block A1 having the second highest priority order, or even when there is an MV in the block A1 having the second highest priority order, when the MV is the same as the MV of the block A0 already included in the prediction candidate list, the block A1 may be determined not to be available, and the availability of the block B0 having the next priority order may be determined. The prediction encoder 2730 may determine the availability of each of the blocks A0 to H according to the priority order, until the prediction candidate list is constructed. After the prediction encoder 2730 constructs the prediction candidate list by determining the availability of each of the blocks A0 to H, when the number of the prediction candidates included in the prediction candidate list is less than a predetermined number, the prediction decoder 2550 may include the default MV in the prediction candidate list.

According to an embodiment, the prediction encoder 2730 may determine the availability of each of the PMV candidate blocks and assign the default MV to a PMV candidate block determined not to be available. Then, the prediction encoder 2730 may construct the prediction candidate list according to the priority order of the PMV candidate blocks. The number of prediction candidates to be included in the prediction candidate list may be predetermined. According to an embodiment, the default motion vector determiner 2710 may determine the number of default MVs corresponding to the predetermined number of prediction candidates to be included in the prediction candidate list.

The prediction encoder 2730 may determine the PMV of the current block by using at least one prediction candidate of the prediction candidate list including the default MV or the prediction candidate list not including the default MV.

According to an embodiment, the prediction encoder 2730 may determine the PMV of the current block based on an MV of at least one PMV candidate block in a predetermined location. The prediction encoder 2730 may determine an availability of the at least one PMV candidate block in the predetermined location and may assign the default MV as the MV of a PMV candidate block determined not to be available. As illustrated in FIG. 32, when the PMV of the current block is determined as a value obtained by combining an MV of a block D1, an MV of a block D2, and an MV of a block D3, and when the MV does not exist in the block D2, a default MV may be assigned as the MV of the block D2.

Also, according to an embodiment, the prediction encoder 2730 may determine the PMV of the current block by using an MV of a PMV candidate block in a predetermined location. In this case, when the PMV candidate block is not determined to be available, the prediction encoder 2730 may assign the default MV to the PMV candidate block. The prediction encoder 2730 may intactly determine the default MV assigned to the PMV candidate block as the PMV of the current block or may change the default MV and determine the changed default MV as the PMV of the current block.

According to an embodiment, the prediction encoder 2730 may assign the default MV to a PMV candidate block having no availability from among the PMV candidate blocks in the predetermined location, and when there are a plurality of PMV candidate blocks having no availability, the prediction decoder 2550 may assign a plurality of default MVs to the plurality of PMV candidate blocks having no availability, respectively. According to an embodiment, the default motion vector determiner 2530 may determine the same number of default MVs as the PMV candidate blocks in the predetermined location.

When the default MV is assigned to the PMV candidate block having no availability, a location of the PMV candidate block may be considered. As described above, the default motion vector determiner 2710 may determine the default MV corresponding to a specific direction from the default MV candidate block located in the corresponding specific direction based on the current block. The prediction encoder 2730 may assign a corresponding default MV to the PMV candidate block by taking into account the direction in which the PMV candidate block having no MV is located based on the current block.

When the MV and the PMV of the current block are determined, the prediction encoder 2730 may obtain a residual MV which is a difference between the MV and the PMV of the current block, based on a prediction mode of the current block.

When the prediction mode of the current block is a skip mode or a merge mode, the prediction encoder 2730 may omit obtaining the residual MV, and when the prediction mode of the current block is an AMVP mode, the prediction encoder 2730 may obtain the residual MV.

According to an embodiment, the prediction encoder 2730 may generate information about the PMV of the current block. For example, when the PMV of the current block is determined from a predetermined number of prediction candidate lists, the prediction encoder 2730 may generate information indicating which prediction candidate from among the predetermined number of prediction candidates is used as the PMV of the current block.

When the PMV of the current block is determined from the MV of the PMV candidate block in a predetermined location, the prediction encoder 2730 may omit generating the information about the PMV. That is because the motion vector decoding apparatus 2500 may also determine the PMV by using the same PMV candidate block in the predetermined location, in order to determine the MV of the current block.

According to an embodiment, the prediction encoder 2730 may generate information indicating that the default MV is determined in order to determine the PMV of the current block. For example, when the default MV is determined by the default motion vector determiner 2710, flag 1 may be generated, and when determining of the default MV is omitted, flag 0 may be generated.

According to an embodiment, the prediction encoder 2730 may generate information indicating the MVR of the current block.

The bitstream generator 2750 may generate a bitstream including at least one of information corresponding to the residual MV, information about the PMV, information about whether or not the default MV is determined, information about the MVR of the current block, information about a prediction direction (a unilateral direction or a bilateral direction), and information about the reference image index generated by the prediction encoder 2730.

Figure 28:
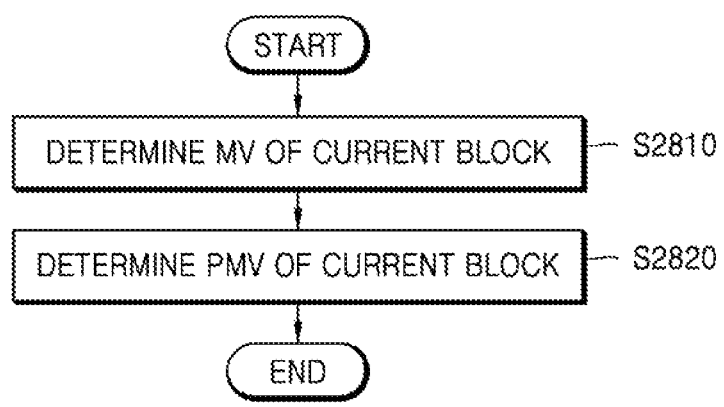
FIG. 28 is a flowchart for describing a method of encoding a motion vector, according to an embodiment.

FIG. 28 is a flowchart for describing a method of encoding an MV, according to an embodiment.

In operation S2810, the motion vector encoding apparatus 2700 may determine the MV of the current block. The motion vector encoding apparatus 2700 may find a reference block that is most similar to the current block in a reference image and may determine the MV indicating a distance between coordinates of the reference block and the current block.

According to an embodiment, when an MVR of the current block is determined, the motion vector encoding apparatus 2700 may determine the MV according to the MVR of the current block in an image interpolated according to a minimum MVR.

In operation S2820, the motion vector encoding apparatus 2700 may determine a PMV of the current block.

The motion vector encoding apparatus 2700 may determine the PMV of the current block by using an MV of at least one PMV candidate block.

As described above, the motion vector encoding apparatus 2700 may determine an availability the MV of the at least one PMV candidate block. When there is a PMV candidate block determined not to be available, the motion vector encoding apparatus 2700 may determine the PMV of the current block by using a default MV determined from a plurality of default MV candidate blocks.

When the MVR of the current block is determined, the motion vector encoding apparatus 2700 may determine the PMV of the current block by using a default MV adjusted according to the MVR of the current block.

Hereinafter, a process in which the default MV is adjusted when the MVR of the current block is determined will be described with reference to FIGS. 33 through 35.

As described above, when any one candidate MVR from among at least one candidate MVR selectable with respect to the current block is selected as the MVR of the current block, the default MV may have to be adjusted according to a resolution of the current block, when the default MV is used to determine the PMV of the current block.

Figure 33:
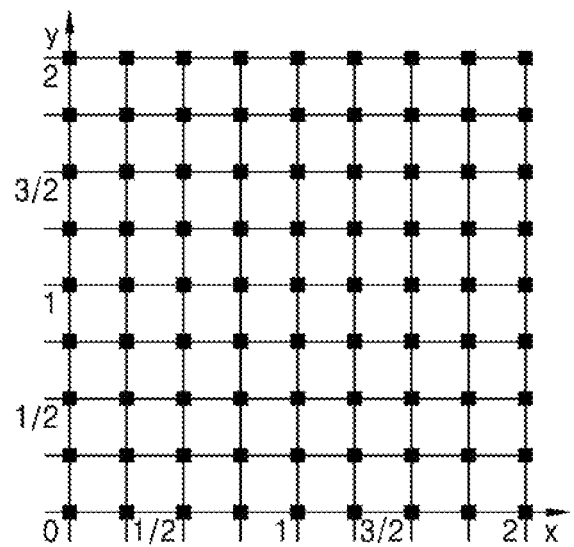
FIG. 33 is a diagram illustrating positions of pixels that may be indicated by motion vectors according to a ¼-pixel unit motion vector resolution (MVR), a ½-pixel unit MVR, a 1-pixel unit MVR, and a 2-pixel unit MVR when a minimum MVR that is selectable for a current block is the ¼-pixel unit MVR.
Figure 33:
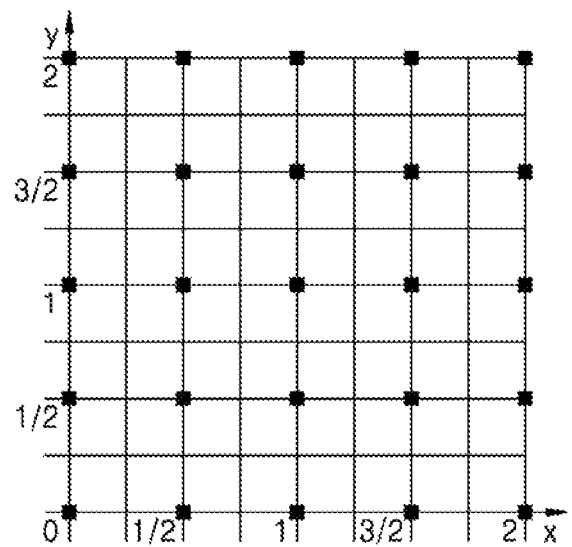
Figure 33:
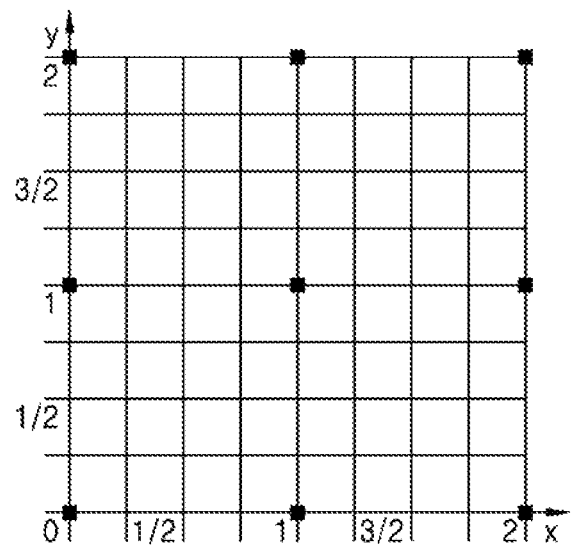
Figure 33:
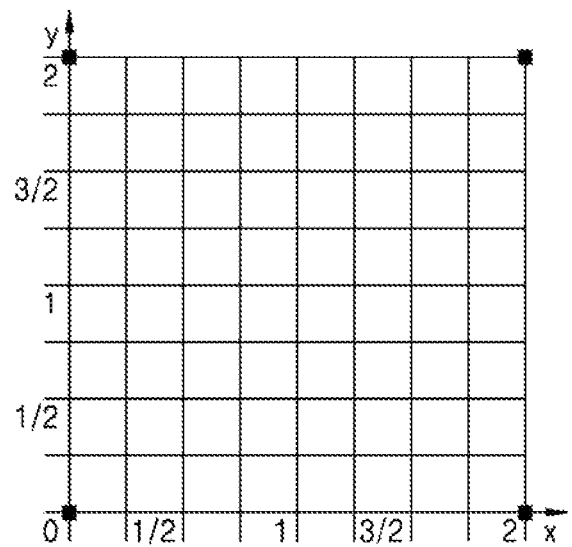

FIG. 33 illustrates positions of pixels that may be indicated by MVs according to an MVR of a ¼-pixel unit, an MVR of a ½-pixel unit, an MVR of a 1-pixel unit, and an MVR of a 2-pixel unit, when a minimum MVR selectable with respect to the current block is the MVR of the ¼-pixel unit.

(a), (b), (c), and (d) of FIG. 33 respectively illustrate coordinates (marked by black squares) of pixels that may be indicated by MVs of the MVR of the ¼-pixel unit, the MVR of the ½-pixel unit, the MVR of the 1-pixel unit, and the MVR of the 2-pixel unit based on coordinates (0, 0).

When the minimum MVR is the MVR of the ¼-pixel unit, the coordinates of the pixel that may be indicated by the MV of the MVR of the ¼-pixel unit become (a/4, b/4) (a and b are integers), the coordinates of the pixel that may be indicated by the MV of the MVR of the ½-pixel unit become (2c/4, 2d/4) (c and d are integers), the coordinates of the pixel that may be indicated by the MV of the MVR of the 1-pixel unit become (4e/4, 4f/4) (e and f are integers), and the coordinates of the pixel that may be indicated by the MV of the MVR of the 2-pixel unit become (8g/4, 8h/4) (g and h are integers). That is, when the minimum MVR has a 2m (m is an integer) pixel unit, coordinates of a pixel that may be indicated by an MVR of a $2^n$ (n is an integer) pixel unit become ($2^{n-m}*i/2^{-m}$, $2^{n-m}*j/2^{-m}$) (i and j are integers). Although the MV is determined according to a specific MVR, the MV is represented by coordinates in an image interpolated according to the ¼-pixel unit corresponding to a minimum MVR.

In an embodiment, because the motion vector encoding apparatus 2700 determines the MV in the image interpolated according to the minimum MVR, in order to represent the MV by using an integer, the MV of an integer unit may be represented by multiplying the MV by a reciprocal of a pixel unit value of the minimum MVR, for example, $2^{-m}$ when the minimum MVR has a $2^m$ (m is an integer) pixel unit. The MV of the integer unit multiplied by $2^{-m}$ may be used in the motion vector encoding apparatus 2700 and the motion vector decoding apparatus 2500.

When the MV of the MVR of the ½-pixel unit starting from the coordinates (0, 0) indicates coordinates (2/4, 6/4) and the minimum MVR has the ¼-pixel unit, the motion vector encoding apparatus 2700 may determine (2, 6), which is obtained by multiplying the MV by an integer 4, as an MV.

Figure 34:
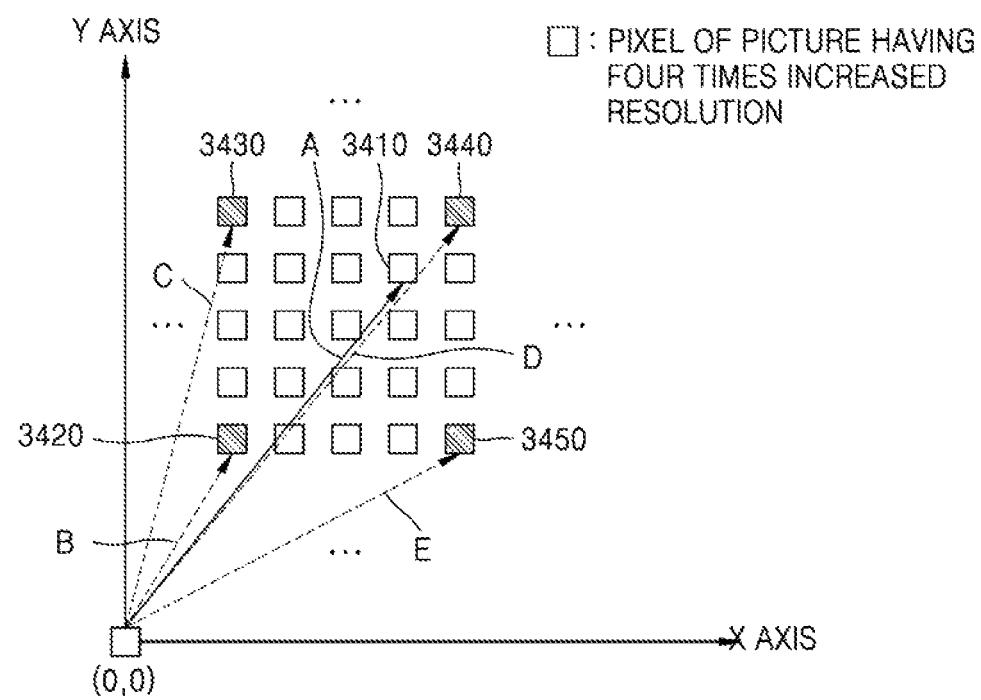
FIGS. 34 and 35 are graphs for describing a method of adjusting a default MV.

FIG. 34 is a diagram for describing a method of adjusting a default MV.

The motion vector encoding apparatus 2700 and the motion vector decoding apparatus 2500 may adjust the default MV to be used as a PMV of a current block, when an MVR of the current block is greater than a minimum MVR from among selectable candidate MVRs. That the MVR of the current block is greater than the minimum MVR may denote that a pixel unit of the MVR of the current block is greater than a pixel unit of the minimum MVR. For example, an MVR of a 1-pixel unit is greater than an MVR of a ½-pixel unit and the MVR of the ½-pixel unit may be greater than an MVR of a ¼-pixel unit.

In order to adjust the default MV represented by coordinates in an image interpolated according to the minimum MVR to the MVR of the current block, the motion vector encoding apparatus 2700 and the motion vector decoding apparatus 2500 may adjust the default MV to indicate neighboring pixels instead of a pixel indicated by the default MV.

For example, in order to adjust a default MV A indicating a pixel 3410 of coordinates (19, 27) based on coordinates (0, 0) in FIG. 34 to an MVR of a 1-pixel unit that is the MVR of the current block, the coordinates (19, 27) of the pixel 3410 indicated by the default MV A may be divided by an integer 4 (that is, may be downscaled), and coordinates (19/4, 27/4) obtained as a division result may not indicate an integer pixel unit.

The motion vector encoding apparatus 2700 and the motion vector decoding apparatus 2500 may adjust the downscaled default MV to indicate an integer pixel unit. For example, coordinates of neighboring integer pixels around the coordinates (19/4, 27/4) are (16/4, 28/4), (16/4, 24/4), (20/4, 28/4), and (20/4, 24/4). In this case, after the motion vector encoding apparatus 2700 and the motion vector decoding apparatus 2500 may adjust the downscaled default MV A to indicate the coordinates (20/4, 28/4) located at the right-top instead of the coordinates (19/4, 27/4) and may multiply an integer 4 (that is, upscale) so that a finally adjusted default MV D indicates a pixel 3440 corresponding to coordinates (20, 28).

According to an embodiment, the motion vector encoding apparatus 2700 and the motion vector decoding apparatus 2500 may adjust the downscaled default MV to indicate coordinates located at the left bottom, coordinates located at the left top, or coordinates located at the right bottom.

According to an embodiment, when any one of an x-coordinate value and a y-coordinate value indicated by the downscaled default MV indicates an integer pixel, the motion vector encoding apparatus 2700 and the motion vector decoding apparatus 2500 may increase or decrease only the coordinate value not indicating the integer pixel to indicate an integer pixel. That is, when the x-coordinate value indicated by the downscaled default MV indicates an integer pixel, the motion vector encoding apparatus 2700 and the motion vector decoding apparatus 2500 may cause the adjusted default MV to indicate an integer pixel located at the top or the bottom of the pixel indicated by the default MV before adjustment. Alternatively, when the y-coordinate value indicated by the downscaled default MV indicates an integer pixel, the motion vector encoding apparatus 2700 and the motion vector decoding apparatus 2500 may cause the adjusted default MV to indicate an integer pixel located at the left or the right of the pixel indicated by the default MV before adjustment.

When the default MV is adjusted, the motion vector encoding apparatus 2700 and the motion vector decoding apparatus 2500 may differently select a point indicated by the adjusted default MV according to the MVR of the current block.

Figure 35:
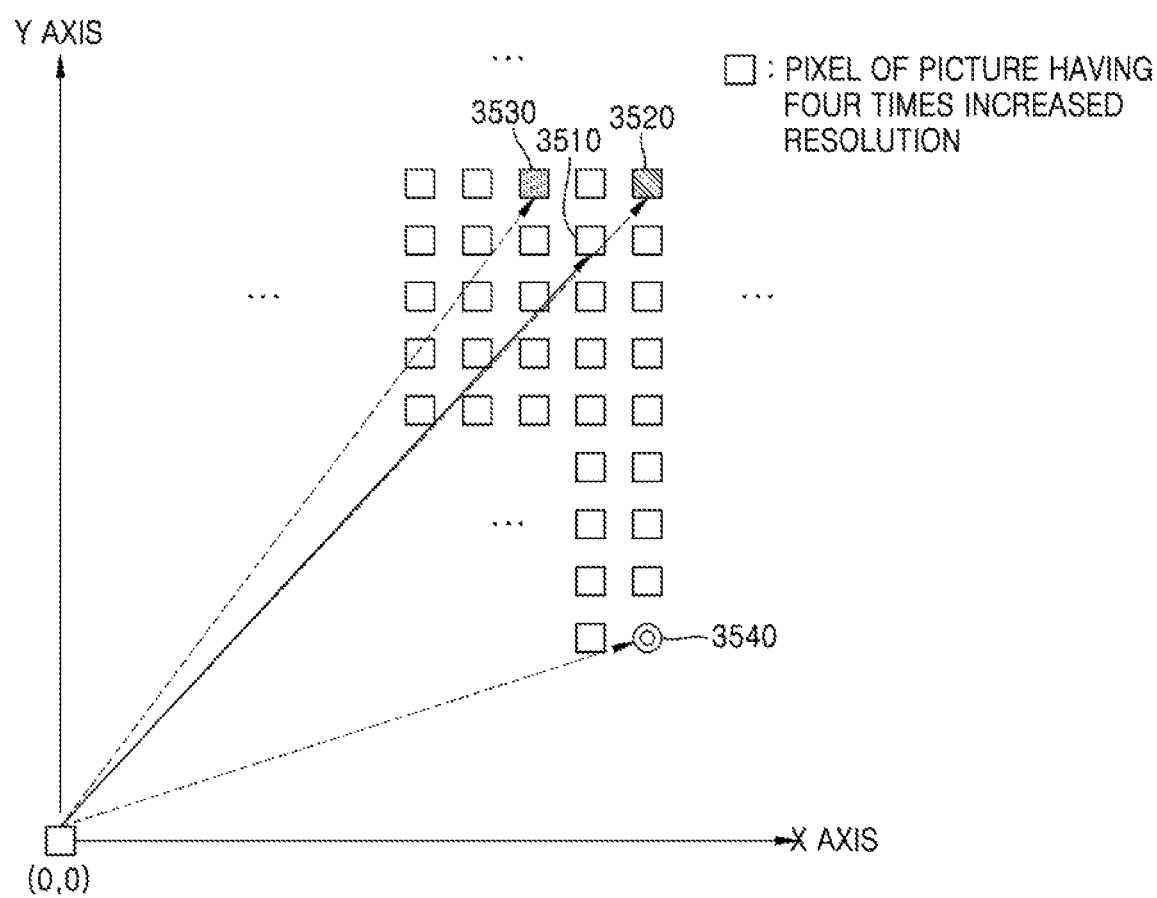

For example, referring to FIG. 35, when the MVR of the current block is an MVR of a ½-pixel unit, the motion vector encoding apparatus 2700 and the motion vector decoding apparatus 2500 may cause the adjusted default MV to indicate a pixel 3530 at the left-top of a pixel indicated by the default MV before adjustment; when the MVR of the current block is an MVR of a 1-pixel unit, the motion vector encoding apparatus 2700 and the motion vector decoding apparatus 2500 may cause the adjusted default MV to indicate a pixel 3520 at the right-top of the pixel indicated by the default MV before adjustment; and when the MVR of the current block is an MVR of a 2-pixel unit, the motion vector encoding apparatus 2700 and the motion vector decoding apparatus 2500 may cause the adjusted default MV to indicate a pixel 3540 at the right-bottom of the pixel indicated by the default MV before adjustment.

When the default MV is adjusted in consideration of the MVR of the current block and the minimum MVR, the motion vector encoding apparatus 2700 and the motion vector decoding apparatus 2500 may adjust the default MV according to Equation 1 below.

$$\text{default } MV' = ((\text{default } MV >> k) + \text{offset}) << k \quad \text{[Equation 1]}$$

In Equation 1, default MV' denotes the adjusted default MV and k is a value determined according to a difference between the MVR of the current block and the minimum MVR, wherein k may be m-n when the MVR of the current block is a $2^m$-pixel unit (m is an integer), the minimum MVR is a $2^n$-pixel unit (n is an integer), and m>n.

According to an embodiment, k may be an index of an MVR, and when candidate MVRs include an MVR of a ¼-pixel unit, an MVR of a ½-pixel unit, an MVR of a 1-pixel unit, an MVR of a 2-pixel unit, and an MVR of a 4-pixel unit, MVRs corresponding to indices are as shown in Table 2. When an MVR index is received from a bitstream, the motion vector decoding apparatus 2500 may adjust the default MV according to Equation 1 by using the MVR index as k.

Also, in Equation 1, >> or << that is a bit shift operation refers to an operation of reducing or increasing a size of the default MV. Also, offset denotes a value added or subtracted to indicate an integer pixel when the default MV downscaled according to a k value does not indicate an integer pixel. offset may be differently determined according to each of an x-coordinate value and a y-coordinate value of the default MV.

According to an embodiment, when the downscaled default MV is changed to indicate an integer pixel, the motion vector encoding apparatus 2700 and the motion vector decoding apparatus 2500 may change the downscaled default MV according to the same criterion.

According to an embodiment, when an x-coordinate value and a y-coordinate value of the downscaled default MV do not indicate an integer pixel, the motion vector encoding apparatus 2700 and the motion vector decoding apparatus 2500 may always increase or decrease the x-coordinate value and the y-coordinate value of the downscaled default MV to indicate an integer pixel. Alternatively, the motion vector encoding apparatus 2700 and the motion vector decoding apparatus 2500 may round the x-coordinate value and the y-coordinate value of the downscaled default MV to indicate an integer pixel.

According to an embodiment, when the default MV is adjusted, the motion vector encoding apparatus 2700 and the motion vector decoding apparatus 2500 may omit downscaling and upscaling of the default MV, and may adjust the default MV in a coordinate plane in a reference image interpolated according to the minimum MVR to indicate a pixel unit corresponding to the MVR of the current block.

Also, according to an embodiment, when the default MV is adjusted in consideration of the MVR of the current block and the minimum MVR, the motion vector encoding apparatus 2700 and the motion vector decoding apparatus 2500 may adjust the default MV according to Equation 2 below, instead of Equation 1.

$$\text{default } MV'=((\text{default } MV+\text{offset})>>k)<<k \quad \text{[Equation 2]}$$

Although Equation 2 is similar to Equation 1, unlike in Equation where offset is applied to the downscaled default MV, offset is applied to the original default MV and then is downscaled according to k.

The motion vector encoding apparatus 2700 finds an MV of the current block by using the MVR of the current block, and obtains a difference between the MV and the PMV of the current block as a residual MV.

The motion vector encoding apparatus 2700 may determine and encode the residual MV as shown in Equation 3 below. In Equation 3, MV denotes the motion vector of the current block, PMV denotes the PMV, and MVD denotes the residual MV. PMV may denote the PMV determined based on the adjusted default MV and/or an adjusted MV of the PMV candidate block.

$$MVD=MV-PMV \quad \text{[Equation 3]}$$

When the MVR of the current block is higher than the minimum MVR, the motion vector encoding apparatus 2700 may downscale the residual MV as shown in Equation 4, and may generate a bitstream including information indicating the downscaled residual MV.

$$MVD'=(MVD>>k) \quad \text{[Equation 4]}$$

In Equation 4, MVD' denotes the downscaled residual MV, and k that is a value determined according to a difference between the minimum MVR and the MVR of the current block is the same as k of Equation 1.

According to an embodiment, the motion vector encoding apparatus 2700 may downscale the MV and the PMV of the current block according to the k value, and then may encode a difference between the two values as the residual MV.

According to an embodiment, the motion vector encoding apparatus 2700 may calculate the downscaled residual MV according to Equation 5 below, instead of Equation 3 and Equation 4.

$$MVD'=(MV-PMV)/(R*S) \quad \text{[Equation 5]}$$

In Equation 5, MVD' denotes the downscaled residual MV, MV denotes the MV of the current block, and PMV denotes the PMV. Also, R denotes a pixel unit value of the MVR of the current block, (e.g., ¼ when the MVR of the current block is an MVR of a ¼-pixel unit). Also, S denotes a reciprocal of a pixel unit value of the minimum MVR (e.g., 4 when the minimum MVR is a ¼-pixel unit).

The motion vector decoding apparatus 2500 may reconstruct the MV of the current block by using the PMV of the current block and the residual MV.

When the MVR of the current block is higher than the minimum MVR, the motion vector decoding apparatus 2500 may upscale residual motion data as shown in Equation 6 below.

$$MVD''=(MVD'<<k) \quad \text{[Equation 6]}$$

In Equation 6, MVD' denotes the residual MV downscaled by an encoding apparatus, and MVD'' denotes an upscaled residual MV. k that is a value determined according to a difference between the minimum MVR and the MVR of the current block is the same as k of Equation 1.

The motion vector decoding apparatus 2500 may decode the MV of the current block by adding the residual MV that is selectively upscaled according to the difference between the minimum MVR and the MVR of the current block to the PMV.

According to an embodiment, the motion vector decoding apparatus 2500 may determine the upscaled residual MV according to Equation 7 below, instead of Equation 6 above.

$$MVD''=MVD'*(R*S) \quad \text{[Equation 7]}$$

In Equation 7, MVD' denotes the downscaled residual MV, and R denotes a pixel unit value of the MVR of the current block (e.g., ¼ when the MVR of the current block is an MVR of a ¼-pixel unit). Also, S denotes a reciprocal of a pixel unit value of the minimum MVR (e.g., 4 when the minimum MVR is a ¼-pixel unit).

According to an embodiment, when the MVR of the current block is less than an MVR of a 1-pixel unit, the motion vector decoding apparatus 2500 may interpolate the reference image according to the minimum MVR and then may search for a prediction block of the current block according to the MV of the current block. Also, when the MVR of the current block is equal to or higher than an MVR of a 1-pixel unit, the motion vector decoding apparatus 2500 may search for the prediction block of the current block according to the MV of the current block without interpolating the reference image. The motion vector decoding apparatus 2500 may reconstruct the current block by adding the prediction block to residual data inverse transformed and inverse quantized.

The embodiments may be implemented as a computer-executable program, and the program may be stored in a medium.

The medium may continuously store the computer-executable program, or may temporarily store the computer-executable program to execute or download the computer-executable program. Also, the medium may be any of various recording means or storage means including a single hardware or a combination of a plurality of hardware, and may be distributed in a network without being limited to a medium directly connected to a computer system. The medium may be configured to store program instructions, and examples of the medium may include a magnetic medium such as a hard disk, a floppy disk, or a magnetic tape, an optical recording medium such as a compact disc read-only memory (CD-ROM) or a digital versatile disc (DVD), a magneto-optical medium such as a floptical disk, a ROM, a random-access memory (RAM), and a flash memory. Also, other examples of the medium may include a recording medium and a storage medium managed by an application store that distributes applications or a site or a server that supplies or distributes various other software.

While the disclosure has been particularly shown and described with reference to embodiments thereof, it will be understood by one of ordinary skill in the art that various changes in form and details may be made therein without departing from the spirit and scope of the disclosure as defined by the appended claims.

The invention claimed is:

1. A method of decoding a motion vector, the method comprising:
   obtaining, from a bitstream, an index indicating a particular motion vector resolution of a current block among a plurality of motion vector resolutions including a first motion vector resolution;
   when a motion vector of a first candidate block corresponding to the first motion vector resolution indicated by the index is available, determining the motion vector of the first candidate block as a prediction motion vector of the current block, wherein a position of the first candidate block is determined based on the index;
   when the motion vector of the first candidate block is unavailable, determining a default motion vector from default motion vector candidates according to a priority, and determining the default motion vector as the prediction motion vector of the current block;
   adjusting the prediction motion vector by applying a right-shift operation based on the index and a left-shift operation based the index to the prediction motion vector; and
   obtaining a motion vector of the current block by using a residual motion vector and the adjusted prediction motion vector of the current block.

2. A method of encoding a motion vector, the method comprising:
   selecting a particular motion vector resolution of a current block among a plurality of motion vector resolutions including a first motion vector resolution;
   when a motion vector of a first candidate block corresponding to the first motion vector resolution selected as the particular motion vector resolution of the current block is available, determining the motion vector of the first candidate block as a prediction motion vector of the current block;
   when the motion vector of the first candidate block is unavailable, determining a default motion vector from default motion vector candidates according to a priority, and determining the default motion vector as the prediction motion vector of the current block;
   adjusting the prediction motion vector by applying a right-shift operation based on an index and a left-shift operation based on the index to the prediction motion vector, the index indicating the particular motion vector resolution of the current block; and
   obtaining a residual motion vector using a motion vector of the current block and the adjusted prediction motion vector of the current block,
   wherein a position of the first candidate block is determined based on the index.

* * * * *